US 6,528,959 B2

(12) United States Patent
Kitano et al.

(10) Patent No.: US 6,528,959 B2
(45) Date of Patent: Mar. 4, 2003

(54) DRIVING FORCE CONTROL SYSTEM FOR FRONT-AND-REAR WHEEL DRIVE VEHICLES

(75) Inventors: Kazuhiko Kitano, Saitama-ken (JP); Toshihiko Fukuda, Saitama-ken (JP); Takahiro Yonekura, Saitama-ken (JP); Naoki Uchiyama, Saitama-ken (JP); Kenji Honda, Saitama-ken (JP); Tooru Nakasako, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/906,054

(22) Filed: Jul. 17, 2001

(65) Prior Publication Data

US 2002/0041167 A1 Apr. 11, 2002

(30) Foreign Application Priority Data

Jul. 19, 2000 (JP) ........................ 2000-219408
Aug. 1, 2000 (JP) ........................ 2000-232890
Aug. 2, 2000 (JP) ........................ 2000-234090

(51) Int. Cl.$^7$ ............................................... H02P 7/66
(52) U.S. Cl. ............................ 318/55; 318/52; 318/58; 318/64; 180/65.1
(58) Field of Search ............................ 318/52, 55, 58, 318/64; 180/65.1

(56) References Cited

U.S. PATENT DOCUMENTS 5,540,299 A * 7/1996 Tohda et al. ................ 180/242
5,788,005 A * 8/1998 Arai ............................ 180/247
5,927,425 A * 7/1999 Kusano ....................... 180/248
6,205,379 B1 * 3/2001 Morisawa et al. .......... 180/165
6,349,782 B1 * 2/2002 Sekiya et al. ............... 180/197

* cited by examiner

Primary Examiner—Rita Leykin
(74) Attorney, Agent, or Firm—Arent Fox Kintner Plotkin & Kahn, PLLC

(57) ABSTRACT

There is provided a driving force control system for a front-and-rear wheel drive vehicle, which is capable maintaining an optimum slip condition of the drive wheels even on a low-friction road surface, ensuring a proper grip of rear wheels even on a low-friction road surface or a downhill slope, even when the driver operates the steering wheel while the vehicle is performing decelerating travel on such a road, and smoothly performing the assistance of an electric motor when the vehicle is accelerated without developing a torque step, thereby ensuring stable traveling and excellent acceleration and drivability. The front-and-rear wheel drive vehicle drives the front wheels by an engine, and rear wheels by an electric motor via an electromagnetic clutch. The target driving force for driving the vehicle is calculated based on at least a vehicle speed and an accelerator pedal opening. The present traveling condition of the vehicle is determined. The driving force for driving the vehicle is controlled based on the calculated target driving force in dependence on the determined traveling condition of the vehicle.

11 Claims, 31 Drawing Sheets

F I G. 1
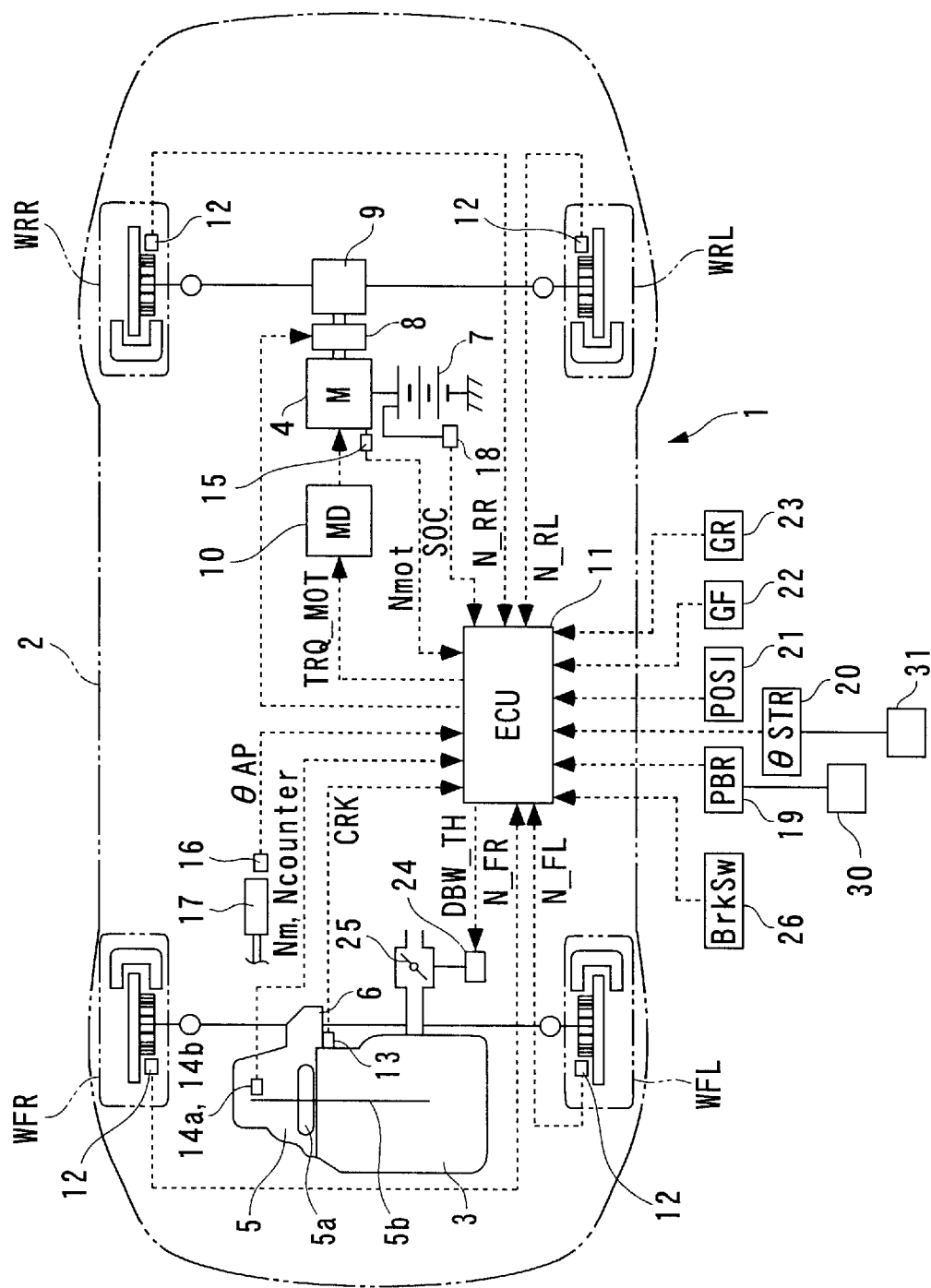

DRIVING FORCE CONTROL SYSTEM FOR FRONT-AND-REAR WHEEL DRIVE VEHICLES

BACKGROUND OF THE INVENTION

1. Field of the Invention

This invention relates to a driving force control system for a type of front-and-rear wheel drive vehicle that drives one pair of a pair of front wheels and a pair of rear wheels by an engine, and another pair of the pairs by an electric motor.

2. Description of the Prior Art

Conventionally, a driving force control system of the above-mentioned kind was proposed e.g. by Japanese Laid-Open Patent Publication (Kokai) No. 2000-79831. The front-and-rear wheel drive vehicle has front wheels thereof driven by an engine and rear wheels thereof driven by an electric motor. This driving force control system reduces the driving force for driving the front wheels for slip control, e.g. when the front wheels undergo a slip when the vehicle starts on a low-friction road surface, such as that of a snowy road. Further, under such a slip control of the front wheels, when it is determined e.g. from the vehicle speed that the vehicle is in a traveling condition in which the vehicle can move forward, the operation of the electric motor is inhibited, thereby saving electric energy of the vehicle.

The conventional driving force control system, however, simply inhibits the operation of the electric motor to thereby completely stop the assistance thereof, when it is determined during the slip control of the front wheels that the vehicle can move forward. Therefore, the total driving force for driving the vehicle tends to become short, and the slip of the front wheels is liable to be increased. Further, the determination as to whether the vehicle can move forward or not is carried out only by estimation based on the vehicle speed detected then, and therefore, depending on a subsequent operation of the accelerator pedal and the like, the slip of the front wheels can become excessively large, so that the front wheels cannot be maintained in an optimum slip condition, which makes it impossible to perverse traveling stability of the vehicle on a low-friction road surface.

Another driving force control system of the above-mentioned type was also proposed which causes the engine braking force to act on the front wheels and the braking torque caused by the electric motor to act on the rear wheels during a decelerating travel condition in which the accelerator pedal is released, to thereby brake the vehicle (e.g. Japanese Laid-Open Patent Publication No. 9-298802). In this case, the braking by the electric motor is carried out by producing a resisting force or drag force against the rotation of the rear wheels, during the decelerating travel of the vehicle.

According to the proposed driving force control system, however, when the decelerating travel is being carried out on a low-friction road surface, such as that of a snowy road, when a lateral force acts on the rear wheels by the user's operation of the steering wheel, the rear wheels can loose their grip on the road surface to skid sideways, and in worst cases, the vehicle undergoes a spin. This is because the larger the braking force (braking torque) of the electric motor applied to the rear wheels, the smaller the lateral grip of the rear wheels on the road surface, and the deceleration causes the center of the gravity of the vehicle to be shifted forward to cause the axle load distribution to be unevenly shifted forward, whereby the lateral grip of the rear wheels is further reduced to make the above problem more conspicuous.

Further, the present assignee has already proposed another driving force control system of the above-mentioned type e.g. by Japanese Patent Application No. 11-366934. A front-and-rear wheel drive vehicles incorporating this control system has its front wheels driven by an engine via a torque converter, and its rear wheels driven by an electric motor. In this driving force control system, the driving conditions for driving the rear wheels by the electric motor, i.e. the conditions for executing the four-wheel drive include one determined based on a speed ratio of the torque converter. More specifically, the control system is configured such that if the detected speed ratio of the torque converter is equal to or larger than a predetermined value, the electric motor is stopped to execute the two-wheel drive, whereas if the former is lower than the latter, the electric motor is operated to execute the four-wheel drive. For instance, when the vehicle is started, the speed ratio tends to be small and hence the torque amplification factor of the torque converter is high, which makes the vehicle more prone to slippage. Therefore, the control system causes the electric motor to be operated to drive the rear wheels to assist the driving of the vehicle by the rear wheels, thereby improving the startability of the vehicle. Further, when the vehicle is being accelerated by the driver stepping on the accelerator pedal, the sliding of the torque converter increases, so that the speed ratio of the same temporarily drops. In such a case as well, the assistance of driving of the vehicle by the rear wheels is carried out to thereby ensure excellent acceleration of the vehicle. It should be noted that in the four-wheel drive state, first, the total driving force required for driving the vehicle is determined, and the driving force of the electric motor is determined such that the maximum output therefrom is an upper limit value thereof, and the driving force of the engine is determined as a difference obtained by subtracting the driving force of the electric motor from the total driving force.

In this driving force control system, however, there is room for improvement, because a torque step can be produced during acceleration for the following reason: In this driving force control system, as described above, when the vehicle is accelerated, a decrease in the speed ratio of the torque converter is expected which is caused by sliding of the torque converter, and the assistance of the electric motor is started on condition that the speed ratio becomes lower than the predetermined value. However, the sliding of the torque converter does not occur instantly, but progressively increases, so that there is a time lag before the speed ratio actually decreases below the predetermined value, i.e. before the assistance of the electric motor is started. On the other hand, the total driving force continues to be increased in response to the demand for acceleration, and since the driving force of the electric motor remains set to 0, the driving force of the engine continues to be increased at the same ratio. As a result, when the speed ratio becomes lower than the predetermined value, a large driving force of the electric motor is suddenly generated, and the driving force of the engine suddenly drops by an extent equal to the large driving force of the electric motor. In this case, it is difficult to synchronize the generation of the driving force of the electric motor and the drop of the driving force of the engine, so that occurrence of a certain amount of torque step is inevitable. Particularly, when the vehicle is accelerated from a low-speed traveling condition, or from a decelerating condition, the total driving force is largely increased even when the accelerator pedal is stepped on by a small amount, and therefore, the above-mentioned problem tend to be conspicuous.

SUMMARY OF THE INVENTION

It is a first object of the invention to provide a driving force control system for a front-and-rear wheel drive vehicle, which is capable of properly controlling the driving force of an engine without inhibiting the assistance of an electric motor when drive wheels driven by the engine undergo a slip, such that an optimum slip condition of the drive wheels can be ensured even on a low-friction road surface, thereby making it possible to preserve traveling stability of the vehicle.

It is a second object of the invention to provide a driving force control system for a front-and-rear wheel drive vehicle, which enables rear wheels of the vehicle to have an appropriate lateral grip even when the driver operates the steering wheel when the vehicle is performing decelerating travel on a low-friction road surface or a downhill slope, thereby making it possible to preserve traveling stability of the-vehicle.

It is a third object of the invention to provide a driving force control system for a front-and-rear wheel drive vehicle that enables the assistance of an electric motor to be smoothly performed without developing a torque step when the vehicle is accelerated, thereby ensuring an excellent acceleration and drivability.

To attain the above first to third objects, the present invention provides a driving force control system for a front-and-rear wheel drive vehicle that drives one pair of respective pairs of front drive wheels and rear drive wheels by an engine, and another pair of the respective pairs by an electric motor, the driving force control system comprising:

vehicle speed-detecting means for detecting a vehicle speed of the vehicle;

driving force demand degree-detecting means for detecting a degree of demand for a driving force for driving the vehicle;

target driving force-calculating means for calculating a target driving force for driving the vehicle, based on at least the vehicle speed and the degree of demand for the driving force;

traveling condition-determining means for determining a present traveling condition of the vehicle; and driving force control means for controlling a driving force of the engine and a driving force of the electric motor based on the calculated target driving force, in dependence on the traveling condition of the vehicle determined by the traveling condition-determining means.

According to this driving force control system, a target driving force is calculated based on the detected vehicle speed and the degree of demand for a driving force for driving the vehicle, and the present traveling condition of the vehicle is determined. The driving force of the engine and that of the motor are controlled based on the calculated target driving force in dependence on the traveling condition of the vehicle. This makes it possible to ensure a stable travel, and an excellent acceleration and drivability.

Particularly to attain the first object, it is preferred that the driving force demand degree-detecting means comprises accelerator opening-detecting means for detecting an accelerator opening, the traveling condition-determining means including differential rotational speed-detecting means for detecting a differential rotational speed between a rotational speed of the front drive wheels and a rotational speed of the rear drive wheels based on a parameter indicative of the traveling condition of the vehicle, target differential rotational speed-setting means for setting a target differential rotational speed based on the parameter indicative of the traveling condition of the vehicle, and slip determination means for determining a slip condition of the one pair driven by the engine, based on the detected differential rotational speed and the target differential rotational speed, the driving force control means including target motor driving force-calculating means for calculating a target motor driving force of the electric motor based on the target driving force, target engine driving force-calculating means for calculating a target engine driving force of the engine based on the target driving force and the target motor driving force, motor drive control means for controlling driving of the electric motor based on the target motor driving force, engine drive control means for controlling driving of the engine based on the target engine driving force, and engine driving force-correcting means for decreasing the target engine driving force such that the differential rotational speed is held at the target differential rotational speed, when it is determined by the slip determination means that the one pair driven by the engine are slipping.

According to this preferred embodiment, based on the detected accelerator opening, the target driving force for driving the vehicle is calculated, and based on the target driving force, the target driving force of the electric motor is calculated. Further, based on the target driving force for driving the vehicle and the target driving force of the electric motor, the target driving force of the engine is calculated. Further, the differential rotational speed between the rotational speed of the front drive wheels and that of the rear drive wheels is detected, and a target differential rotational speed is set based on a parameter indicative of the traveling condition of the vehicle. Then, based on the detected differential rotational speed and the target differential rotational speed, a slip condition of the drive wheels driven by the engine is determined, and when it is determined that these drive wheels are slipping, the target engine driving force is decreased such that the differential rotational speed is held at the target differential rotational speed.

As described above, according to this preferred embodiment, whether or not the drive wheels driven by the engine are slipping is determined based on the actual differential rotational speed between the rotational speed of the front wheels and that of the rear wheels, and when the drive wheels driven by the engine are slipping, the driving force of the engine is decreased to hold the actual differential rotational speed at the target differential rotational speed. In other words, when the drive wheels driven by the engine undergo a slip, the driving force of the engine is properly controlled such that the differential rotational speed is held at the target differential rotational speed without stopping the assistance of the electric motor, so that even when the vehicle is running on a low-friction road surface, the drive wheels driven by the engine can be maintained at an optimum slip condition, whereby stable traveling can be ensured.

More preferably, the driving force control means further includes motor driving force-correcting means for increasing the target motor driving force when the slip determination means determines that the one pair driven by the engine are slipping.

According to this preferred embodiment, when the drive wheels driven by the engine are slipping, the target engine driving force is decreased and at the same time, the target motor driving force is increased whereby the differential rotational speed can be promptly converged to the target differential rotational speed.

More preferably, the traveling condition-determining means further includes differential rotational speed change amount-detecting means for detecting an amount of change in the differential rotational speed, and the engine driving force-correcting means decreases the target engine driving force according to the detected amount of change in the differential rotational speed.

According to this preferred embodiment, the target driving force of the engine is decreased when the drive wheels are slipping, according to the amount of change in the differential rotational speed, so that the convergence of the differential rotational speed to the target differential rotational speed can be enhanced.

For instance, the parameter indicative of the traveling condition of the vehicle includes at least one of a degree of a slope of a road, a steering angle, the vehicle speed, and the accelerator opening.

According to this preferred embodiment, it is possible to properly set the target differential rotational speed according to the actual traveling condition of the vehicle and the driver's intention.

Particularly to attain the second object, it is preferred that the vehicle includes an accelerator pedal, and a steering wheel, the driving force demand degree-detecting means including accelerator condition-detecting means for detecting whether or not the accelerator pedal is in a released condition, the traveling condition-determining means including downhill traveling-determining means for determining whether or not the vehicle is traveling downhill, and steering angle-detecting means for detecting an steering angle of the steering wheel, the driving force control means including target deceleration-setting means for setting a target deceleration based on the detected steering angle when the accelerator condition-detecting means detects that the accelerator pedal is in the released condition and at the same time the downhill traveling-determining means determines that the vehicle is traveling downhill, engine braking force-calculating means for calculating an engine braking force according to the detected vehicle speed when the accelerator condition-detecting means detects that the accelerator pedal is in the released condition, target braking force-setting means for setting a target braking force of the electric motor for braking the rear wheels, based on the set target deceleration and the calculated engine braking force, and drive control means for controlling driving of the electric motor based on the set target driving force.

According to this preferred embodiment, when the released condition of the accelerator pedal is detected and at the same time it is determined that the front-and-rear drive vehicle is traveling downhill, the target deceleration is set based on the detected steering angle, and when the released condition of the accelerator pedal is detected, the engine braking force is calculated based on the detected vehicle speed. Then, based on the set target deceleration and the calculated engine braking force, the target braking force of the electric motor for braking the vehicle is set. In this case, since the target braking force of the electric motor is set based on the target deceleration and the engine braking force, as the target deceleration, i.e. the deceleration of the whole vehicle is larger, the target braking force of the electric motor is set to a larger value. Then, based on the set target braking force, the driving of the electric motor is controlled. This makes it possible to set the target deceleration to an appropriate value responsive to the steering angle of the vehicle traveling downhill. Therefore, when the steering angle is turned through a larger steering angle, the target deceleration, i.e. the deceleration of the whole vehicle can be set to a smaller value, to thereby reduce the braking force applied to the rear wheels and accordingly prevent the biased distribution of the axle load toward the front wheel side. As a result of the reduced braking force applied to the rear wheels, and the prevention of the biased distribution of the axle load toward the front wheel side, it is possible to enhance the lateral grip of the rear wheels on the road surface and thereby positively control a skid of the vehicle even when the lateral force acts on the rear wheels through turning of the steering wheel during downhill traveling of the vehicle on a low-friction road surface. As a result, it is possible to ensure a stable traveling of the vehicle.

More preferably, the vehicle includes a brake, the traveling condition-determining means including brake operation-detecting means for detecting whether or not the brake is being operated, the driving force control means further including target deceleration-increasing means for correcting the set target deceleration such that the set target deceleration is increased to a larger value than assumed when the brake is not being operated, when the brake operation-detecting means detects that the brake is being operated.

According to this preferred embodiment, when the brake is being operated, the target deceleration is increased to a larger value than assumed when the brake is not being operated. That is, when the rear wheels are braked by the driver's operation of the brake, the target deceleration is made larger than when the driver is not carrying out the braking operation, whereby the braking force applied to the whole vehicle can be increased according to the driver's intention.

More preferably, the vehicle includes clutch means for disconnecting and connecting between the rear wheels and the electric motor, the driving force control means including clutch driving means for disconnecting the clutch means when the vehicle speed is higher than a predetermined vehicle speed, and disconnecting the clutch means when the vehicle speed is equal to or lower than the predetermined vehicle speed, and target deceleration-decreasing means for correcting the set target deceleration such that the set target deceleration is decreased to a smaller value than the target deceleration increased by the target deceleration-increasing means.

According to this preferred embodiment, the clutch means for disconnecting and connecting between the rear wheels and the electric motor is disconnected when the vehicle speed is larger than a predetermined vehicle speed, and connected when the same is equal to or lower than the predetermined vehicle speed. Further, when the clutch means is disconnected and at the same time the operation of the brake is detected, the target deceleration is reduced to a smaller value than the target deceleration increased by the correction. With reduction of the target deceleration, the braking force of the electric motor is set to a reduced value, so that when the clutch means is connected in response to a decrease of the vehicle speed to a predetermined value or lower, the small braking force of the electric motor is applied to the rear wheels. This can prevent a sudden application of a larger braking force of the electric motor to the rear wheels, to thereby prevent a braking shock or a slightly locked state of the wheels on a low-friction road surface.

Particularly to attain the second object, it is preferred that the vehicle include an accelerator pedal and a steering wheel, the driving force demand degree-detecting means including accelerator condition-detecting means for detecting whether or not the accelerator pedal is in a released condition, the traveling condition-determining means including steering angle-detecting means for detecting a steering angle of the steering wheel, the driving force control means including engine braking force-calculating means for calculating an engine braking force of the engine according to the detected vehicle speed when the accelerator condition-detecting means detects that the accelerator pedal is in the released condition, target braking force-setting means for setting a target braking force of the electric motor for braking the rear wheels to a value corresponding to the calculated engine braking force, target braking force-correcting means for correcting the set target braking force according to the detected steering angle, and drive control means for controlling driving of the electric motor based on the corrected target braking force.

In general, when the front-and-rear wheel drive vehicle is braked, the braking force of the front wheels and that of the rear wheels are set to respective values equal to each other, whereby the behavior of the vehicle becomes hard to get out of order but stable. Therefore, according to the preferred embodiment, when the released condition of the accelerator pedal is detected, the engine braking force is calculated according to the detected vehicle speed, and the target braking force of the electric motor is set to a value equal to the calculated engine braking force, whereby the behavior of the vehicle in decelerating travel by release of the accelerator pedal can be stabilized. Further, since the target braking force is corrected according to the detected steering angle, the target deceleration can be set to an appropriate value reflecting the steering angle of the vehicle assumed during the decelerating travel. This enables the braking force of the electric motor to be made smaller as the steering wheel is turned through a larger steering angle, whereby through the reduction of the braking force applied to the rear wheels and the prevention of the biased distribution of the axle load toward the front wheel side, the lateral grip of the rear wheels on the road surface can be enhanced. As a result, even when the vehicle is performing decelerating travel on a low-friction road surface, for instance, it is possible to positively suppress a skid of the rear wheels caused by the operation of the steering wheel. (It should be noted that "values equal to each other" is used to mean not only values quite identical to each other but also values in a substantially equal range.)

Particularly to attain the third object, it is preferred that the vehicle includes a torque converter, and is driven while switching between a four-wheel drive mode in which the one pair are driven by the engine via the torque converter and at the same time the another pair are driven by the electric motor and a two-wheel drive mode in which the driving of the another pair by the electric motor is inhibited, the driving force demand degree-detecting means including accelerator opening-detecting means for detecting an accelerator opening, the traveling condition-determining means including speed ratio-detecting means for detecting a speed ratio of the torque converter, reference speed ratio-storing means for storing a predetermined reference speed ratio, and speed ratio-determining means for determining whether or not the detected speed ratio is smaller than the predetermined reference speed ratio, the driving force control means including target motor driving force-calculating means for calculating a target motor driving force of the electric motor based on the target driving force, target engine driving force-calculating means for calculating a target engine driving force of the engine based on the target driving force and the target motor driving force, motor drive means for driving the electric motor based on the target motor driving force, and motor drive-permitting means for permitting the driving of the electric motor by the motor drive means when an amount of change in the target driving force is equal to or larger than a predetermined value, and when the amount of change in the target driving force is smaller than the predetermined value, permits the driving of the electric motor on condition that the speed ratio-determining means determines that the detected speed ratio is smaller than the predetermined reference speed ratio.

According to this preferred embodiment, based on the detected accelerator opening and vehicle speed, a target driving force for driving the vehicle is calculated, and based on the calculated target driving force, a target motor driving force of the electric motor is calculated. Further, based on the vehicle target driving force and the target motor driving force thus calculated, a target engine driving force is calculated. Based on the target motor driving force, the motor drive means drives the electric motor to drive the other pair of the drive wheels, the vehicle is driven in a four-wheel drive state in which the driving of the vehicle is assisted by the electric motor. Further, the speed ratio of the electric motor is detected and comparison between the detected speed ratio and a predetermined speed ratio is performed. Motor drive-permitting means permits the driving of the electric motor by the motor drive means when the amount of change in the calculated target driving force is equal to or larger than a predetermined value, whereas the driving of the electric motor is permitted on condition that the detected speed ratio is smaller than the predetermined reference speed ratio when the amount of change in the calculated target driving force is smaller than the predetermined reference value.

As described above, according to this preferred embodiment, the amount of change in the target driving force for driving the vehicle is equal to or larger than the predetermined value, the driving of the electric motor is permitted irrespective of the speed ratio of the torque converter, thereby enabling execution of the assisting mode for assisting the driving of the vehicle by the electric motor. Therefore, e.g. when the vehicle is accelerated from a low-speed or decelerating condition, the assistance of the electric motor is instantly started without waiting for the speed ratio of the torque converter to become lower than the predetermined reference speed ratio and hence without being influenced by the delay of a change in the speed ratio of the torque converter. Therefore, it is possible to start the assistance of the electric motor from a state in which the motor driving force is still small, and progressively increase the motor driving force, and progressively reduce the engine driving force according to the progressive increase in the motor driving force, whereby the assistance of the electric motor can be performed without developing a torque step.

On the other hand, if the amount of change in the target driving force is smaller than the predetermined value, i.e. influence on the torque step is small, the driving of the electric motor is permitted on condition the speed ratio of the torque converter is smaller than the reference speed ratio, whereby it is possible to properly perform the assistance of the electric motor according to the actual speed ratio. This makes it possible to ensure excellent acceleration and drivability.

Also, particularly to attain the third object, it is preferred that the vehicle includes a torque converter, and is driven while switching between a four-wheel drive mode in which the one pair are driven by the engine via the torque converter and at the same time the another pair are driven by the electric motor and a two-wheel drive mode in which the driving of the another pair by the electric motor is inhibited, the driving force demand degree-detecting means including an accelerator opening-detecting means for detecting an accelerator opening, the traveling condition-determining means including speed ratio-detecting means for detecting a speed ratio of the torque converter, reference speed ratio-storing means for storing a predetermined reference speed ratio, speed ratio-determining means for determining whether or not the detected speed ratio is larger than the predetermined reference speed ratio, and stepping operation-detecting means for detecting whether or not the accelerator pedal in the released condition is stepped on, during the traveling of the vehicle, the driving force control means including target motor driving force-calculating means for calculating a target motor driving force of the electric motor, motor drive means for driving the electric motor based on the calculated target motor driving force, and motor drive-permitting means for permitting the driving of the electric motor by the motor drive means when the stepping operation-detecting means detects that the accelerator pedal is stepped on, and when the stepping operation-detecting means does not detect that the accelerator pedal is stepped on, inhibits the driving of the electric motor on condition that the speed ratio-determining means determines that the detected speed ratio is smaller than the predetermined reference speed ratio.

According to this preferred embodiment, when it is detected whether or not the accelerator pedal in the released state is stepped during traveling of the vehicle. If such an operation of stepping on the accelerator pedal is detected, the driving of the electric motor is permitted, whereas if not, the driving of the electric motor is inhibited on condition that the speed ratio of the torque converter is larger than the predetermined reference speed ratio.

As described above, if the vehicle is accelerated by stepping on the accelerator pedal when the vehicle is in a decelerating condition in which the accelerator pedal is released, the driving of the electric motor is permitted irrespective of the speed ratio of the torque converter. In this case, the assistance of the electric motor can be started immediately after the start of the acceleration without being affected by the delay in a change in the speed ratio, and the motor driving force can be progressively increased starting with a small value. Therefore, the assistance of the electric motor can be smoothly performed without developing a torque step caused by the delay in a change in the speed ratio of the torque converter.

The above and other objects, features, and advantages of the invention will become more apparent from the following detailed description taken in conjunction with the accompanying drawings.

BRIEF DESCRIPTION OF THE DRAWINGS

FIG. 1 is a view schematically showing the whole arrangement of a front-and-rear wheel drive vehicle incorporating a driving force control system according to a first embodiment of the invention;

FIG. 28 is a timing chart showing changes in a final target rear-wheel braking force FCMD_FNL occurring when an electromagnetic clutch in a disconnected state is connected with a brake pedal being stepped on;

DETAILED DESCRIPTION OF THE PREFERRED EMBODIMENTS

Figure 2:
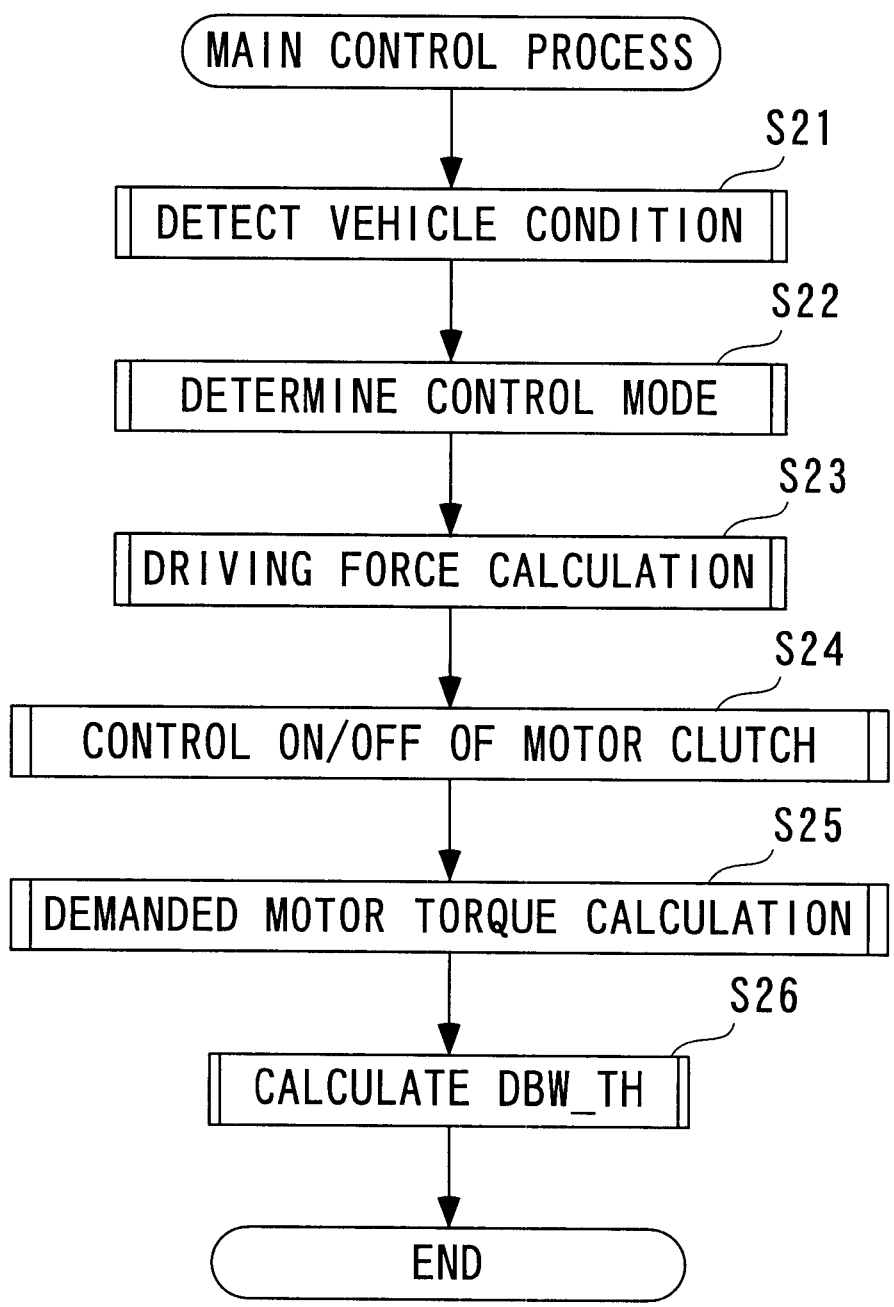
FIG. 2 is a flowchart of a main flow of a driving force control process.

The invention will now be described in detail with reference to the drawings showing preferred embodiments thereof.

FIG. 1 schematically shows the whole arrangement of a front-and-rear wheel drive vehicle (hereinafter simply referred to as "the vehicle") 2 incorporating a driving force control system 1 according to the invention. As shown in the figure, the vehicle 2 has left and right front wheels WFL, WFR (hereinafter generically referred to as "the WF") driven by an internal combustion engine 3 and left and right rear wheels WRL, WRR (hereinafter generically referred to as "the WR") driven by an electric motor (hereinafter simply referred to as "the motor") 4.

The engine 3 is transversely mounted in a front portion of the vehicle 2 and connected to the front wheels WF via an automatic transmission 5 having a torque converter 5a, and a front differential 6.

The motor 4 is connected to a battery 7 as a drive source therefor as well as to the rear wheels WR via an electromagnetic clutch 8 and a rear differential 9. As long as the motor 4 is driven by the battery 7 (drive mode) and at the same time the electromagnetic clutch 8 is connected to the motor 4, the rear wheels WR are driven by the motor 4, whereby the vehicle 2 is in a four-wheel drive state assisted by the motor 4. On the other hand, when the motor 4 is not driven by the battery 7, or when the electromagnetic clutch 8 is disconnected, the vehicle 2 is in a two-wheel drive state. It should be noted that the motor 4 is relatively small-sized, and the system is configured such that the electromagnetic clutch 8 is disconnected when the vehicle is in a high-speed drive state in which it is difficult for the motor 4 to rotate in a manner following up the rear wheels WR. The output of the motor 4 can be changed as required within a range up to 12 kW. The motor 4 also functions as a generator for generating electric power, when driven for rotation by a braking energy of the vehicle 2 (e.g. in a decelerating regeneration mode), to charge the battery 7 with the generated electric power (regenerative energy). A remaining charge SOC of the battery 7 is calculated based on detected current/voltage values of the battery 7, by an ECU 11 referred to hereinafter.

The motor 4 is connected to the ECU 11 via a motor driver 10. The motor driver 10 under the control of the ECU 11 controls switching of the motor 4 e.g. between the drive mode and the decelerating regeneration mode, setting of a maximum output of the motor 4, and a drive torque during the drive mode. Further, the motor driver 10 controls regeneration amount e.g. during the decelerating regeneration mode. The connection and disconnection of the electromagnetic clutch 8 is also controlled by the ECU 11 which controls supply and interruption of electric current to a solenoid, not shown, of the electromagnetic clutch 8.

The left and right front wheels WFL, WFR and the left and right rear wheels WRL, WRR are each provided with a wheel rotational speed sensor 12 of a magnetic pickup type, from which pulse signals indicative of sensed rotational speeds N_FL, N_FR, N_RL, N_RR of the respective wheels are delivered to the ECU 11. The ECU 11 calculates an average value N_Fwheel of left and right front wheel rotational speeds, an average value of N_Rwheel of left and right rear wheel rotational speeds, a vehicle speed Vcar, and so forth from the pulse signals.

The engine 3 has a crankshaft, not shown, to which is mounted a crank angle position sensor 13 which delivers to the ECU 11 a crank pulse signal CRK whenever the crankshaft rotates through a predetermined angle. Further, mounted to a mainshaft 5b of an automatic transmission 5 and a countershaft, not shown, of the same are a mainshaft rotational speed sensor 14a of a magnetic pickup type and a countershaft rotational speed sensor 14b of the same type, respectively. The two sensors 14a, 14b also output to the ECU 11 respective pulse signals indicative of a sensed rotational speed Nm of the mainshaft 5b and a rotational speed Ncounter of the countershaft. The ECU 11 calculates an engine rotational speed NE based on the crank pulse signal CRK, and then calculates a speed ratio ETR of a torque converter 5a from the engine rotational speed NE and the mainshaft rotational speed Nm (ETR=Nm/NE). Further, a motor rotational speed sensor 15 formed by a resolver is mounted to the motor 4 to output a pulse signal indicative of a sensed rotational speed Nmot of the motor 4. This signal is also delivered to the ECU 11.

Further, the ECU 11 receives a signal indicative of a sensed degree of opening (accelerator pedal opening) θAP including ON/OFF (stepped-on/released) states of the accelerator pedal 17 from an accelerator pedal opening sensor 16, and a signal indicative of a remaining charge SOC stored in the battery 7 from a charge amount sensor 18. Still further, the ECU 11 is supplied with a signal indicative of a sensed braking pressure PBR from a braking pressure sensor 19 mounted to a master cylinder of a brake 30, a signal indicative of a sensed steering angle θSTR of a steering wheel 31 from a steering angle sensor 20, a signal indicative of a sensed shift lever position POSI of the automatic transmission 5 from a shift position sensor 21, and signals indicative of sensed accelerations GF, GR of the respective front and rear wheels WF, WR from acceleration sensors 22, 23.

The ECU 11 is formed or implemented by a microcomputer including a RAM, a ROM, a CPU, and an I/O interface, none of which are shown. The ECU 11 detects a traveling condition of the vehicle 2 based on the signals from the above various sensors, and determines a control mode. Further, the ECU 11 calculates a target driving force FCMD for driving the vehicle 2, a target front-wheel driving force FCMD_ENG for driving the front wheels WF, and a target rear-wheel driving force FCMD_MOT for driving the rear wheels WR, based on the results of the detection and determination. Then, a drive signal DBW_TH based on the calculated target front-wheel driving force FCMD_ENG is delivered to an actuator 24 of a DBW (drive-by-wire) type, whereby an opening degree of the throttle valve 25 (hereinafter referred to as "the throttle valve opening θTH") is controlled to control the driving force of the engine 3. On the other hand, a signal indicative of a demanded motor torque TRQ_MOT based on the calculated target rear-wheel driving force FCMD_MOT is delivered to the motor driver 10 to thereby control the driving force of the motor 4.

FIG. 2 shows a main flow of a control process executed by the ECU 11. This program is carried out at predetermined time intervals (e.g. 10 ms). In this control process, first, operating conditions of the vehicle 2 are detected at a step S21. More specifically, parameter signals detected by the aforementioned sensors are read in, and based on the parameter signals, predetermined arithmetic operations, such as calculations of the vehicle speed Vcar and estimation of a slope angle SLOPE_ANG, are carried out, and at the same time, it is determined which traveling condition of forward traveling, reverse traveling, and stoppage the vehicle 2 is now in. Further, based on vehicle speed pulse signals from the wheel speed sensors 12 and the like, a differential front-rear rotational speed N_SPLT_Wheel and a target front-rear wheel differential rotational speed DN_F_R are calculated as described hereinafter, and a slip condition of the front wheels WFL, WFR is determined based on these calculated speeds. Further, the output characteristics of the motor 4 are calculated based on results of the determination.

Then, at a step S22, the present control mode of the vehicle 2 is determined based on the shift lever position POSI of the automatic transmission 5, the ON/OFF state of the accelerator pedal (hereinafter referred to as "the AP") 17, and the traveling condition of the vehicle 2, which were detected at the step S21. More specifically, if the vehicle 2 is in the forward traveling condition or in the reverse traveling condition with the AP 17 in its ON state, it is determined that the control mode is a forward drive mode or a reverse drive mode (these two modes are hereinafter generically referred to as "the drive mode"), whereas if the vehicle 2 is in the forward traveling condition or in the reverse traveling condition with the AP 17 in its OFF state, it is determined that the control mode is a forward decelerating regeneration mode or a reverse decelerating regeneration mode (these two modes are hereinafter generically referred to as "the decelerating regeneration mode"). Further, if the vehicle 2 is in stoppage, the control mode is determined as a stoppage mode. When the control mode is the decelerating regeneration mode, basically, the battery 7 is charged by utilizing the regenerative braking torque.

At the following step S23, the target driving force FCMD for driving the whole vehicle 2, the target driving force FCMD_ENG for driving the front wheels, and the target driving force FCMD_MOT for driving the rear wheels are calculated in dependence on the control mode determined at the step S22. This step will be described in detail hereinafter.

Then, ON/OFF control of the electromagnetic clutch 8 is executed at a step S24. More specifically, it is determined, based on the vehicle speed Vcar and a differential rotational speed between the motor 4 and the rear wheels WR, whether the electromagnetic clutch 8 is to be turned on or off, and then the electromagnetic clutch 8 is turned on or off based on a result of the determination.

Then, at a step S25, the demanded motor torque TRQ_MOT demanded of the motor 4 is calculated based on the target rear-wheel driving force FCMD_MOT calculated at the step S23 and the ON or OFF state of the electromagnetic clutch 8 controlled at the step S24, and thereafter a drive signal generated based on the calculated demanded motor torque TRQ_MOT is delivered to the motor driver 10 to control the driving force of the motor 4.

Next, at a step S26, an actuator output value DBW_TH is calculated, based on the target front-wheel driving force FCMD_ENG calculated at the step S23, and the drive signal generated based on the calculated value actuator output value DBW_TH is delivered to the actuator 24 to control the throttle valve opening θTH, whereby the driving force of the engine 3 is controlled, followed by terminating the program.

Figure 3:
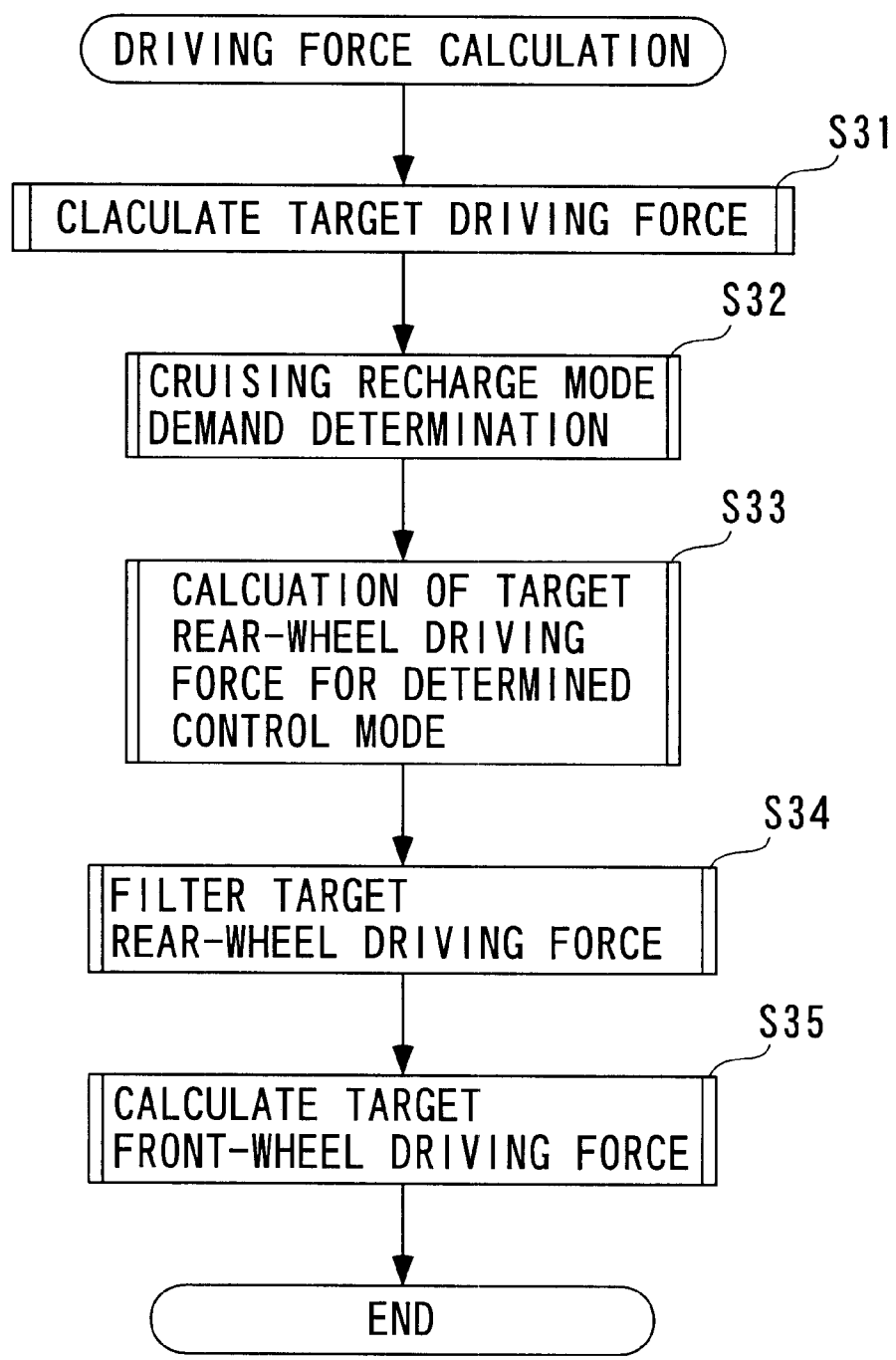
FIG. 3 is a flowchart of a subroutine for a driving force-calculating process.

FIG. 3 shows a subroutine for carrying out the driving force-calculating process which is executed at the step S23 in FIG. 2. In this control process, first at a step S31, the target driving force FCMD for the whole vehicle 2 is calculated in dependence on the control mode determined at the step S22.

Figure 4:
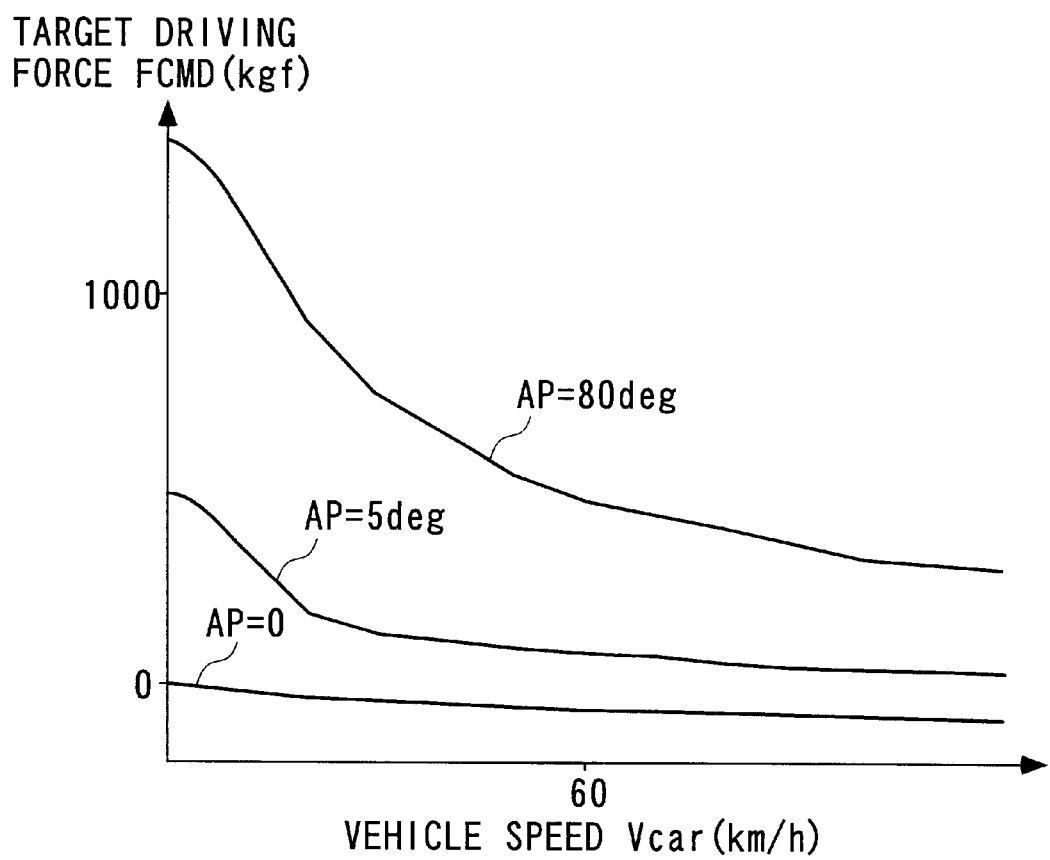
FIG. 4 is a diagram showing an example of an FCMD table.

During the drive mode, the target driving force FCMD is calculated or determined by looking up a table an example of which is shown in FIG. 4, according to the detected vehicle speed Vcar and AP opening θAP. In FIG. 4, there are shown typical table values obtained, respectively, when the AP opening θAP is equal to 0 degrees, 5 degrees, and 80 degrees. The table is configured such that the target driving force FCMD becomes larger with an increase in the AP opening θAP, and becomes smaller with an increase in the vehicle speed Vcar. It should be noted that a line designated by the AP opening θAP of 0 degrees represents table values corresponding to the shift lever position of D4. In this case, the target driving force FCMD is calculated as a negative value.

During the decelerating regeneration mode, the target driving force FCMD is determined by calculation based on the vehicle speed Vcar, the amount of change in the vehicle speed Vcar, the braking pressure PBR, the steering angle θSTR, and the connection state (ON/OFF) of the electromagnetic clutch 8.

Then, it is determined at a step S32 if a cruising recharge mode is demanded. More specifically, a reference driving force is calculated based on the vehicle speed Vcar and the remaining charge SOC of the battery 7, and it is determined from the relationship between the reference driving force and the target driving force FCMD calculated at the step S31 whether or not the vehicle 2 is in a cruising condition under which the battery 7 is to be charged. If the answer to the question is affirmative (YES), the control mode is set to the cruising recharge mode to charge the battery 7.

At the following step S33, the target rear-wheel driving force FCMD_MOT is calculated. This calculation is performed in a manner dependent on the control mode (according to one of the drive mode, the decelerating regeneration mode, the cruising recharge mode, and the stoppage mode) determined at the step S22 in FIG. 2 and the above step S32. For instance, when the vehicle is started, the target rear-wheel driving force FCMD_MOT for the drive mode (in which the driving force is assisted by the motor) is calculated as follows: First, the distribution of the driving force between the front pair and the rear pair of wheels is calculated based on the distribution of the whole vehicle weight during the stoppage of the vehicle (e.g. 57% of the whole vehicle weight on the front wheels, and 43% of the same on the rear wheels) and the slope angle (SLOPE_ANG). The slope angle SLOPE_ANG is calculated, on condition that the rotational speeds N_FL, N_FR of the front wheels and the rotational speeds N_RL, N_RR of the rear wheels are all equal to 0, and at the same time the brake pedal is being operated, by integrating the outputs from the front and rear acceleration sensors 22, 23, by using the following equation (1):

Slope angle SLOPE_ANG (degrees)=integrated values of outputs from the front and rear wheel sensors/integrating time×180/π(1)

Then, the target rear-wheel driving force FCMD_MOT for the drive mode is calculated by using the following equation (2):

Target rear-wheel driving force FCMD_MOT=target driving force FCMD (for the drive mode)×rear-wheel distribution of the driving force+motor drag torque (2)

In the equation, the motor drag torque represents a resistance of the motor to rotation of the rear wheels. Further, if the calculated rear-wheel driving force FCMD_MOT exceeds an upper limit torque defined by the maximum output of the motor 4, the target rear-wheel driving force FCMD_MOT is set to the upper limit torque.

Then, the program proceeds to a step S34, wherein a predetermined filtering process is carried out on the target rear-wheel driving force FCMD_MOT calculated at the step S33, and then at a step S35, the target front-wheel driving force FCMD_ENG is calculated, followed by terminating the program. As will be described in detail hereinafter, the target front-wheel driving force FCMD_ENG is calculated basically by subtracting the target rear-wheel driving force FCMD_MOT from the target driving force FCMD. Further, when the front wheels are slipping, the target front-wheel driving force FCMD_ENG is decreased based on the actual differential rotational speed between the front and rear wheels, the target front-rear wheel differential rotational speed DN_F_R, etc. by feedback control as described hereinafter.

Figure 5:
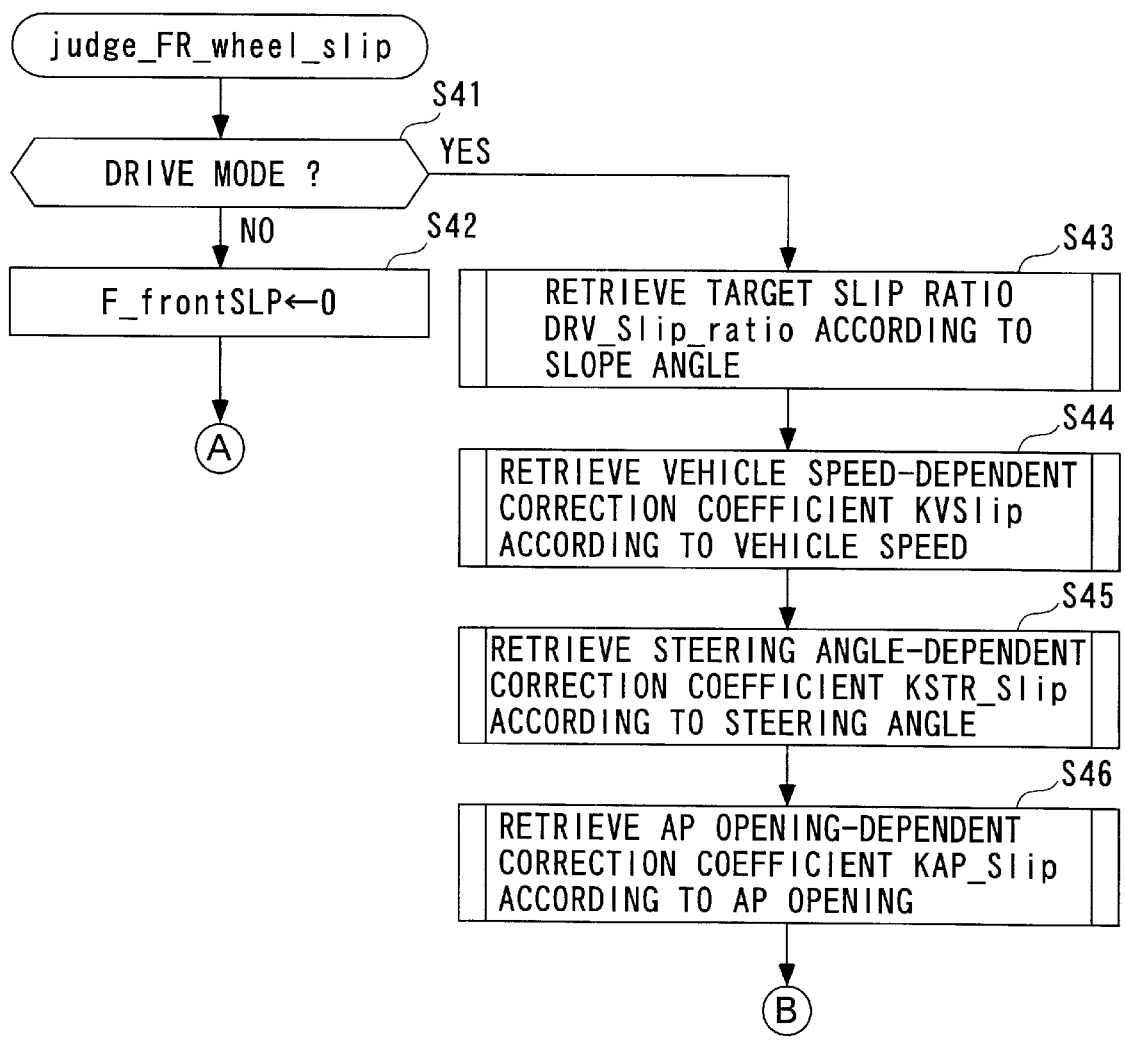
FIG. 5 is a flowchart of a subroutine for a front wheel slip-determining process.
Figure 6:
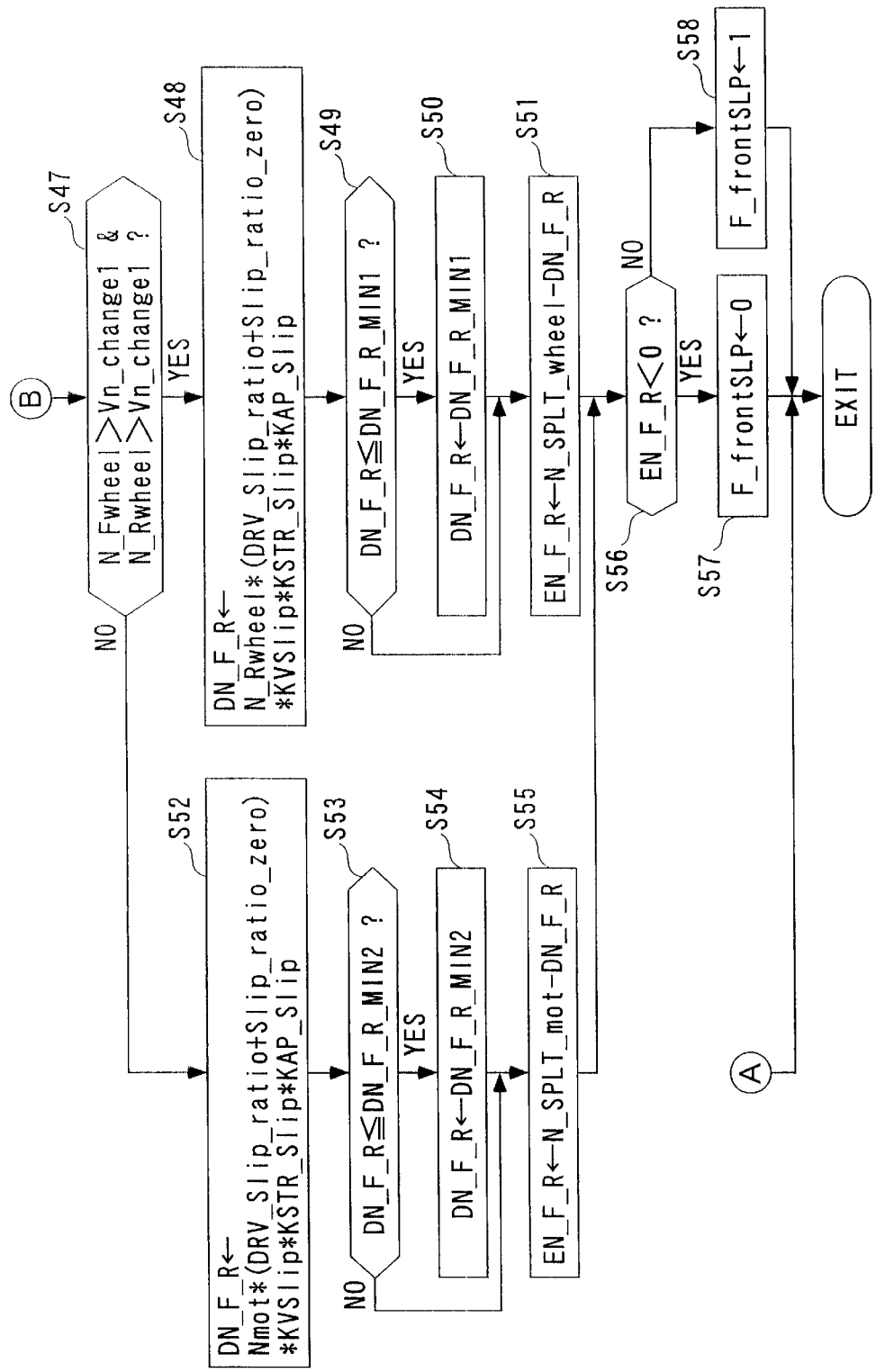
FIG. 6 is a continuation of the FIG. 5 flowchart.

FIGS. 5 and 6 show a subroutine for determining whether the front wheels are slipping, which is executed at the step S21 in FIG. 2. In this control process, first, it is determined at a step S41 whether or not the control mode of the vehicle 2 is the drive mode. If the answer to this question is negative (NO), i.e. if the control mode is other than the drive mode, a front-wheel slip flag F_frontSLP is set to 0 at a step S42, followed by terminating the program.

If the answer to the question of the step S41 is affirmative (YES), i.e. if the control mode is the drive mode, at the following steps S43 to 46, parameters for setting the target front-rear wheel differential rotational speed DN_F_R between the front and rear wheels are determined by looking up respective tables. Among these parameters, a target slip ratio DRV_Slip_ratio is a basic value of the target front-rear wheel differential rotational speed DN_F_R, and the other parameters are correction coefficients for multiplying the target slip ratio DRV_Slip_ratio thereby.

Figure 7:
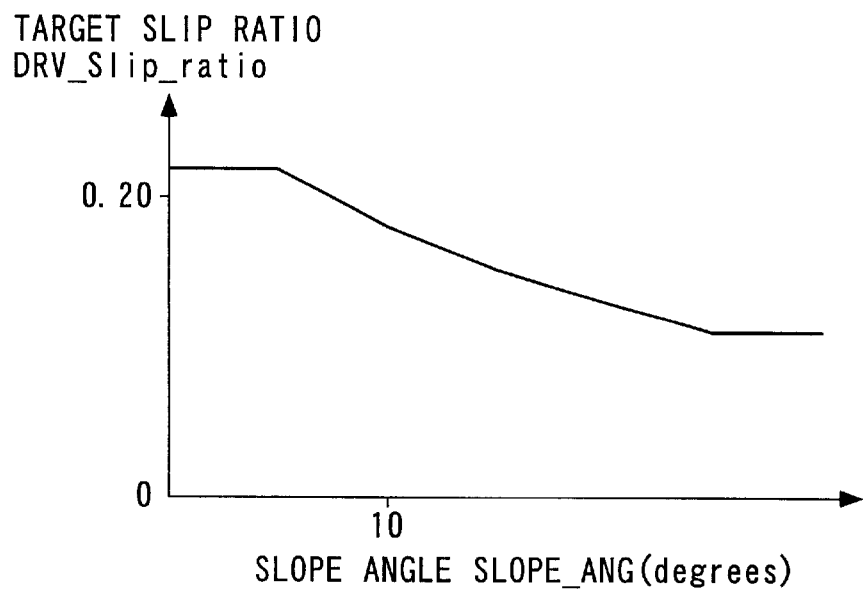
FIG. 7 is a diagram showing an example of a target slip ratio table.

First, at a step S43, the target slip ratio DRV_Slip$_{13}$ ratio is looked up according to the slope angle SLOPE_ANG. FIG. 7 shows an example of a target slip ratio table, and the table is configured such that the target slip ratio DRV_Slip_ratio assumes a smaller value as the slope angle SLOPE_ANG is larger, when the slope angle SLOPE_ANG is within a range of 5 degrees to 25 degrees. This is because as the slope becomes steeper, a larger portion of the weight of the vehicle 2 is applied to the rear wheels WRL, WRR, to make the front wheels WFL, WFR prone to slip, and therefore, the target slip ratio DRV_Slip_ratio is set to a smaller value to thereby prevent slippage of the front wheels WFL, WFR, at an early stage, thereby making it easier for the vehicle 2 to climb up the slope.

Figure 8:
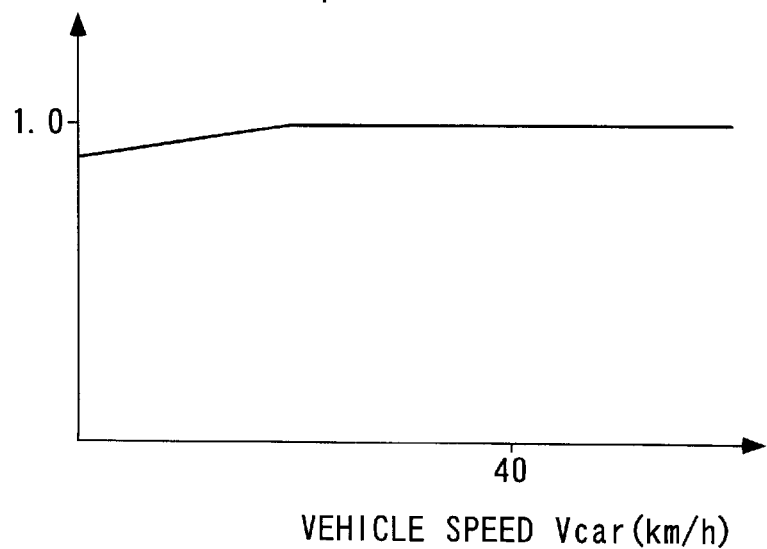
FIG. 8 is a diagram showing an example of a vehicle speed-dependent correction coefficient table.

Next, a vehicle speed-dependent correction coefficient KVSlip is retrieved according to the vehicle speed Vcar at a step S44. FIG. 8 shows an example of a vehicle speed-dependent correction coefficient table. This table is configures such that the vehicle speed-dependent correction coefficient KVSlip is set to 1.0 when the vehicle speed Vcar is equal to or higher than a predetermined low vehicle speed, and assumes a smaller value, which is smaller than 1.0, as the vehicle speed is smaller than the predetermined low vehicle speed. This is because at the start of the vehicle 2 in which the vehicle speed Vcar is small, the target front-rear wheel differential rotational speed DN_F_R is decreased to suppress occurrence of the slip of the front wheels, whereas after the vehicle speed Vcar has increased, the decrease of the target front-rear wheel differential rotational speed DN_F_R is stopped since some amount of slip can be allowed and the vehicle 2 is already running, so as to follow the user's intention.

Figure 9:
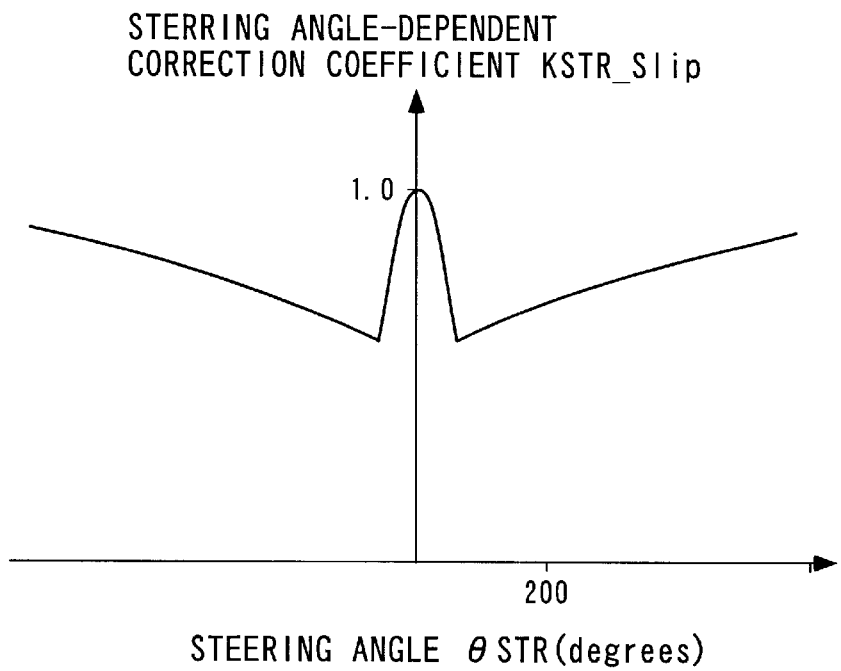
FIG. 9 is a diagram showing an example of a steering angle-dependent correction coefficient table.

Next, a steering angle-dependent correction coefficient KSTR_Slip is retrieved according to the steering angle θSTR at a step S45. FIG. 9 shows an example of a steering angle-dependent correction table. This table is configured such that the steering angle-dependent correction coefficient KSTR_Slip is set to 1.0 when the steering angle θSTR is equal to 0, and when the same is in a range up to a predetermined low steering angle, the correction coefficient KSTR_Slip assumes a smaller value as the steering angle θSTR is larger. The reason for this configuration of the table is as follows: When the vehicle 2 is running straightforward, some amount of slip can be allowed. However, when the steering wheel 31 is moved, if a slip occurs, lateral grip of the tires on the road surface is reduced, and so as to eliminate this inconvenience, the target front-rear wheel differential rotational speed DN_F_R is reduced to secure the lateral grip of the tires. Further, the table is configured such that the steering angle-dependent correction coefficient KSTR_Slip is progressively increased as the steering angle θSTR is equal to or larger than the predetermined low steering angle. This is because such a large value of the steering angle θSTR is presumed to be detected not when the driver causes the tires to grip the road surface e.g. of a snowy road, but rather when he intentionally moves the steering wheel 31 through a large angle, and therefore, the correction coefficient is increased or made closer to 1.0 so as to follow the driver's intention.

Figure 10:
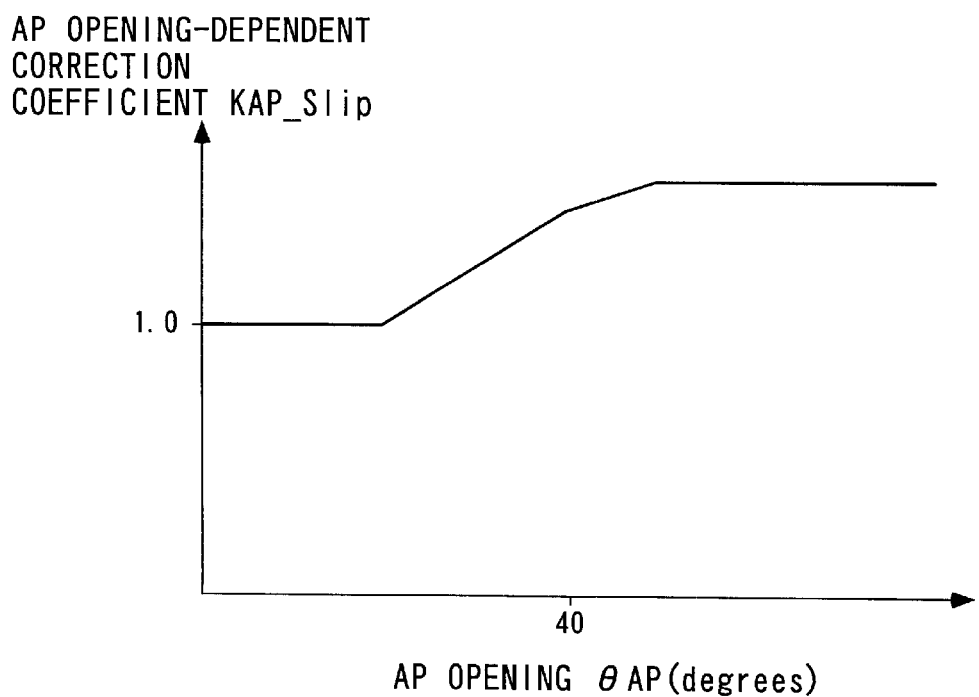
FIG. 10 is a diagram showing an example of an AP opening-dependent correction coefficient table.

Next, an AP opening-dependent correction coefficient KAP_Slip is retrieved according to the AP opening θAP at a step S46. FIG. 10 shows an example of an AP opening-dependent correction coefficient table. This table is configured such that when the AP opening θAP is equal to or lower than 20 degrees, the AP opening-dependent correction coefficient KAP_Slip is set to 1.0, when the former is within a range of 20 degrees to 50 degrees, the latter is progressively increased as the former is increased, and when the former is equal to or larger than 50 degrees, the latter is set to a predetermined value which is larger than 1.0. This is because when the AP opening θAP is large, it is presumed that the driver intentionally allows the slip to occur, and therefore the target front-rear wheel differential rotational speed DN_F_R is increased to follow the driver's intention.

Next, the program proceeds to a step S47 in FIG. 6, wherein it is determined whether or not all of the average left-right front-wheel rotational speed N_Fwheel (i.e. average value of the left and right front wheel rotational speeds) and the average left-right rear-wheel rotational speed N_Rwheel (i.e. average value of the left and right rear wheel rotational speeds) are larger than a first changeover rotational speed Vn_changel (equivalent to a vehicle speed of e.g. 10 km/h). This determination is carried out to switch the parameter for use in calculation of the differential front-rear rotational speed to be executed next between parameters of a wheel pulse-based type detected by the wheel rotational speed sensors 12 and parameters of a motor rotation pulse-based type detected by the countershaft rotational speed sensor 14b and the motor rotational speed sensor 15. This is because these sensors 12, 14, 15 are all of a magnetic pick-up type, and hence they cannot detect rotational speeds with accuracy when the rotational speeds to be detected are within respective low-speed ranges, and therefore, when the vehicle speed Vcar is small, the parameters of the motor rotation pulse-based type are used which indicate higher rotational speeds before being subjected to gear reduction, whereas when the vehicle speed Vcar is high, the parameters of the wheel pulse-based type are used which are identical to each other in input repetition period, to thereby enhance the accuracy of detection of the differential rotational speed. It should be note that when the parameters of the motor rotation pulse-based type are used, the countershaft rotational speed Ncounter and the motor rotational speed Nmot are converted to wheel rotational speeds according to the respective reduction gear ratios.

Therefore, if the answer to the step S47 is affirmative (YES), i.e. if the N_Fwheel value and N_Rwheel value are both larger than the first changeover rotational speed Vn_changel, the average left-right rear-wheel rotational speed N_Rwheel is used as the rear-wheel rotational speed, and at the same time, by using the parameters determined at the steps S43 to s46, the target front-rear wheel differential rotational speed DN_F_R is calculated by using the following equation (3):

$$DN\_F\_R = N\_Rwheel(DRV\_Slip\_ratio + Slip\_ratio\_zero) \; KVS\_lip \; KSTR\_Slip \; KAP\_Slip \quad (3)$$

Here, Slip_ratio_zero is a rear wheel slip ratio zero adjustment value for compensation for a difference between the diameter of front wheels and that of rear wheels and the like, and is detected when the vehicle is started and stored in the ECU 11.

Next, it is determined at a step S49 whether or not the target front-rear wheel differential rotational speed DN_F_R calculated at the step S48 is equal to or lower than a first lower limit value DN_F_R—MIN1 (equivalent to a vehicle speed of e.g. 1 km/h). If the answer to this question is affirmative (YES), the target front-rear wheel differential rotational speed DN_F_R is set to the first lower limit value DN_F_R_MIN1 at a step S50, whereas if the answer is negative (NO), the step S50 is skipped to maintain the target front-rear wheel differential rotational speed DN_F_R, followed by the program proceeding to a step S51.

At the step S51, the difference between an actual differential front-rear rotational speed N_SPLT_wheel and the target front-rear wheel differential rotational speed DN_F_R (N_SPLT_wheel—DN_F_R) is calculated as an actual/target differential rotational speed difference EN_F_R, and then the program proceeds to a step S56, referred to hereinafter. The actual front-rear wheel differential rotational speed N_SPTL_wheel is a difference between the average left-right front-wheel rotational speed N_Fwheel and the average left-right rear-wheel rotational speed N_Rwheel (=N_Fwheel−N_Rwheel).

On the other hand, if the answer to the question of the step S47 is negative (NO), i.e. if any of the N_Fwheel value or the N_Rwheel value is equal to or smaller than the first changeover rotational speed Vn_changel, the parameters of the motor rotation pulse-based type are used to perform calculations similar to those carried out at the steps S48 to S51. First, in the above equation (3), as the rear-wheel rotational speed, the motor rotational speed Nmot is used in place of the average left-right rear-wheel rotational speed N_Rwheel, to thereby calculate the target front-rear rotational speed DN_F_R at a step S52. Then, it is determined at a step S53 whether or not the calculated target front-rear wheel differential rotational speed DN_F_R is equal to or lower than a second lower limit value DN_F_R_MIN2 (equivalent to a vehicle speed of e.g. 3 km/h) which is larger than the aforementioned DN_F_R_MIN1.

If the answer to this question is affirmative (YES), the target front-rear wheel differential rotational speed DN_F_R is set to the second lower limit value DN_F_R_MIN2 at a step s54, whereas if the answer is negative (NO), the step S54 is skipped to maintain the target front-rear wheel differential rotational speed DN_F_R. Next, the difference (N_SPLT_mot—DN_F_R) between the N_SPLT_mot value used as the actual front-rear wheel differential rotational speed and the target front-rear wheel differential rotational speed DN_F_R is calculated as the actual/target front-rear wheel differential rotational speed difference EN_F_R, followed by the program proceeding to the step S56. The actual front-rear wheel differential rotational speed N_SPT_mot is a difference (Ncounter−Nmot) between the countershaft rotational speed Ncounter and the motor rotational speed Nmot.

Then, at the step S56, it is determined whether or not the actual/target front-rear wheel differential rotational speed difference EN_F_R calculated at the step S51 or S55 is smaller than 0. If the answer to this question is affirmative (YES), i.e. if EN_F_R<0 holds, which means that the actual front-rear wheel differential rotational speed (N_SPT_wheel or N_SPT_mot) is smaller than the target front-rear wheel differential rotational speed DN_F_R, it is determined that the front wheels are not slipping, and hence a front wheel slip flag F_front is set to 0 at a step S57, followed by terminating the present program.

On the other hand, if the answer to the question of the step S56 is negative (NO), i.e. if EN_F_R≧0 holds, which means the actual front-rear wheel differential rotational speed difference is equal to or larger than the target front-rear wheel differential rotational speed DN_F_R, it is determined that the front wheels are slipping, and hence the front wheel slip flag F_front is set to 1 at a step S58, followed by terminating the present program.

If the slippage of the front wheels is thus detected, the maximum output power of the motor 4 is increased from 4 kW to 8 kW, and at the same time, the drive mode is started in which the rear wheels WRL, WRR are driven by the motor 4 (the driving of the vehicle is assisted by the motor 4). Further, as will be described hereinafter, the target front-wheel driving force FCMD_ENG is decreased by feedback control based on the actual front-rear wheel differential rotational speed and the target front-rear wheel differential rotational speed DN_F_R.

Figure 11:
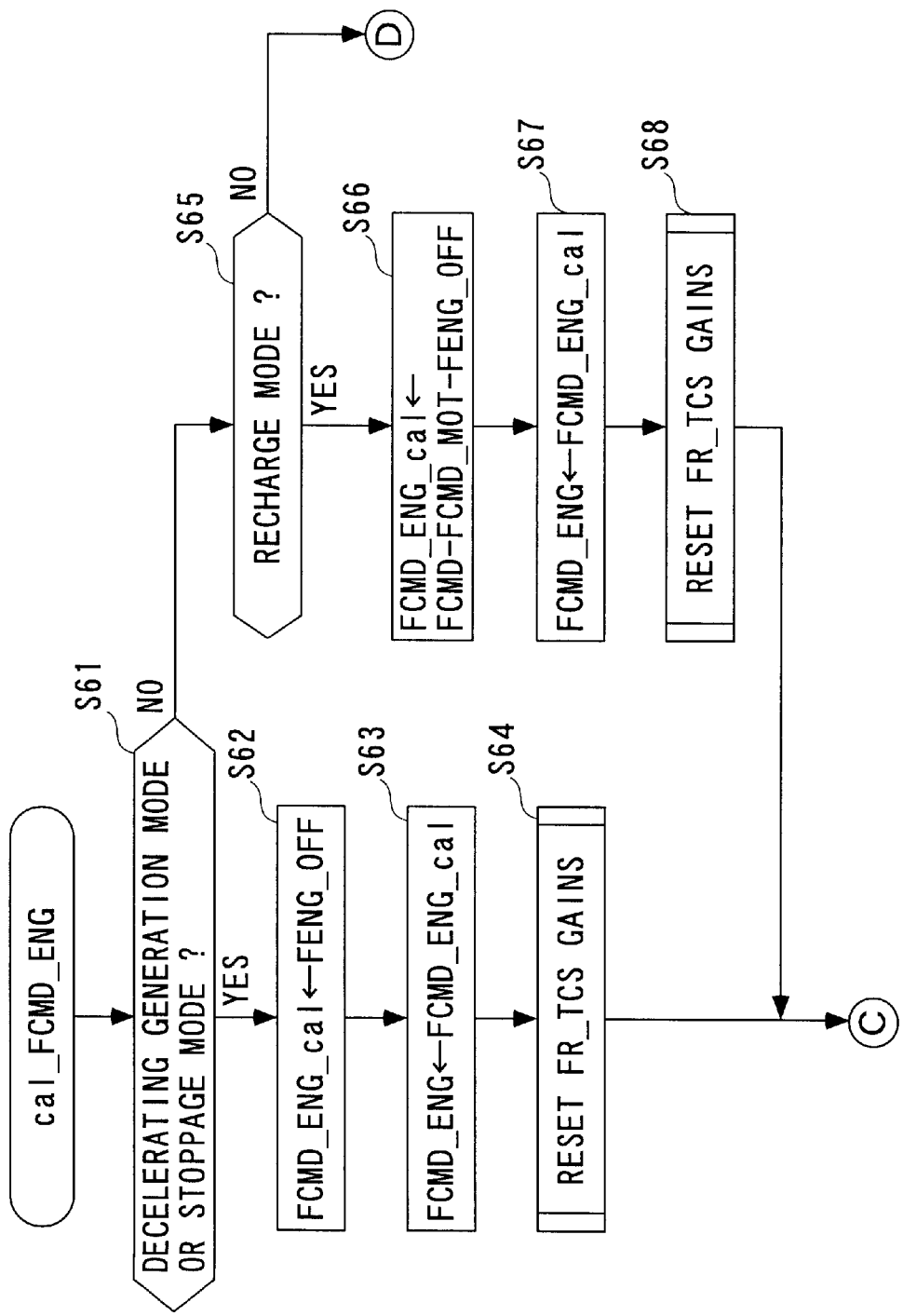
FIG. 11 is a flowchart of a target front-wheel driving force-calculating subroutine.
Figure 12:
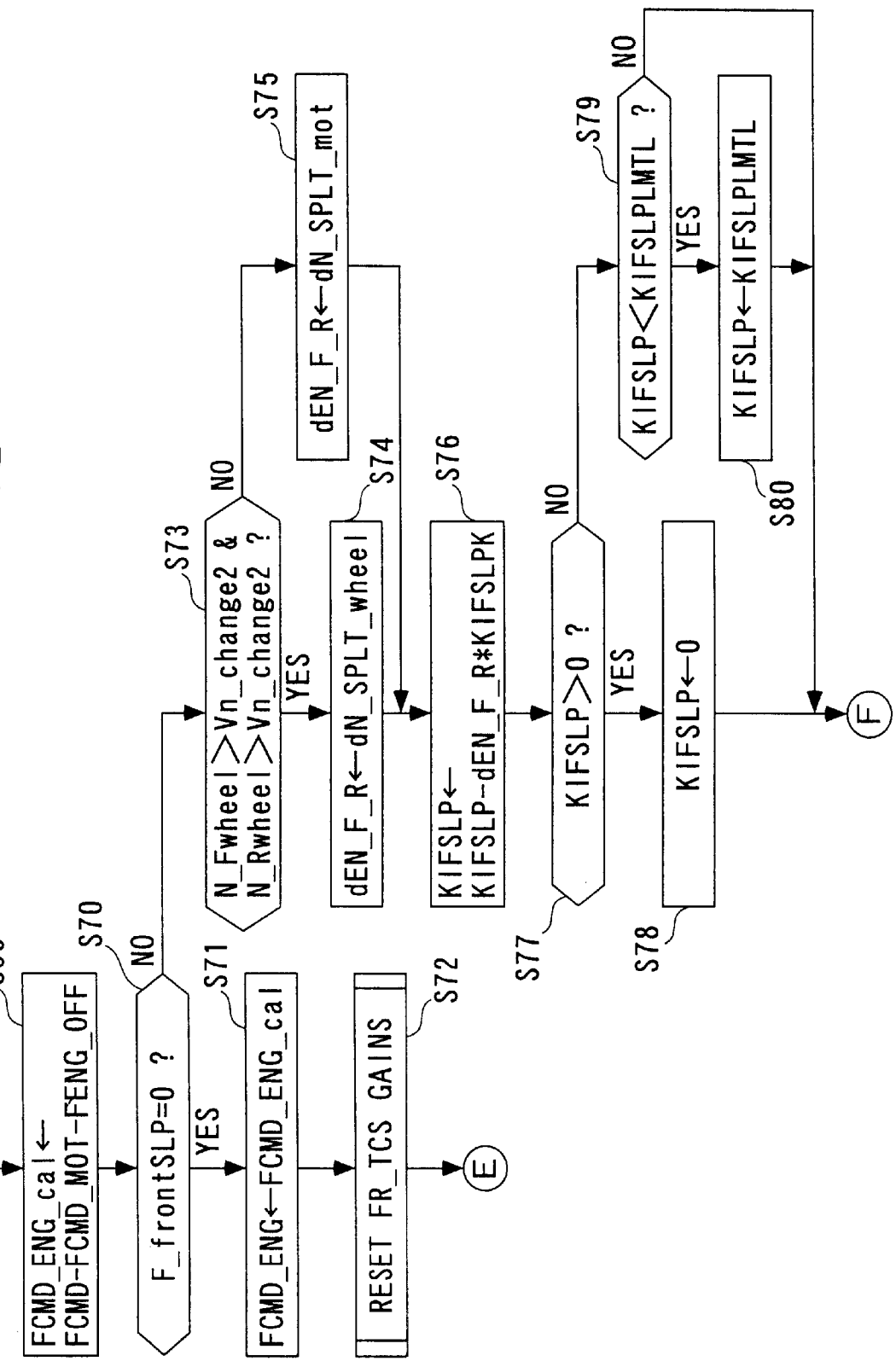
FIG. 12 is a continuation of the flowchart in FIG. 11.
Figure 13:
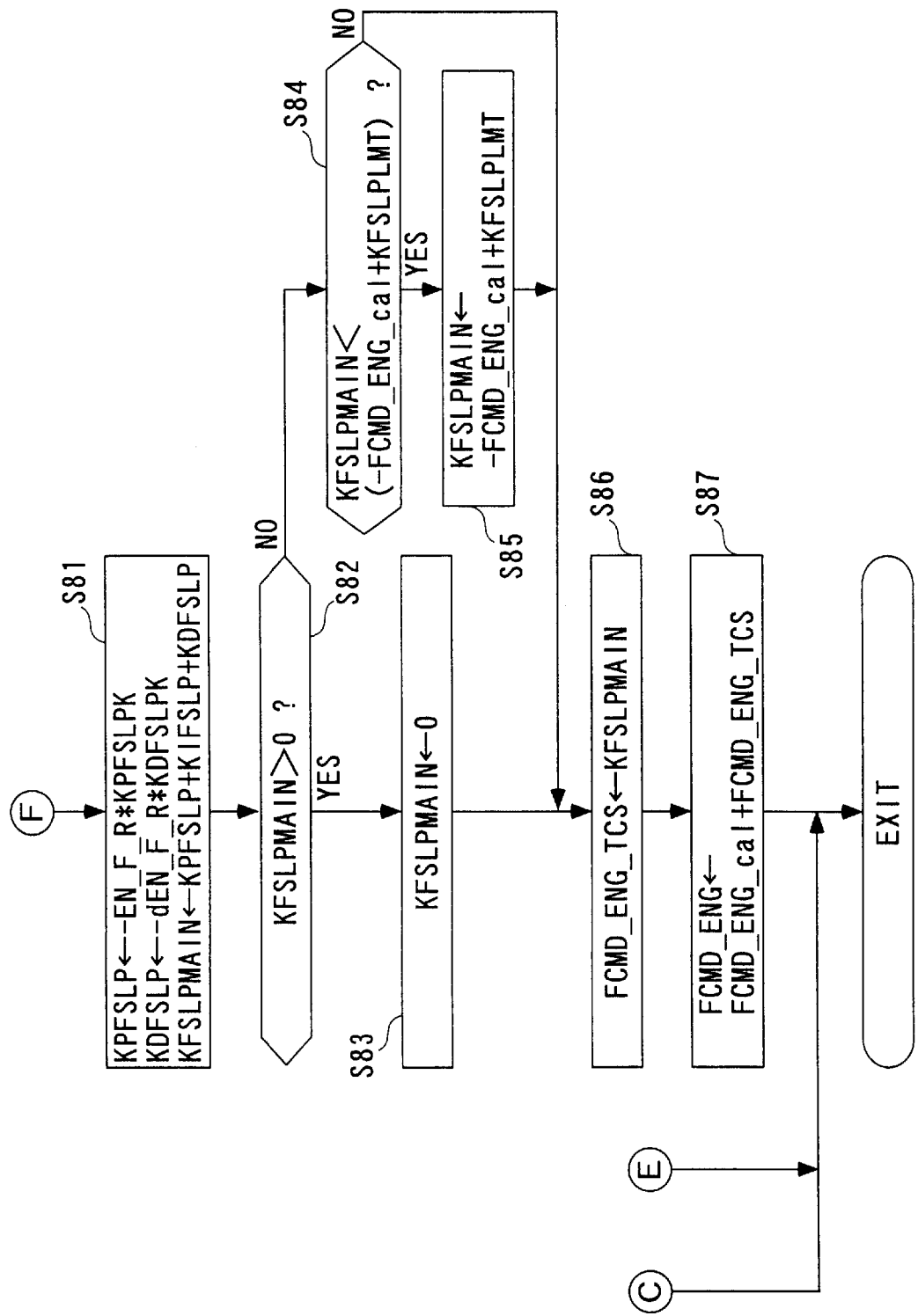
FIG. 13 is a continuation of the flowchart in FIGS. 11 and 12.

FIGS. 11 to 13 show a subroutine executed at the step S35 in FIG. 3, for calculating the target front-wheel driving force FCMD_ENG. In this control process, it is first determined at a step S61 whether or not the control mode of the vehicle 2 is the decelerating regeneration mode or the stoppage mode. If the answer to this question is affirmative (YES), a target front-wheel driving force calculation value FCMD_ENG_cal is set to an engine drag torque FENG_OFF (corresponding to D4, negative value) at a step S62, and at the same time, the FCMD_ENG_cal value is determined to be the target front-wheel driving force FCMD_ENG at a step S63. Then, control gains (FR_TCS gains) for use in a feedback control, referred to hereinafter, more specifically, P-term, I-term, D-term and PID control amounts are each reset to 0 at a step S64, followed by terminating the program.

On the other hand, if the answer to the question of the step S61 is negative (NO), i.e. if the control mode is either the drive mode or the cruising recharge mode, it is determined at a step S65 whether or not the control mode is the cruising recharge mode of the two modes. If the control mode is the cruising recharge mode, a target front-wheel driving force calculation value FCMD_ENG_cal is calculated by using the target driving force FCMD and the target rear-wheel driving force FCMD_MOT calculated at the respective steps S31 and S33, and by the following equation (4):

$$FCMD\_ENG\_cal = FCMD - FCM\_MOT - FENG\_OFF \quad (4)$$

As described above, the engine drag torque FENG_OFF is a negative value in itself, but in the equation (4), it is used as a subtractive term, which means that the engine drag torque is added to the driving force. Then, similarly to the steps S63 and S64, the FCMD_EMG_cal value is determined to be the target front-wheel driving force FCMD_ENG at a step S67, and at the same time, the FR_TCS gains are reset to 0 at a step S68, followed by terminating the present program.

On the other hand, if the answer to the question of the step S65 is negative (NO), i.e. if the control mode is the drive mode, at a step S69 et seq., the target front-wheel driving force FCMD_ENG for the drive mode is calculated. First, similarly to the step S67, the target front-wheel driving force calculation value FCMD_ENG_cal is calculated by using the equation (4) at a step S69. Then, it is determined at a step S70 whether or not the front-wheel slip flag F_frontSLP assumes 0. If the answer to this question is affirmative (YES), i.e. if it is determined that the front wheels are not slipping, the target front-wheel driving force calculation value FCMD_ENG_cal is directly determined to be the target front-wheel driving force FCMD_ENG at a step S71, and then the FR_TCS gains are reset to 0 at a step S72, followed by terminating the program. Thus, when the font wheels are not slipping, the target front-wheel driving force FCMD_ENG for the drive mode is basically determined to be a value obtained by subtracting the target rear-wheel driving force FCMD_MOT from the target driving force FCMD.

On the other hand, if the answer to the question of the step S70 is negative (NO), i.e. if F_frontSLP=1 holds, which means that the front wheels are slipping, the target front-wheel driving force FCMD_ENG is calculated at a step S73 et seq. by a PID feedback control. First, it is determined at a step S73 whether or not the both of the average left-right front-wheel rotational speed N_Fwheel and the average left-right rear-wheel rotational seed N_Rwheel are larger than the second changeover rotational speed Vn_change 2 (equivalent to a vehicle speed of e.g. 15 km/h) which is larger than the first changeover rotational speed Vn_change1 sued at the step S47. This determination is also carried out for the same reason as described as to the step S47, i.e. to switch the parameters used in the calculation of the amount of change in the front-rear wheel differential rotational speed to be executed next in dependence on the magnitude of the vehicle speed Vcar between the parameters of the wheel pulse-based type and the parameters of the motor rotation pulse-based type. Further, the second changeover rotational speed Vn_change2 is set to a larger value than the first changeover rotational speed Vn_change1 to increase the range of calculated amount of difference in the front-rear wheel differential rotational speed.

Therefore, if the answer to the question of the step S73 is affirmative (YES9, i.e. if both the N_Fwheel value and the N_Rwheel value are larger than the second changeover rotational speed Vn_change2, the parameters of the wheel pulse-based type are used to determine the difference dN_SPLT_wheel between the present value and the immediately preceding value of the front-rear wheel differential rotational speed N_SPLT_wheel calculated at the step S51, and this value is set to the amount dEN_F_R of difference in the front-rear wheel differential rotational speed at a step S74. On the other hand, if the answer to the question of the step S73 is negative (NO), the parameters of the motor rotation pulse-based type are used to determine the difference dN_SPLT_mot between the present value and the immediately preceding value of the front-rear wheel differential rotational speed N_SPT_mot calculated at the step S55 in FIG. 6, and the calculated value is set to the amount dEN_F_R of difference in the front-rear wheel differential rotational speed at a step S75.

Next, I (integral)-term KIFSLP is calculated at a step S76 by suing the amount dEN_F_R of difference in the front-rear wheel differential rotational speed calculated at the step S74 or S75 by using the following equation (5):

$$KIFSLP = KIFSLP - dEN\_F\_R \; KIFSLPK \quad (5)$$

wherein, KIFSLP on the right side represents the immediately preceding value of the I-term, and KIFSLPK represents an I-term correction coefficient.

Thus, in this PID feedback control, the I-term KIFSLP is calculated not based on the actual/target front-rear wheel differential rotational speed difference EN_F_R but based on the amount dEN_F_R of difference in the front-rear wheel differential rotational speed. This is because this PID feedback control is carried out only when the front wheels are slipping, i.e. only when the actual front-rear wheel differential rotational speed is larger than the target front-rear wheel differential rotational speed DN_F_R, and if the I-term KIFSLP is calculated based on the actual/target front-rear wheel differential rotational speed difference EN_F_R, the I-term KIFSLP is only increased to cause an excessive growth of the I-term, causing a sudden change in the front-wheel driving force, so that the amount dEN_F_R of difference in the front-rear wheel differential rotational speed is used to avoid such an inconvenience.

Next, at steps S77 to 80, the limiting process of the I-term KIFSLP calculated as described above is carried out. More specifically, it is determined at a step S77 whether or not the I-term KIFSLP is larger than 0 as the upper limit value. If KIFSLP>0 holds, the I-term KIFSLP is set to 0 at a step S78, whereas if the answer to this question is negative (NO), it is determined at a step S79 whether or not the I-term KIFSLP is smaller than a lower limit value KIFSLPLMTL (e.g. −300 kgf) thereof. If KIFSLP<KIFSLPLMTL holds, the I-term KIFSLP is set to KIFSLPLMNTL at a step S80. If the answer to the question of the step S79 is negative (NO), i.e. if KIFSLPLMT≦KIFSLP≦0 holds, the I-term KIFSLP is maintained. The above limiting process sets the I-term KIFSLP to a value within the range of 0 to the lower limit value KIFSLPLMT.

Next, the program proceeds to a step S81 in FIG. 13, wherein a P (proportional)-term KPFSLP and a D (differential)-term KDFSLP are calculated by using the respective following equations (6) and (7):

$$KPFSLP = -EN\_F\_R \; KPFSLPK \quad (6)$$

$$KDFSLP = -dEN\_F\_R \; KDFSLPK \quad (7)$$

wherein KPFSLPK and KDFSLPK represent a P-term correction coefficient and a D-term correction coefficient, respectively. Further, a PID control amount KFSLPMAIN is calculated by adding together the P-term KPSFSLP, D-term KDFSLP, and the I-term KIFSLP, by using the following equation:

$$KFSLPMAIN = KPFSLP + KIFSLP + KDFLSP \quad (8)$$

Next, at the steps S82 to S85, the limiting process of the PID control amount KFSLPMAIN calculated as described above is carried out at steps S82 to S85. More specifically, it is determined at a step S82 whether or not the PID control amount KFSLPMAIN is larger than 0 which is an upper limit value thereof. If the answer to this question is affirmative (YES), the PID control amount KFSLPMAIN is set to 0 at a step S83, whereas if the answer to the question of the step S82 is negative (NO), i.e. if KFSLPMAIN≦0 holds, it is determined at a step S84 whether or not the PID control amount KFSLPMAIN is smaller than a value (−FCMD_ENG_cal+KFSLPLMT) obtained by adding a control amount limit value KFSPLMT (e.g. 150 kgf) to the target front-wheel driving force calculation value FCMD_ENG_cal×(−1), and if the answer to this question is affirmative (YES), this value is set to the PID control amount KFSLP-MAIN at a step S85. If the answer to the question of the step S84 is negative (NO), the PID control amount KFSLPMAIN is maintained. The above limiting process sets the PID control amount KFSLPMAIN to a value equal to or smaller than 0.

Next, the PID control amount KFSLPMAIN thus calculated is determined to be a target font-wheel driving force correction amount FCMD_ENG_TCS at a step S86. Then, the target font-wheel driving force correction amount FCMD_ENG_TCS is added to the target front-wheel driving force calculation value FCMD_ENG_cal and the resulting sum is determined to be the target front-wheel driving force FCMD_ENG at a step S87, followed by terminating the program. As is clear from the calculations described heretofore, since the target front-wheel driving force correction amount FCMD_ENG_TCS is set to 0 or a negative value, the target front-wheel driving force FCMD_ENG during slippage of the front wheels is decreased with respect to the target front-wheel driving force calculation value FCMD_ENG_cal by the correction amount FCMD_ENG_TCS. Further, in this case, the target front-wheel driving force FCMD_ENG is set to a value equal to or larger than the control amount limit value KFSLPLMT.

Figure 14:
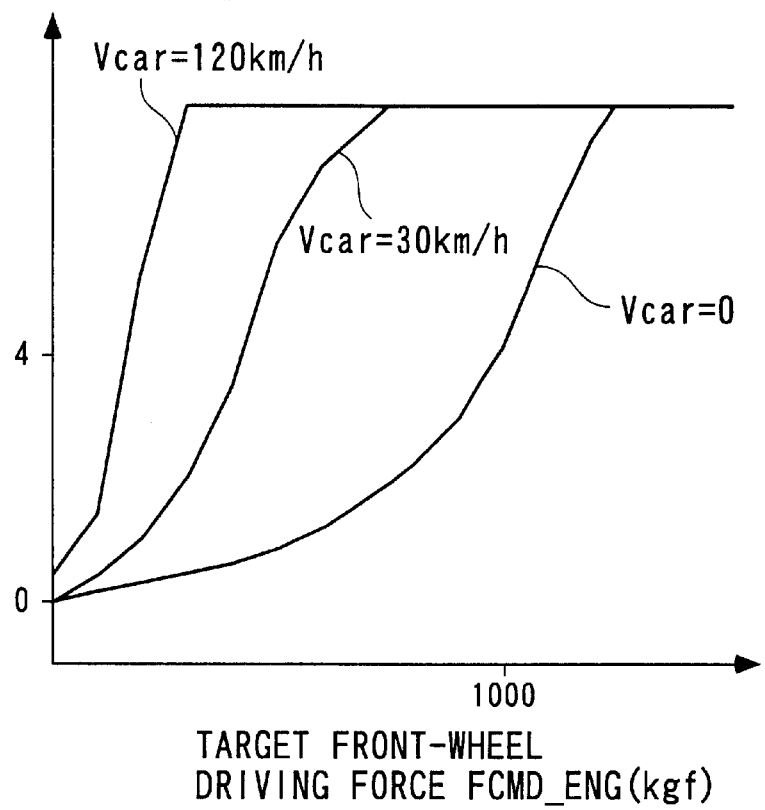
FIG. 14 is a diagram showing an example of an actuator output value table.
Figure 15:
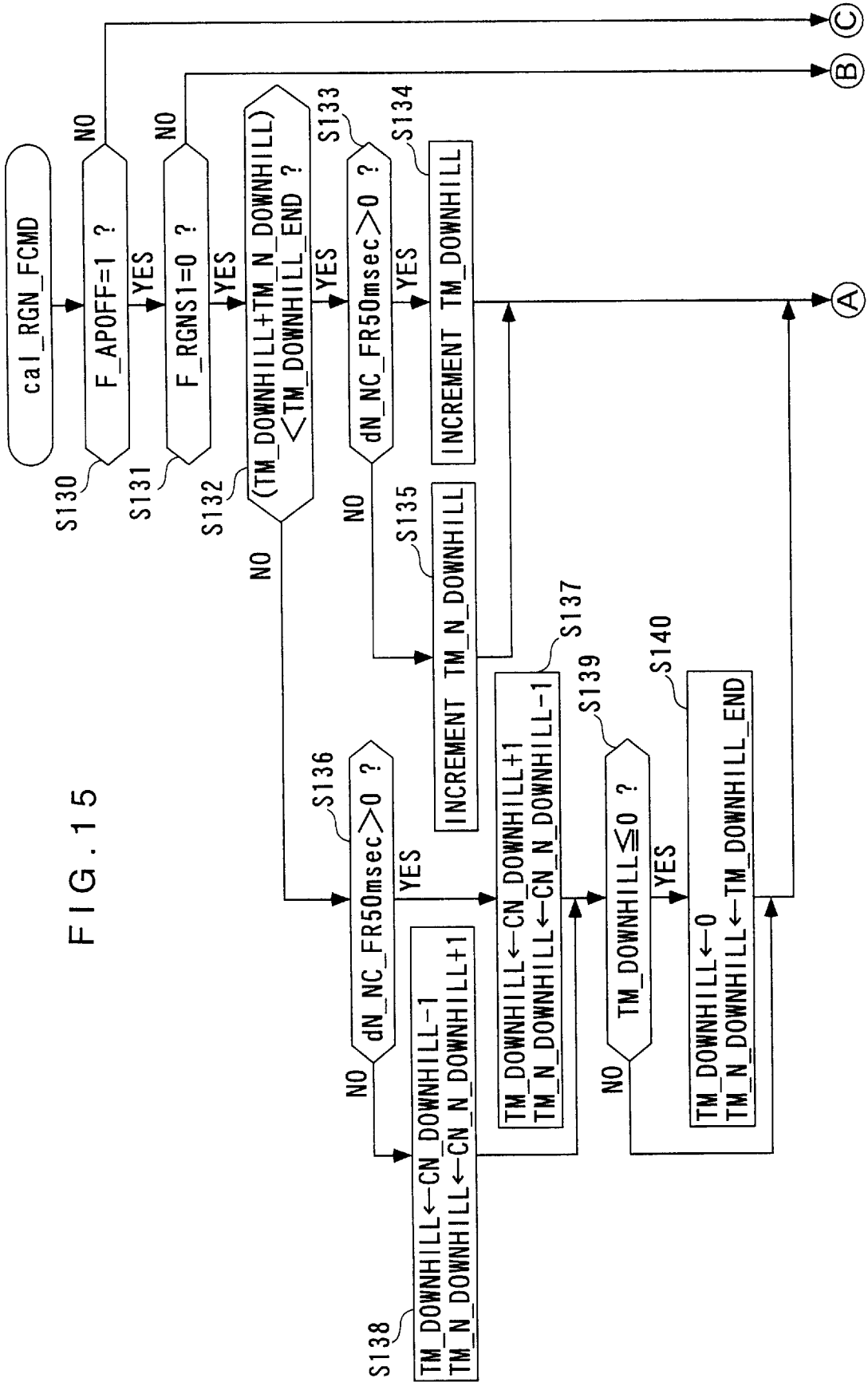
FIG. 15 is a flowchart of part of a braking force-calculating process during a decelerating regeneration mode, which is executed by a driving force control system according to a second embodiment of the invention.

The target front-wheel driving force FCMD_ENG calculated as described above is converted to an actuator output value DBW_TH dependent on the vehicle speed Vcar by looking up a DBW_TH table an example of which is shown in FIG. 14, at the step S26 in FIG. 2. The drive signal based on the actuator output value DBW_TH is delivered to the actuator 24 to control the throttle valve opening θTH, whereby the driving force of the engine 3 is controlled.

As described above, according to the present embodiment, whether or not the front wheels WFL, WFR are slipping is determined based on whether the actual front-rear wheel differential rotational speed is larger than the target front-rear wheel differential rotational speed DN_F_R, and at the same time, the target front-wheel driving force FCMD_ENG is decreased by the PID feedback control during the slippage of the front wheels WFL, WFR such that the front-rear wheel differential rotational speed becomes equal to the target front-rear wheel differential rotational speed DN_F_R. Therefore, when the front wheels are slipping, the front-rear wheel differential rotational speed DN_F_R can be properly controlled such that the front-rear wheel differential rotational speed is held at the target front-rear wheel differential rotational speed DN_F_R, so that the front wheels WFL, WFR can be maintained in an optimum slip condition even when the vehicle is running on a low-friction road surface, thereby ensuring the traveling stability of the vehicle. Further, when the front wheels are slipping, in parallel with the reduction of the target front-wheel driving force FCMD_ENG, the assistance of the motor 4 is carried out, so that the front-rear differential rotational speed can be promptly converged to the target front-rear wheel differential rotational speed DN_F_R.

Further, the target front-rear wheel differential rotational speed DN_F_R is determined based on the parameters of the slope angle SLOPE_ANG, the steering angle θSTR, the vehicle speed Vcar and the accelerator opening θAP, and therefore can be properly set in dependence on the actual traveling conditions of the vehicle 2 and the driver's intention. Further, in the PID feedback control of the front-wheel driving force FCMD_ENG, the I-term KIFSLP is calculated not based on the actual/target front-rear differential rotational speed difference EN_F_R but on the amount dEN_F_R of difference in the front-rear differential rotational speed, so that the convergence of the feedback control can be enhanced. Further, the excessive growth of the I-term KIFSLP can be avoided, and a sudden change which would be caused by the excessive growth of the I-term KIFSLP at the time of cancellation of the front-wheel slip control can be prevented.

Now, a driving force control system according to a second embodiment of the present invention will be described with reference to FIGS. 15 to 28. The driving force control system 1 according to this embodiment has the same configuration in terms of hardware. Therefore, component parts and elements thereof are designated by the same reference numerals, and description thereof is omitted. It should be noted that the electromagnetic clutch 8 (clutch means) is disconnected by the ECU 11 when the vehicle speed Vcar is equal to or higher than a predetermined clutch-connecting upper limit speed VcarCL (predetermined speed, e.g. 65 km/h), and connected when the former is lower than the latter. The ECU 11 calculates an average rear wheel speed V_RR, from the afore-mentioned pulse signals indicative of the respective rotational speeds of the wheels, and an average front-wheel rotational speed equivalent value NC_FR from the countershaft rotational speed Ncounter. Further, the ECU 11 is supplied with a signal indicative of an ON/OFF of a brake pedal, not shown, output from a brake switch (brake operation-detecting means) 26.

Referring to FIGS. 15 to 22, the braking force-calculating process during the decelerating regeneration mode will be described which is carried out at the step S23 of the main control process described hereinabove with reference to FIG. 2 in the above description of the first embodiment. The braking force-calculating process is carried out whenever a predetermined time period (e.g. 10 msec.) elapses. As described hereinafter, it is determined at steps S130 to S142, whether or not the AP 17 is ON or OFF, and the vehicle 2 is traveling downhill, and based on the determination, a target deceleration DIC_G, referred to hereinafter, is set at steps S143 to S147. Then, depending on the braking pressure PBR, the steering angle θSTR, the remaining charge SOC, the connection/disconnection of the electromagnetic clutch 8, the target deceleration DIC_G is corrected at steps S148 to S152. Then, based on the target deceleration DIC_G, the vehicle speed Vcar and the engine braking force FENG_OFF, a braking-time target braking force FCMD_RGN is calculated at steps S153 to S160, and a limiting process is carried out on the calculated braking-time target braking force FCMD_RGN at steps S161 to S173. Thus, a final rear-wheel target braking force FCMD_FNL for braking the rear wheels WRL, WRR by the motor 4 is calculated.

The final rear-wheel target braking force FCMD_FNL is calculated as a negative value, and as the absolute value thereof is larger, the larger electric power is regenerated by the motor 4 in the decelerating regeneration mode. It should be noted that in the present process, various decelerations, various braking forces and the engine braking force are calculated as respective negative values, and for simplicity, the relationship in magnitude concerning these values is described in terms of the absolute values thereof unless otherwise specified, and in mathematical expressions, they are shown and considered as negative values.

First, at a step S130, it is determined whether or not an accelerator OFF flag F_APOFF assumes 1. The accelerator OFF flag F_APOFF is set, based on the signal from the accelerator opening sensor 16, to 1 when the accelerator pedal 17 is OFF, i.e. in a released state, and to 0 when the same is stepped on.

If the answer to this question is affirmative (YES), i.e. if the AP 17 is in the released state, the program proceeds to a step S131, wherein it is determined whether or not a downhill traveling flag F_RGNS1 assumes 0. The downhill traveling flag F_RGNS1 is set to 1 when the vehicle 2 is traveling downhill, and otherwise to 0.

If the answer to the question of the step S131 is affirmative (YES), i.e. if the vehicle 2 was not traveling downhill in the immediately preceding loop, the program proceeds to a step S132, wherein it is determined whether or not the sum of a count TM_DOWNHILL of a downhill traveling determination timer and a count TM_N_DOWNHILL of a non-downhill traveling determination timer is smaller than a predetermined reference value TM_DONWEHILL_END (e.g. 100). These counts TM_DOWNHILL and TM_N_DOWNHILL are initially set to 0.

If the answer to the question of the step S132 is affirmative (YES), i.e. if TM_DOWNHILL+TM_N_DOWNHILL<TM_DONWEHILL_END holds, the program proceeds to a step S133, wherein it is determined whether or not a front-wheel differential rotational speed dn_NC_FR50 msec is larger than 0. The front-wheel differential rotational speed dn_NC_FR50 msec is calculated as the difference between the present value of the average front-wheel rotational speed equivalent value NC_FR and a value of the front-wheel differential rotational speed dn_NC_FR50 msec calculated 50 msec. (5 loops) earlier than the present loop.

If the answer to this question is affirmative (YES), i.e. if dN_NC_FR50 msec>0 holds, which means the present front-wheel rotational speed is higher than 50 msec before, it is judged that the vehicle 2 is traveling downhill, so that the count TM_DOWNHILL of the downhill traveling determination timer is incremented at a step S134, and then the program proceeds to a step S141 referred to hereinafter. On the other hand, if the answer to the question is negative (NO), which means that the front-wheel rotational speed is not changed or decreased compared with a value thereof detected 50 msec. earlier, it is judged that the vehicle 2 is not traveling downhill, so that the count TM_N_DOWNHILL of the non-downhill traveling determination timer is incremented at a step S135, followed by the program proceeding to the step S141.

On the other hand, if the answer to the question of the step S132 is negative (NO), i.e. if TM_DOWNHILL+TM_N_DOWNHILL≧TM_DONWEHILL_END holds, the program proceeds to a step S136, wherein similarly to the step S133, it is determined whether or not the front-wheel differential rotational speed dN_NC_FR50 msec is larger than 0.

If the answer to this question is affirmative (YES), it is judged that the vehicle 2 is traveling downhill, so that the immediately preceding count CN_DOWNHILL of the Adownhill traveling determination timer is incremented by 1, and the resulting value is set to the present count TM_DOWNHILL of the downhill traveling determination timer, and at the same time, the immediately preceding count CN—N_DOWNHILL of the non-downhill traveling determination timer is decremented by 1, and the resulting value is set to the present count TM_N_DOWNHILL of the non-downhill traveling determination timer at a step S137, followed by the program proceeding to a step S139, referred to hereinafter.

On the other hand, if the answer to the question of the step S136 is negative (NO), it is judged that the vehicle 2 is not traveling downhill, so that the immediately preceding count CN_DOWNHILL of the downhill traveling determination timer is decremented by 1, and the resulting value is set to the present count TM_DOWNHILL of the downhill traveling determination timer, and at the same time, the immediately preceding count CN—N_DOWNHILL of the non-downhill traveling determination timer is incremented by 1, and the resulting value is set to the present count TM_N_DOWNHILL of the non-downhill traveling determination timer at a step S138, followed by the program proceeding to the step S139.

At the step S139, it is determined whether or not the count TM_DONWHILL of the downhill traveling determination timer is equal to or smaller than 0. If the answer to this question is affirmative (YES), i.e. if TM_DOWNHILL≦0 holds, the program proceeds to a step S140, wherein the count TM_DOWNHILL of the downhill traveling determination timer is set to 0, and the count TM_N_DOWNHIL of the non-downhill traveling determination timer is held at the reference value TM_DONWHILL_END, followed by the program proceeding to the step S141. On the other hand, if the answer to the question of the step S139 is negative (NO), i.e. if TM_DOWNHILL>0 holds, the step S140 is skipped, and the program directly proceeds to the step S141 in FIG. 16.

Figure 16:
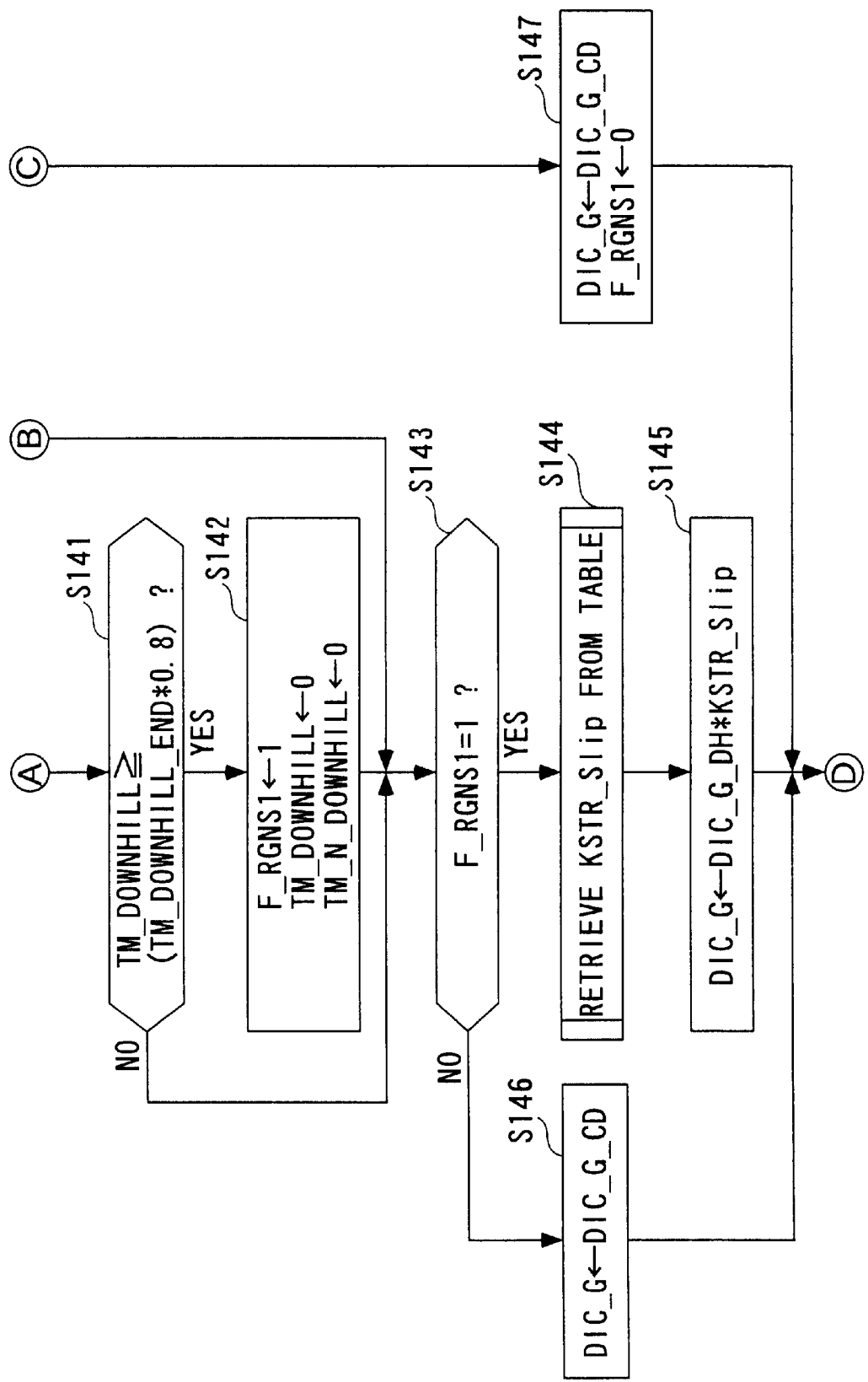
FIG. 16 is a continuation of the FIG. 15 flowchart.

From any of the above steps S134, S135, S139, and S140, the program proceeds to the step S141 in FIG. 16, wherein it is determined whether or not the count TM_DOWNHILL of the downhill traveling determination timer is equal to or larger than 80% of the reference value TM_DOWNHILL_END. If the answer to this question is affirmative (YES), i.e. if TM_DOWNHILL≧TM_DOWNHILL_END 0.8 holds, it is judged that the vehicle is traveling downhill, so that to indicate this fact, the downhill traveling flag F_RGNS1 is set to 1, and at the same time, the counts TM_DOWNHILL and TM_N_DOWNHILL of the downhill traveling determination timer and the non-downhill traveling determination timer are each set to 0 at a step S142, followed by the program proceeding to a step S143, referred to hereinafter.

On the other hand, if the answer to the question of the step S141 is negative (NO), i.e. if TM_DOWNHILL<(TM_DOWNHILL_END 0.8) holds, the step S142 is skipped, and the program directly proceeds to the step S143.

On the other hand, if the answer to the question of the step S131 is negative (NO), i.e. if the vehicle 2 is traveling downhill, the above steps S132 to S142 are skipped, and the program proceeds to the step S143.

From any of the steps S131, S141, and S142, the program proceeds to the step S143, wherein it is determined whether or not the downhill traveling flag F_RGNS1 assumes 1. If the answer to this question is affirmative (YES), i.e. if the vehicle is traveling downhill, the program proceeds to the step S144, wherein a steering wheel-dependent correction coefficient table an example of which is shown in FIG. 23 is looked up to retrieve a steering angle-dependent correction coefficient KSTR_Slip for calculation of the target deceleration DIC_G.

Figure 23:
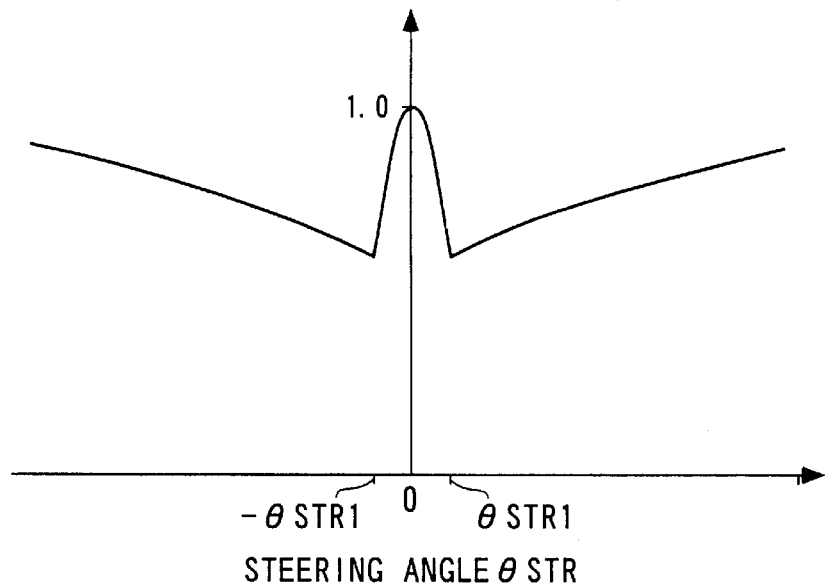
FIG. 23 is a diagram showing an example of a steering angle-dependent correction coefficient table.

As shown in FIG. 23, in the steering angle-dependent correction coefficient table, the steering angle-dependent correction coefficient KSTR_Slip assumes an identical value for both positive and negative values of the steering angle θSTR (angles through which the steering wheel 31 is rotated in respective normal and reverse directions from its neutral position) so long as the absolute value of a positive value of the steering angle θSTR and that of a negative value of the steering angle θSTR are identical to each other. Therefore, the following description will be given, by taking an example in which the steering angle θSTR assumes a value equal to or larger than 0. The table is configured such that the steering angle-dependent correction coefficient KSTR-Slip is set to 1.0 when the steering angle θSTR assumes 0, i.e. when the vehicle is traveling straightforward, and within a range of the steering angle θSTR up to a predetermined steering angle θSTR1 (e.g. 60 degrees), the correction coefficient KSTR_Slip is set to a smaller value as the steering angle θSTR assumes a larger value. This is because the rear wheels WRL, WRR are not prone to slip when the vehicle is running straightforward when the vehicle 2 is traveling downhill, whereas when the steering angle θSTR becomes larger, they become prone to slip, so that the target deceleration DIC_G, referred to hereinafter, of the vehicle 2 is decreased to suppress the slip of the rear wheels WRL, WRR. Further, the steering angle-dependent correction coefficient KSTR_Slip is set to a larger value as the steering angle θSTR is larger in a range of the steering angle θSTR equal to or larger than the predetermined steering angle θSTR1. This is because such a large value of the steering angle θSTR is presumed to be detected not when the driver causes the tires to grip the road surface e.g. of a snowy road, but rather when he intentionally moves the steering wheel 31 through a large angle, and therefore, the correction coefficient is increased to follow the driver's intention.

Figure 17:
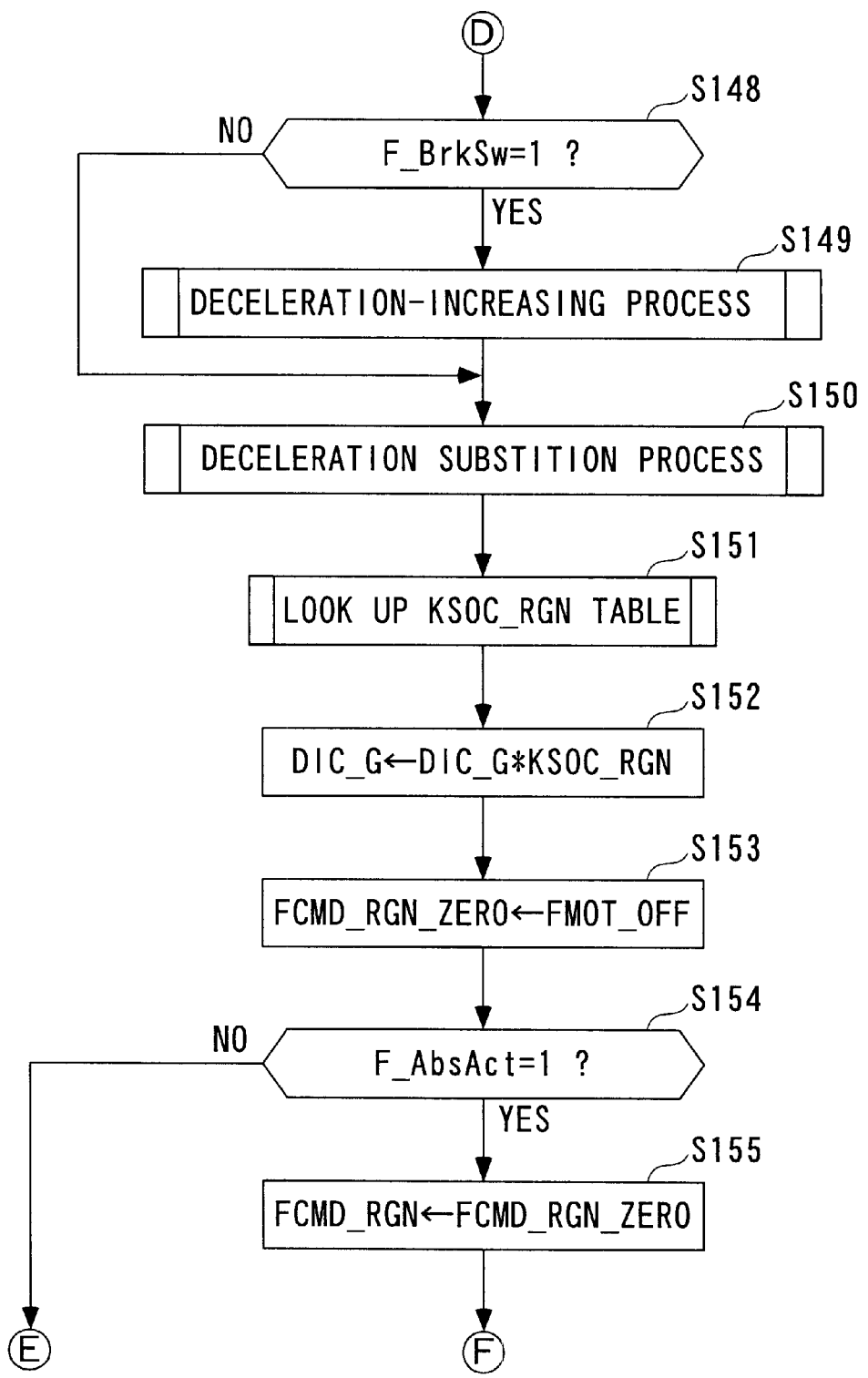
FIG. 17 is a continuation of the FIG. 16 flowchart.
Figure 18:
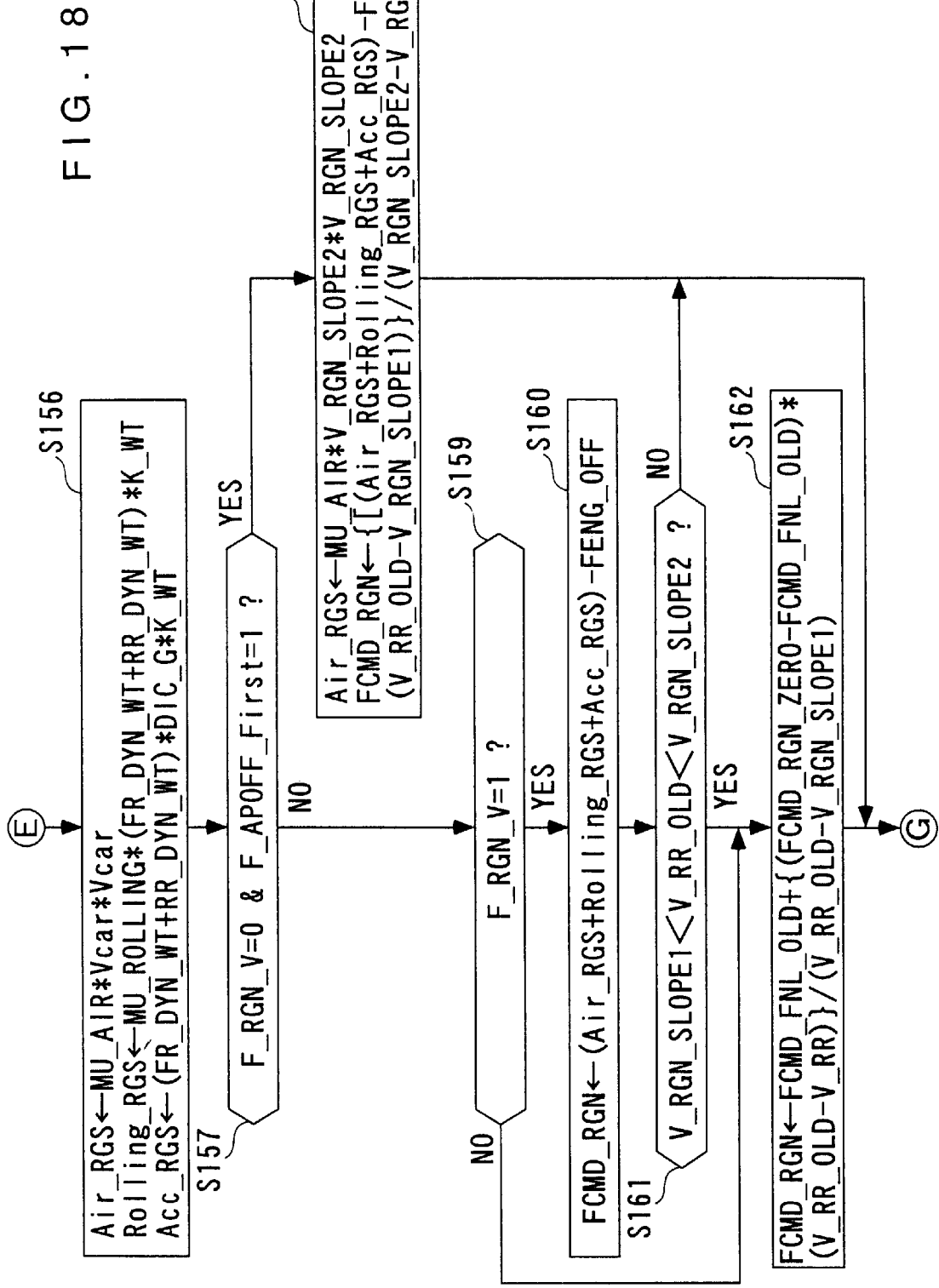
FIG. 18 is a continuation of the FIG. 17 flowchart.

Next, the program proceeds to the step S145, wherein a value obtained by multiplying a downhill-traveling deceleration DIC_G_DH by the steering angle-dependent correction coefficient KSTR_Slip determined at the step S144 is set to the target deceleration DIC_G of the vehicle 2, and the program proceeds to a step S148 in FIG. 17. The downhill-traveling deceleration DIC_G_DH is a predetermined acceleration having a negative value (e.g. −0.07G), and the target deceleration DIC_G is also set to an acceleration having a negative value. As described hereinabove, within the range of the steering angle up to the predetermined steering angle θSTR1, the steering angle-dependent correction coefficient KSTR_Slip is set to a smaller value as the steering angle θSTR1 is larger, and therefore, the processing at the step S145 causes the target deceleration DIC_G to become smaller (smaller in its absolute value) as the steering angle θSTR is larger.

On the other hand, if the answer to the question of the step S143 is negative (NO), i.e. if the vehicle 2 is not traveling downhill in the present loop, the program proceeds to a step S146, wherein the target deceleration DIC_G is set to a predetermined natural deceleration DIC_G—CD, followed by the program proceeding to the step S148, referred to hereinafter. This natural deceleration DIC_G_CD is set to such a predetermined value (e.g. −0.05 G) as will enable the braking forces of the rear wheels WRL, WRR and the decreased lateral grips of the rear wheels WRL, WRR on the road surface caused thereby to be By obtained in a well-balanced manner when the vehicle 2 is performing the decelerating regeneration traveling with a predetermined shift position (e.g. D4). This enables the vehicle 2 to perform stable traveling on a low-friction road surface while securing as large the regenerated electric power as possible. Further, if the final rear-wheel target braking force FCMD_FNL is determined by directly using the target deceleration DIC_G set to the natural deceleration DIC_G_CD, the final rear-wheel target braking force FCMD_FNL assumes substantially the same value as the engine braking force FENG_OFF, as will be described hereinafter.

On the other hand, if the answer to the question of the step S130 is negative (NO), i.e. if the accelerator pedal is being stepped on, it is judged that the vehicle 2 is not traveling downhill, so that the program proceeds to a step S147, wherein the target deceleration DIC_G is set to the natural deceleration DIC_G_CD, and at the same time, the downhill traveling flag F_RGNS1 is set to 0.

From any of the above steps S145 to S147, the program proceeds to the step S148 in FIG. 7, wherein it is determined whether or not a brake ON flag F_BrkSw assumes 1. The brake ON flag F_BrkSw is set to 1 when the brake pedal is stepped on to cause the brake switch 26 connected thereto to be turned on, and to 0 when the brake switch 26 is off. If the answer to this question is affirmative (YES), i.e. if the brake pedal is being stepped on, the program proceeds to a step S149, wherein a deceleration-increasing process is carried out.

Figure 21:
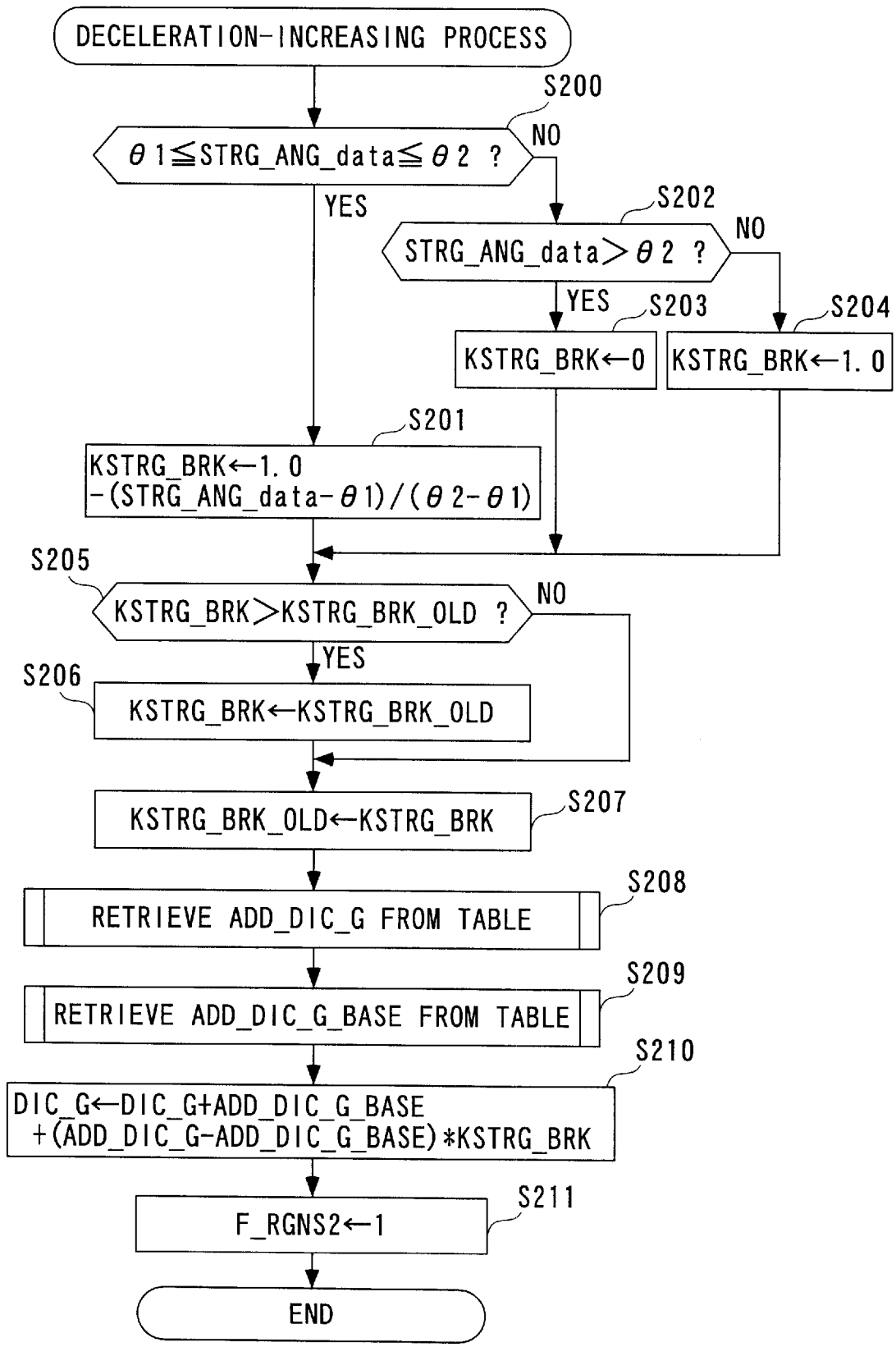
FIG. 21 is a flowchart of a subroutine for a deceleration-increasing correction process at a step S149 in FIG. 17.

Hereafter, a subroutine for the deceleration-increasing process executed at the step S149 will be described with reference to FIG. 21. In this process, as will be described in detail hereinafter, the target deceleration DIC_G is corrected in dependence on the braking pressure PBR and a absolute value STRG_ANG_data of the steering angle.

First, at a step S200, it is determined whether or not the absolute value STRG_ANG_data of the steering angle θSTR is within a range of a first predetermined angle θ1 (e.g. 20 degrees) and a second predetermined angle θ2 (e.g. 60 degrees). If the answer to this determination is affirmative (YES), i.e. if $\theta1 \leq STRG\_ANG\_data \leq \theta2$ holds, the program proceeds to a step S201, wherein the steering angle/brake-dependent correction coefficient KSTR—BRK is calculated by the following equation (9):

$$KSTR\_BRK=1.0-(STRG\_ANG\_data-\theta1/(\theta2-\theta1) \quad (9)$$

and then the program proceeds to a step S205.

As is clear from the equation (9), the steering angle/brake-dependent correction coefficient KSTR_BRK assumes a value closer to 0 as the absolute value STRG_ANG_data of the steering angle is larger within the aforementioned range.

On the other hand, if the answer to the question of the step S200 is negative (NO), i.e. if the absolute value STRG_ANG_data of the steering angle is not within the above range, the program proceeds to a step S202, wherein it is determined whether or not the absolve value STRG_ANG_data of the steering angle is larger than the second predetermined angle θ2. If the answer to this question is affirmative (YES), i.e. if $STRG\_ANG\_data > \theta2$ holds, the program proceeds to a step S203, wherein the steering angle/brake-dependent correction coefficient KSTR_BRK is set to 0, and then the program proceeds to the step S205, referred to hereinafter.

On the other hand, if the answer to the question of the step S202 is negative (NO), i.e. if $STRG\_ANG\_data < \theta1$ holds, the program proceeds to a step S204, wherein the steering angle/brake-dependent correction coefficient KSTR_BRK is set to 1.0, and then the program proceeds to a step S205.

From any of the above steps S201, S203, and S204, the program proceeds to the step S205, wherein it is determined whether or not the present value KSTR_BRK of the steering angle/brake-dependent correction coefficient is larger than the immediately preceding value KSTR_BRK_OLD of the steering angle/brake-dependent correction coefficient. If the answer to this question is affirmative (YES), i.e. if the steering wheel 31 is made closer to the neutral position in the present loop than in the immediately preceding loop, the immediately preceding value KSTR_BRK_OLD of the steering angle/brake-dependent correction coefficient is set to the present value KSTR_BRK of the same, and then the program proceeds to a step S207, wherein the present value KSTR_BRK is set to the immediately preceding value KSTR_BRK_OLD of the steering angle/brake-dependent correction coefficient.

On the other hand, if the answer to the question of the step S205 is negative (NO), i.e. if the steering wheel 31 is turned away from the neutral position to become more remote therefrom in the present loop than in the immediately preceding loop, or the steering wheel 31 is at the same steering angle θSTR as in the immediately preceding loop, the step S206 is skipped and then the program directly proceeds to the step S207, wherein the present value KSTR_BRK is set to the immediately preceding value KSTR_BRK_OLD.

Figure 24:
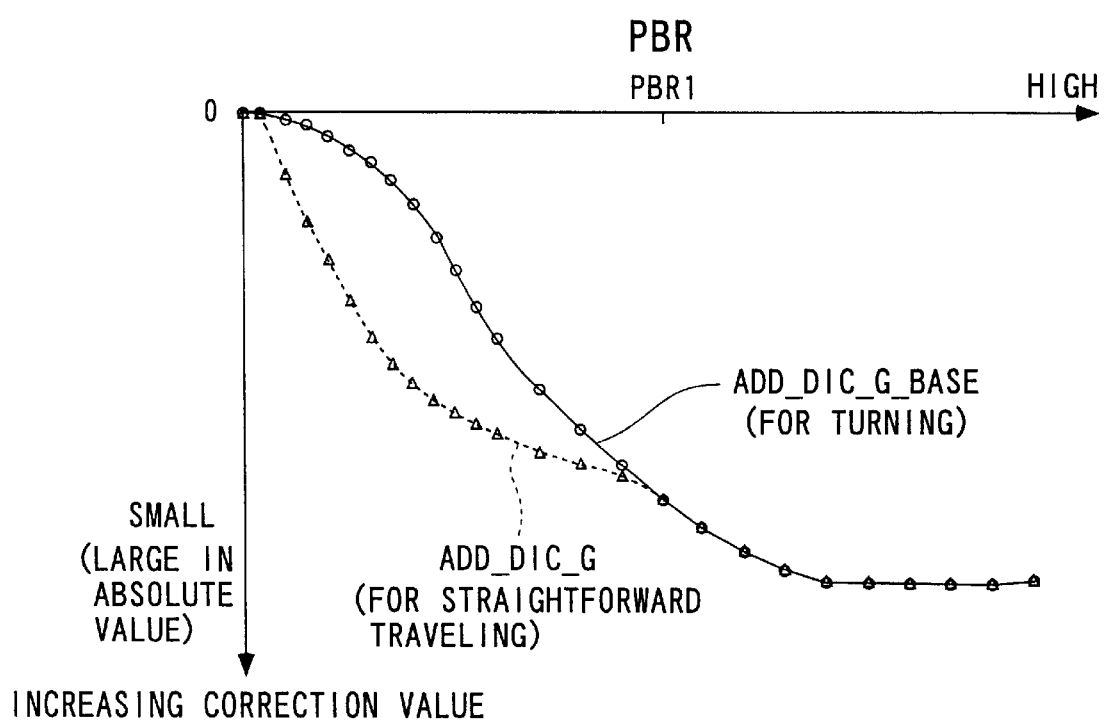
FIG. 24 is a diagram showing an example of an increasing correction value table.

Then, the program proceeds to a step S208, wherein an increasing correction value table an example of which is shown in FIG. 24 is looked up to retrieve an increasing correction value ADD_DIC_G for the target deceleration DIC_G for the straightforward traveling of the vehicle 2. In FIG. 24, a curve indicated by the broken line represents table values of an increasing correction value ADD_DIC_G—BASE for the straightforward traveling and a curve indicated by the solid line represents table values of an increasing correction value ADD_DIC_G_BASE for turning, referred to hereinafter, both the values each being set to a negative value. Further, the increasing correction value table is configured such that the two increasing correction values ADD—DIC_G and ADD_DIC_G_BASE are larger (larger in absolute value) as the brake pressure PBR is higher, and at the same time, within a range of the brake pressure PBR equal to or lower than a predetermined brake pressure PBR1, the increasing correction value ADD_DIC_G for the straightforward traveling is larger (larger in absolute value) than the increasing correction value ADD_DIC_BASE for the turning. This is because when the brake pressure PBR is equal to or lower than the predetermined brake pressure PBR1, i.e. when the brake pedal is stepped on with a weak force, the vehicle 2 can be running on a low-friction road surface, and on such a low-friction road surface, only when the vehicle 2 is traveling straightforward in which the vehicle is more stabile than when the vehicle 2 is turning, the increasing correction value ADD_DIC_G for the straightforward traveling is used to set the target deceleration DIC_G to a larger value than when the vehicle 2 is turning, and otherwise i.e. when the vehicle 2 is turning, the increasing correction value ADD_DIC_G_BASE for the turning set by the ideal braking force distribution between the front and rear wheels is used to set the target deceleration speed DIC_G. Further, when the brake pressure PBR is equal to or larger than the predetermined brake pressure PBR1, the two increasing correction values ADD_DIC_G and ADD_DIC_G_BASE are set to an identical value. This is because when the brake pressure PBR is in such a large-value range, the driver is presumed to be demanding a large braking force, and to meet the demand, the target deceleration DIC_G is set to a large value.

Next, the program proceeds to a step S209, wherein similarly to the above, the increasing correction value table is looked up according to the brake pressure PBR to retrieve an increasing correction value ADD_DIC_BASE for the turning for correcting the target deceleration DIC_G.

Then, the program proceeds to a step S210, wherein to the target deceleration DIC_G determined at the steps S145 to S147, there are added the increasing correction value ADD_DIC_G_BASE for the turning, and the difference between the increasing correction value ADD_DIC_G for the straightforward traveling and the increasing correction value ADD_DIC_G_BASE for the turning which is multiplied by the steering angle/brake-dependent correction coefficient KSTR_BRK ((ADD_DIC_G−ADD_DIC_G—BASE) KSTR_BRK) to obtain a sum total, which is set to the present value DIC_G of the target deceleration (DIC_G+ ADD_DIC_G_BASE+((ADD_DIC_G−ADD_DIC_G_BASE) KSTR_BRK)). In this case, when the break pressure PBR is in a range equal to or lower than the predetermined brake pressure PBR1, the increasing correction value ADD_DIC_G for the straightforward traveling assumes a larger value than the increasing correction value ADD_DIC_G_BASE for the turning with respect to the same break pressure PBR, so that the target deceleration DIC_G is increased by the amount of ((ADD_DIC_G−ADD_DIC_G_BASE) KSTR_BRK)) in addition to the increasing correction value ADD_DIC_G_BASE for the turning.

Next, the program proceeds to a step S211, wherein a decelerating brake ON flag F_RGNS2 which indicates that the brake pedal is being stepped on during deceleration of the vehicle 2 is set to 1, followed by terminating the program.

The deceleration-increasing process described above cause the target deceleration DIC_G to be increased by the amount of ((ADD_DIC_G−ADD_DIC_G_BASE) KSTR_BRK)) in addition to the increasing correction value ADD_DIC_G_BASE for the turning, since the increasing correction value ADD_DIC_G for the straightforward traveling and the increasing correction value ADD_DIC_G_BASE for the turning become larger as the brake pressure PBR is larger. This makes it possible to increase the braking force according to the degree of demand thereof by the driver. Further, the target deceleration DIC_G is increased by the amount of ADD_DIC_G when KSTR_BRK=1.0 holds, i.e. when the absolute value STRG_ANG_data of the steering angle is smaller than θ1, whereas when KSTR_BRK=0 holds, i.e. when the absolute value STRG_ANG_data of the steering angle is larger than θ2, the target deceleration DIC_G is increased by the amount of ADD_DIC_G_BASE. Further, when 0<KSTR_BRK<1.0 holds, i.e. when θ1<STRG_ANG_data<θ2 holds, the steering angle/brake-dependent correction coefficient KSTR_BRK becomes smaller as the absolute value of the steering angle STRG_ANG_data is larger, so that the product ((ADD_DIC_G−ADD_DIC_G_BASE) KSTR_BRK) of this coefficient KSTR_BRK and the difference (ADD_DIC_G−ADD_DIC_G_BASE) between the deceleration-increasing correction values becomes smaller, whereby the amount of increasing correction of the target deceleration DIC_G becomes smaller.

Further, if it is determined at the step S205 that the present value KSTR—BRK of the steering angle/brake-dependent correction coefficient is larger than the immediately preceding value thereof, i.e. the driver is returning the steering wheel 31 toward its neutral position, the former is held at the latter at the step S206, whereby the target deceleration DIC_G is calculated as the same value as the immediately preceding value thereof. Thus, when the driver is returning the steering wheel 31 toward its neutral position, the target deceleration DIC_G is not increased but held at the immediately preceding value, so that the actual braking force can be prevented from becoming larger than that obtained in the immediately preceding loop, whereby it is possible to prevent the lateral grip of the rear wheels WRL, WRR on the road surface from becoming smaller.

Referring again to FIG. 17, after the deceleration-increasing process described above, the program proceeds to a step S150, wherein a deceleration substitution process is carried out. On the other hand, if the answer to the question of the step S148 is negative (NO), i.e. if the brake pedal is not being stepped on, the step S149 is skipped and the program directly proceeds to the step S150, wherein the following deceleration substitution process is carried out.

Figure 22:
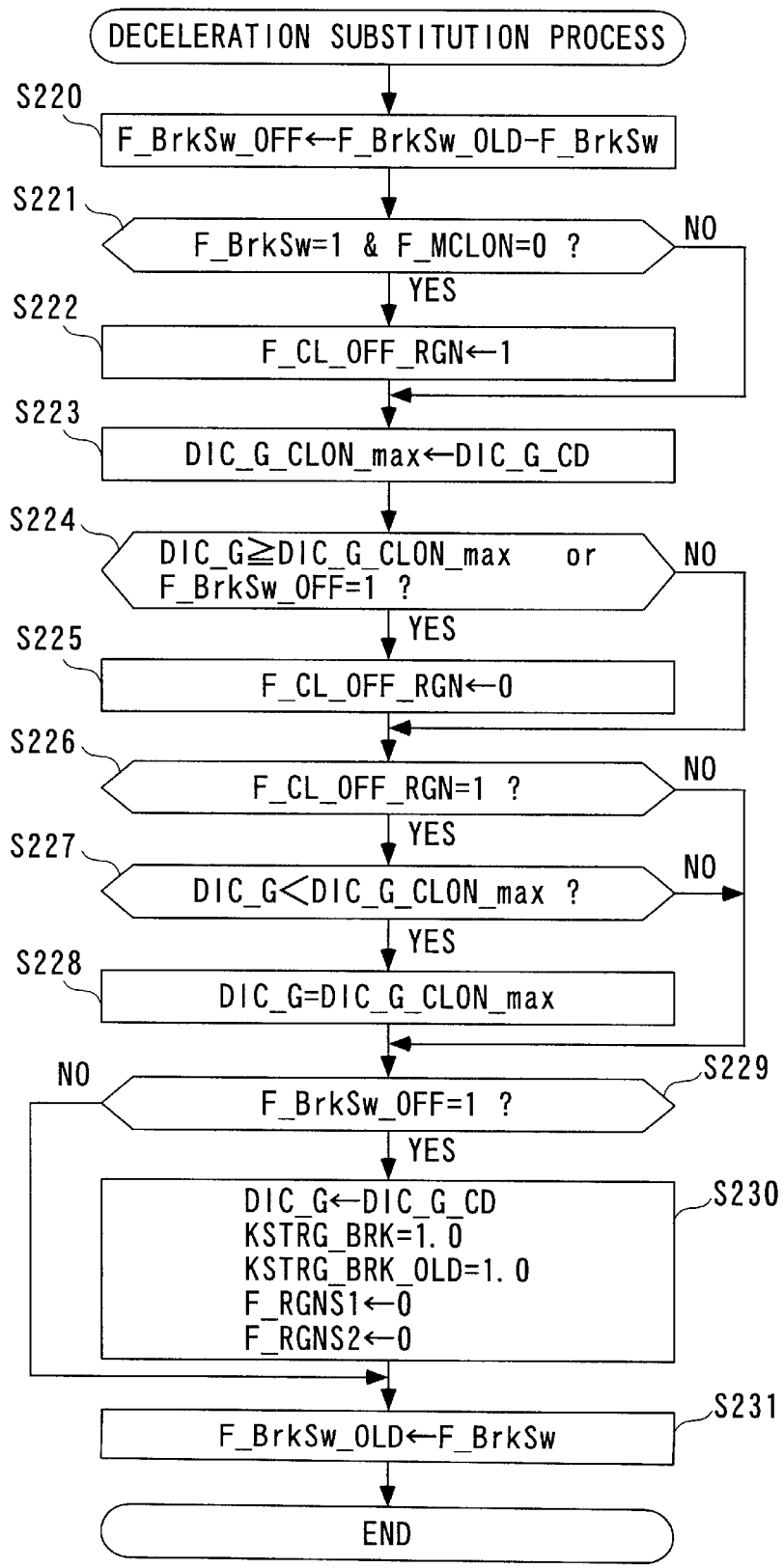
FIG. 22 is a flowchart of a subroutine for a deceleration-substituting correction process at a step S150 in FIG. 17.

Hereinafter, with reference to FIG. 22, the description will be given of the deceleration substitution process. In this process, as described hereinafter, depending on the connection/disconnection of the electromagnetic clutch 8 and the ON/OFF state of the brake switch, the target deceleration DIC_G increased at the step S149 in FIG. 17 is substituted by the natural deceleration DIC_G_CD or the clutch ON limiting deceleration DIC_G_CLON_max.

First, at the step S220, the present value of the brake ON flag F_BrkSw_OFF is calculated as a value obtained by subtracting the present value F_BrkSw of the brake ON flag from the immediately preceding value F_BrkSw_OLD of the same. This causes the present value of the brake OFF flag F_BrkSw_OFF to be set to 1 when the brake pedal is released from its stepped-on state in the present loop and to 0 in the other cases.

Next, the program proceeds to a step S221, wherein it is determined whether or not the brake ON flag F_BrkSw assumes 1 and at the same time a motor clutch connection flag F_MCLON assumes 0. The motor clutch connection flag F_MCLON is set to 1 when the electromagnetic clutch 8 is connected, and to 0 when it is disconnected. If the result of the determination is affirmative (YES), i.e. if the electromagnetic clutch 8 is disconnected, and at the same time the brake pedal is being stepped on, the program proceeds to a step S222, wherein to indicate this fact, a clutch OFF deceleration flag F_CL_OFF_RGN is set to 1, followed by the program proceeding to a step S223, described hereinafter.

On the other hand, if the answer to the question of the step S221 is negative (NO), i.e. if the electromagnetic clutch 8 is connected or the brake pedal is released, the step S222 is skipped, and the program directly proceeds to the step S223.

At the step S223, the clutch ON limiting deceleration DIC_G_CLON_max as a limit value of the target deceleration DIC_G is set to the natural deceleration DIC_G_CD. More specifically, the clutch ON limiting deceleration DIC_G_CLON_max is set as a limit value of the target deceleration DIC_G so as to prevent occurrence of a deceleration shock even when the rear wheels WRL, WRR are braked by the final rear-wheel target braking force FCMD_FNL calculated in each of the following loops by using the target deceleration DIC_G determined when the electromagnetic clutch 8 is connected.

Next, the program proceeds to the step S224, wherein it is determined whether or not the target deceleration DIC_G is equal to or smaller than the clutch ON limiting deceleration DIC_G_CLON_max (intended to mean "smaller" in its absolute value, mathematically expressed as DIC_G≧DIC_C_CLON_max), or the present value of the brake ON flag F_BrkSw_OFF assumes 1. If the answer to this question is affirmative (YES), i.e. if DIC_G≧DIC_C_CLON_max holds so that it is presumed that no decelerating shock occurs even if the target deceleration DIC_G is used or if the present loop is immediately after the brake pedal is released from its stepped-on state, the program proceeds to a step S225, wherein to indicate this fact, the clutch OFF deceleration flag F_CL_OFF_RGN is set to 0. Then, the program proceeds to a step S226.

On the other hand, if the answer to the question of the step S224 is negative (NO), i.e. if it is presumed that a deceleration shock will occur when the target deceleration DIC_G calculated then is used, and at the same time, the present loop is not the first loop after the above change in the brake pedal is detected, the step S225 is skipped and the program directly proceeds to the step S226.

At the step S226, it is determined whether or not the clutch ON deceleration flag F_CL_OFF_RGN assumes 1. IF the answer to this question is affirmative (YES), i.e. if the brake pedal is stepped on in the present loop during disconnection of the electromagnetic clutch 8, the program proceeds to a step S227, wherein it is determined whether or not the target deceleration DIC_G is larger than the clutch ON limiting deceleration DIC_G_CLON_max. If the answer to this question is affirmative (YES), it is judged that if the target deceleration DIC_G calculated at that time is used, a deceleration shock can occur, so that the target deceleration DIC_G is substituted by the clutch ON limiting deceleration DIC_G_CLON_max at a step S228, followed by the program proceeding to a step S229.

On the other hand, if the answer to the question of the step S226 or S227 is negative (NO), i.e. if the electromagnetic clutch 8 is connected, or G DIC_G≧DIC_C_CLON_max holds so that it is presumed that even if the target deceleration DIC_G calculated at that time is used, no deceleration shock will occur, or the brake pedal is released, the program proceeds to the step S229 without changing the target deceleration DIC_G.

At the step S229, it is determined whether or not the present value of the brake OFF flag F_BrkSw_OFF assumes 1. If the answer to this question is affirmative (YES), i.e. if the present loop is immediately after the brake pedal is released from the stepped-on state, the program proceeds to a step S230, wherein the target deceleration DIC_G is set to (replaced by) the natural deceleration DIC_G_CD, the present value KSTR_BRK and the immediately preceding value KSTR_BRL_OLD of the steering angle/brake-dependent correction coefficient are both set to "1.0", and the downhill traveling flag F_RGNS1 and the deceleration brake ON flag F_RGNS2 are both set to 1. The target deceleration DIC_G is replaced by the natural deceleration DIC_G_CD to prevent generation of the braking force larger than that demanded by the driver, which would be generated if the present value of the target deceleration DIC_G increased according to the brake pressure PBR at the step S149 in FIG. 17 is used.

Then, the program proceeds to a step S231, wherein the immediately preceding value F_BrkSw_OLD of the brake ON flag F_BrkSw is set to the present value F_BrkSw of the same, followed by terminating the present process.

According to the deceleration substitution process described above, when the electromagnetic clutch 8 is in the disconnected state, and at the same time the brake pedal is stepped on, the target deceleration DIC_G increased at the step S149 in FIG. 17 is replaced by the clutch ON limiting deceleration DIC_G_CLON_max, i.e. the natural deceleration DIC_G_CD. That is, the target deceleration DIC_G is decreased, whereby it is possible to prevent an excessive braking force more than demanded by the driver from being applied to the rear wheels WRL, WRR, to thereby prevent an occurrence of a braking shock.

Figure 25:
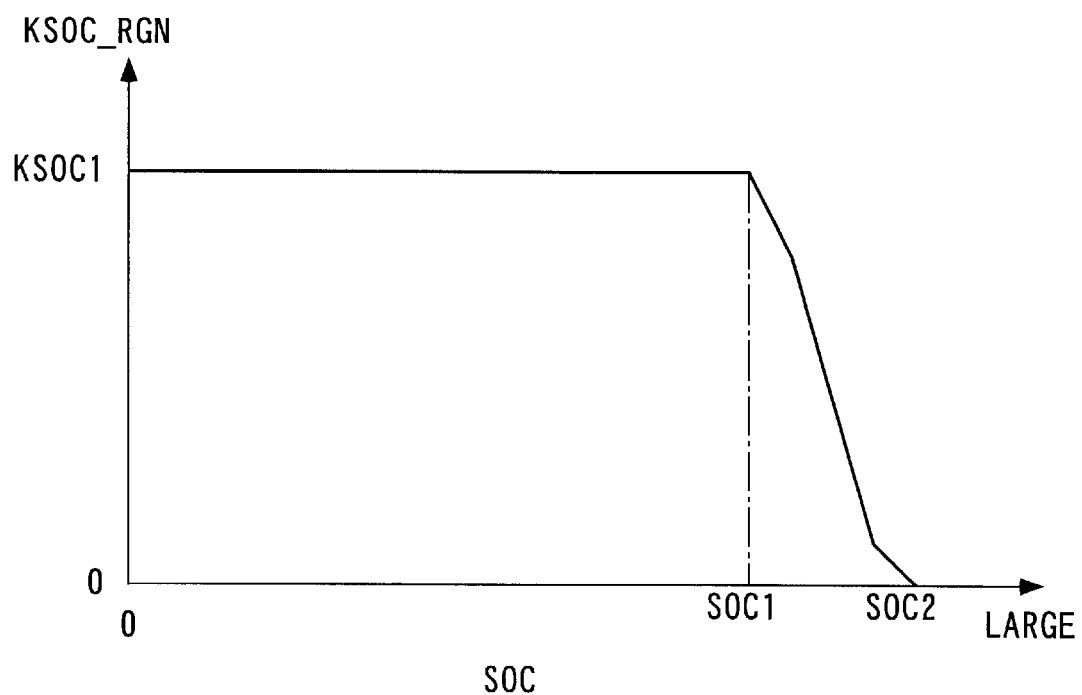
FIG. 25 is a diagram showing an example of a deceleration-time remaining charge-dependent correction coefficient table.

Referring again to FIG. 17, after the deceleration substitution process executed at the step S150, the program proceeds to a step S151, wherein a deceleration-time remaining charge-dependent correction coefficient table an example of which is shown in FIG. 25 is looked up according to the remaining charge SOC (%), to determine a deceleration-time remaining charge-dependent correction coefficient KSOC_RGN. The deceleration-time remaining charge-dependent correction coefficient KSOC_RGN is used at a step S152 as a multiplication factor for multiplying the target deceleration DIC_G thereby.

The deceleration-time remaining charge-dependent correction coefficient KSOC_RGN table is configured such that when the remaining recharge SOC is in a range smaller than a first predetermined value SOC1 (e.g. 75%) the deceleration-time remaining charge-dependent correction coefficient KSOC_RGN is set to a predetermined value KSOC1 (e.g. 1.0), when the remaining charge SOC is within a range between the first predetermined value SOC1 and a second predetermined value 2 larger than the first predetermined value SOC1, the correction coefficient KSOC_RGN is set to a smaller value as the remaining charge SOC is larger, and when the remaining charge SOC is in a range larger than the second predetermined value SOC2, the correction coefficient KSOC_RGN is set to 0. The second predetermined value SOC2 is set to a value close to but smaller than 100% (e.g. 95%). This is to secure as large an amount as possible of energy regenerated by the motor 4, i.e. by regenerative braking of the rear wheels WRL, WRR with the motor 4, when the remaining charge SOC is smaller than the first predetermined value SOC1, and to reduce the amount of regenerated electric power, i.e. the braking force applied to the rear wheels WRL, WRR as the demand of recharge of the battery becomes less, when SOC1≦SOC≦SOC2 holds. This makes it possible to prevent a sudden decrease in the braking force applied to the rear wheels WRL, WRR when the remaining charge SOC reaches 100%.

Next, the program proceeds to a step S152, wherein the target deceleration DIC_G is set to a value obtained by multiplying the present value of the target deceleration DIC_G by the deceleration-time remaining charge-dependent correction coefficient KSOC_RGN determined at the step S151.

Then, the program proceeds to a step S153, wherein a non-braking-time target braking force FCMD_RGN_ZERO is set to a rotational resistance FMOT_OFF of the motor 4. The rotational resistance FMOT_OFF is a negative value very close to 0.

Then, the program proceeds to a step S154, wherein it is determined whether or not an ABS-active flag F_AbsAct assumes 1. If the answer to this question is negative (NO), i.e. if an ABS (anti-lock brake system) of the vehicle 2 is not in operation, the program proceeds to a step S156 in FIG. 18, wherein an air resistance Air_RGS, a rolling resistance Rolling_RGS, and an acceleration resistance Acc_RGS of the vehicle 2 are calculated respectively by the following equations (10) to (12):

$$Air\_RGS=MU\_AIR\ Vcar\ Vcar \quad (10)$$

$$Rolling\_RGS=MU\_ROLLING\ (FR\_DYN\_WT+RR\_DYN\_WT)\ K\_WT \quad (11)$$

$$Acc\_RGS=(FR\_DYN\_WT+RR\_DYN\_WT)\ DIC\_G\ K\_WT \quad (12)$$

wherein MU_AIR represents an air resistance-dependent correction coefficient, MU_ROLLING a rolling resistance-dependent correction coefficient, FR_DYN_WT a weight on the front wheels, RR_DYN_WT a weight on the rear wheels, and K_WT a vehicle weight-dependent correction coefficient.

Then, the program proceeds to a step S157, wherein it is determined whether or not a braking slope flag R_RGN_V assumes 0, and at the same time, a this-time accelerator OFF flag F_APOFF_First assumes 1. The braking slope flag F_RGN_V is set to 1 when the immediately preceding value V_RR_OLD of the average rear-wheel speed V_RR (hereinafter referred to as "the immediately preceding average rear-wheel speed V_RR_OLD") is equal to or higher than a second predetermined vehicle speed V_RGN_SLOP2, and to 0, when the immediately preceding average rear-wheel speed V_RR_OLD is lower than the second predetermined vehicle speed V_RGN_SLOP2. The second predetermined vehicle speed V_RGN_SLOP2 is set to a value (e.g. 8 km/h) slightly larger than 0 indicative of stoppage of the vehicle 2. Further, the this-time accelerator OFF flag F_APOFF_First is set to 1 when the AP 17 is released from the stepped-on state for the first time in the present loop, and otherwise to 0.

If the answer to the question of the step S157 is affirmative (YES), i.e. if the immediately preceding average rear-wheel speed V_RR_OLD is lower than the second predetermined vehicle speed V_RGN_SLOPE2, and at the same time the AP 17 is first released, the program proceeds to a step S158, wherein the air resistance Air_RGS and the braking-time target braking force FCMD_RGN are calculated by the following equations (13) and (14):

$$Air\_RGS=MU\_AIR\ V\_RGN\_SLOPE2\ V\_RGN\_SLPE2 \quad (13)$$

$$FCMD\_RGS=\{[Air\_RGS+Rolling\_RGS+Acc\_RGS)-FENG\_OFF](V\_RR\_OLD-V\_RGN\_SLOPE1)\}/(V\_RGN\_SLOPE2-V\_-RGN\_SLOPE1) \quad (14)$$

Figure 26:
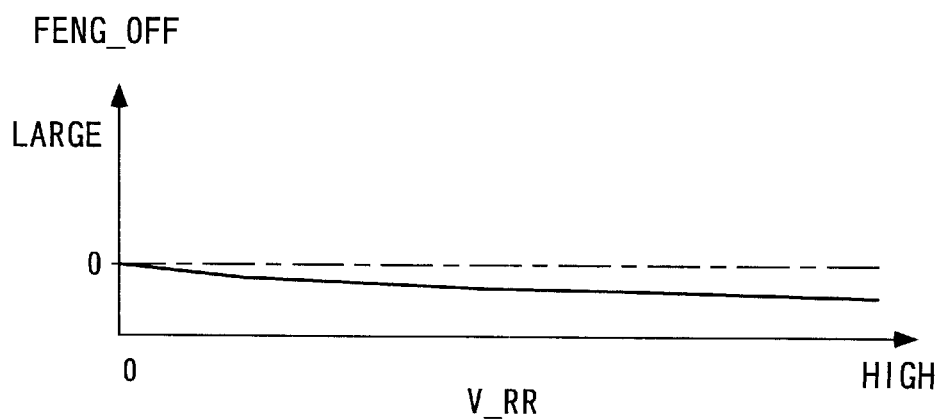
FIG. 26 is a diagram showing an example of an engine brake table.

Here, V_RGN_SLOPE1 represents a first predetermined vehicle speed which is lower than the second predetermined vehicle speed V_RGN_SLOPE2 and assumes a value (e.g. 1 km/h) which is very close to 0 indicative of stoppage of the vehicle 2, and in the equation (14), the engine braking force FENG_OFF is determined by looking up an engine braking force table an example of which is shown in FIG. 26 according to the vehicle speed Vcar. In this step S158, as the vehicle speed Vcar, the second predetermined vehicle speed V_RGN_SLOPE 2 is used.

The illustrated engine braking force table in FIG. 26 shows values of the engine braking force FENG_OFF assumed when the AP 17 is in the released state and the shift lever position corresponds to D4. When the vehicle speed Vcar is equal to 0, the engine braking force FENG_OFF is set to 0, and otherwise to a negative value whose absolute value is larger as the vehicle speed Vcar is higher. Further, the engine braking force FENG_OFF is set such that it changes at a considerably small rate with respect to the change in the Vcar.

On the other hand, if the answer to the question of the step S157 is negative (NO), i.e. if the immediately preceding average rear-wheel speed V_RR_OLD was equal to or higher than the second predetermined vehicle speed V_RGN_SLOPE2 immediately before the vehicle 2 enters the decelerating regeneration mode, or if the present loop is not immediately after the AP 17 was first released, the above step S158 is skipped and the program directly proceeds to a step S159.

At the step S159, it is determined whether or not the braking slope flag F_RGN_V assumes 1. If the answer to this question is affirmative (YES), i.e. if the immediately preceding average rear-wheel speed V_RR_OLD was equal to or higher than the second predetermined vehicle speed V_RGN_SLOPE2, the program proceeds to a step S160, wherein the braking-time target braking force FCM_RGN is calculated by the following equation (15):

$$FCMD\_RNG=(Air\_RGS+Rolling\_RGS+Acc\_RGS)-FENG\_OFF \quad (15)$$

In this case, since the engine braking force FENG_OFF is set such that it changes at a considerably small rate with respect to the change in the vehicle speed Vcar, as described above, if the braking-time target braking force FCMD_RGN is calculated by using a target resistance Acc_RGS calculated by using the natural deceleration DIC_G_CD described above, the braking-time target braking force FCMD_RGN can be determined as a value substantially equal to the engine braking force FENG_OFF. Accordingly, when the braking-time target braking force FCMD having a value substantially equal to the engine braking force FENG_OFF is set to the final rear-wheel target braking force FCMD_FNL at a step S170, referred to hereinafter, the braking force applied to the front wheels and that applied to the rear wheels are set such that they are equivalent to each other, whereby it is possible to make stable the behavior of the vehicle 2.

Then, the program proceeds to a step s161, wherein it is determined whether or not the immediately preceding average rear-wheel speed V_RR_OLD is larger than the first predetermined vehicle speed V_RGN_SLOPE1 and at the same time lower than the second predetermined vehicle speed V_RGN_SLOPE2. If the answer to this question is affirmative (YES), i.e. if the immediately preceding average rear-wheel speed V_RR_OLD is within the range defined by the first and second predetermined vehicle speeds, the program proceeds to a step S162, wherein the braking-time target braking force FCMD_RGN is calculated by using the following equation (16):

$$FCMD\_RGN=FCMD\_FNL\_OLD+\{(FCMD\_RGN\_ZERO-FCMD\_FNL\_OLD)\,(V\_RR\_OLD-V\_RR)/(V\_RR\_OLD-V\_RGN\_SLOPE1) \quad (16)$$

followed by the program proceeding to a step S163, referred to hereinafter, in FIG. 19.

In this case, as described hereinafter, so long as the vehicle 2 is performing decelerating travel, the immediately preceding value FCMD_FNL_OLD of the final rear-wheel target braking force FCMD_FNL is set to a value equal to or larger than the non-braking-time target braking force FCMD_RGN_ZERO, so that in the above equation (16), the second term on the right side assumes 0 or a positive value. Therefore, during the decelerating travel, as the immediately preceding average rear-wheel speed V_RR_OLD is lower, i.e. indicates a slower speed, the second term on the right side becomes larger, whereby the braking-time target braking force FCMD_RGN is set to a smaller value. Therefore, when the immediately preceding average rear-wheel speed V_RR_OLD is within the above-defined range, as the speed V_RR_OLD is lower, the braking force is caused to become smaller.

On the other hand, when the answer to the question of the step S159 is negative (NO), i.e. if the immediately preceding average rear-wheel speed immediately before the start of the decelerating regeneration mode was lower than the second predetermined vehicle speed V_RGN_SLOPE2, after executing the step S162, the program proceeds to the step S163, referred to hereinafter, in FIG. 19.

Figure 19:
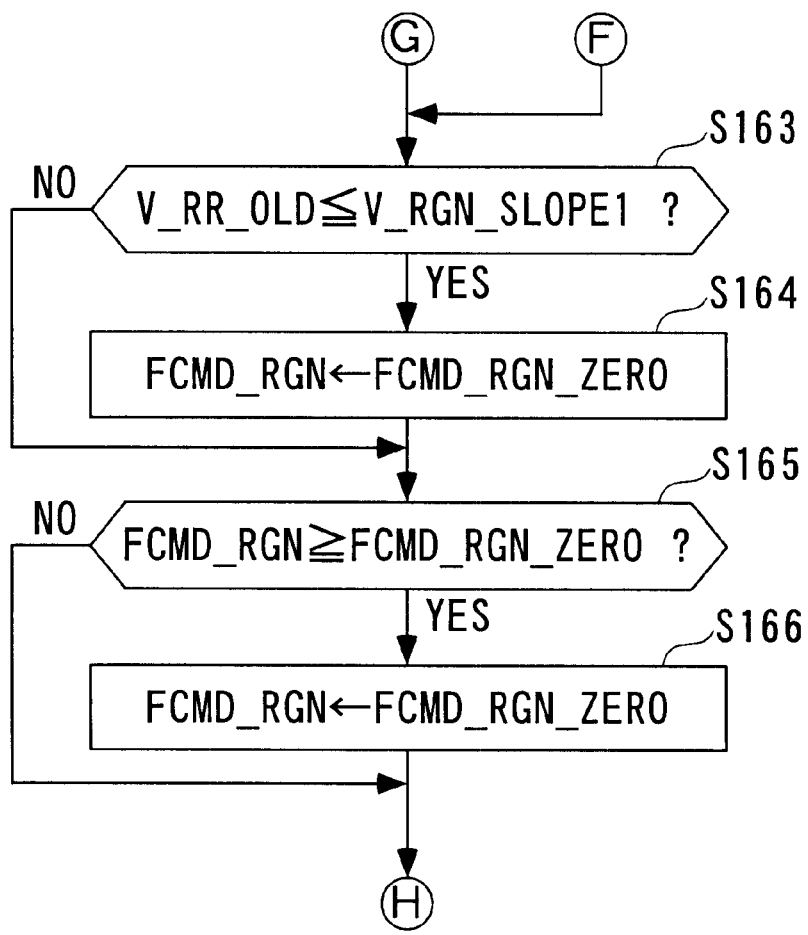
FIG. 19 is a continuation of the FIG. 18 flowchart.
Figure 20:
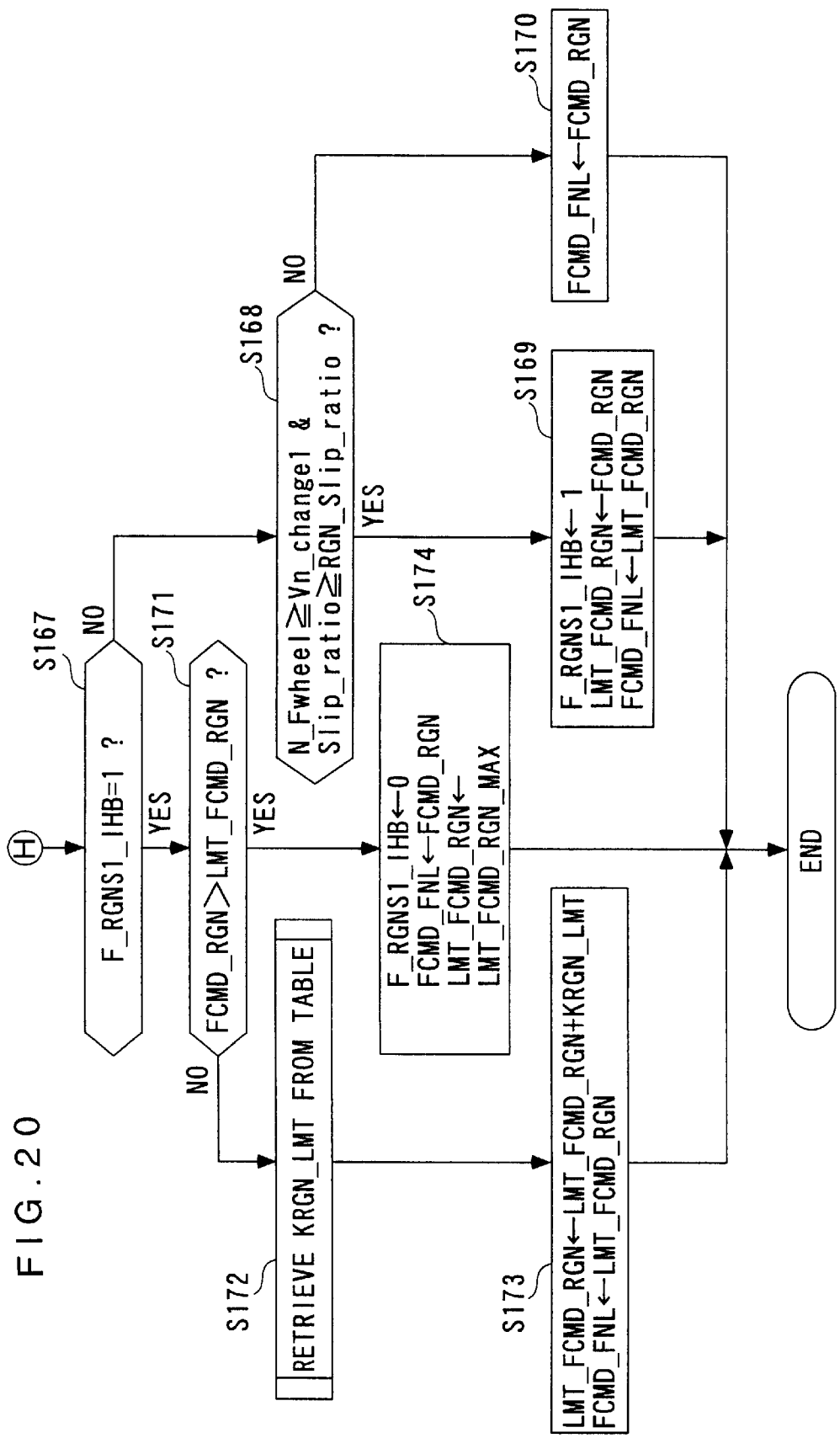
FIG. 20 is a continuation of the FIG. 19 flowchart.

On the other hand, if the answer to the question of the step S161 is negative (NO), i.e. if the immediately preceding average rear-wheel speed V_RR_OLD is equal to or lower than the first predetermined vehicle speed V_RGN_SLOPE1 or equal to or higher than the second predetermined vehicle speed V_RGN_SLOPE2, the step S162 is skipped, and the program directly proceeds to the step S163 in FIG. 19.

On the other hand, if the answer to the question of the step S154 is affirmative (YES), i.e. if the ABS is active, the program proceeds to the step S155, wherein the braking-time target braking force FCMD_RGN is set to the non-braking-time target braking force FCMD_RGN_ZERO, and then the program proceeds to the step S163 in FIG. 19.

From any of the steps S155, S158, S161, and S162, the program proceeds to the step S163, wherein it is determined whether or not the immediately preceding average rear-wheel speed V_RR_OLD is equal to or lower than the first predetermined vehicle speed V_RGN_SLOPE1. If the answer to this question is affirmative (YES), i.e. if the vehicle 2 is in stoppage, the program proceeds to a step S164, wherein to inhibit the braking of the rear wheels WRL, WRR with the motor 4, the braking-time target braking force FCMD_RGN is set to the non-braking-time target braking force FCMD_RGN_ZERO, followed by the program proceeding to a step S165. On the other hand, if the answer to the question of the step s163 is negative (NO), i.e. if the vehicle 2 is not in stoppage, the step S164 is skipped, and the program proceeds to the step S165.

At the step S165, it is determined whether or not the braking-time target braking force FCMD_RGN is equal to or smaller than the non-braking-time target braking force FCMD_RGN_ZERO (this condition is mathematically expressed as FCMD_RGN≧FCMD_RGN_ZERO). If the answer to this question is affirmative (YES), it is judged that it is not necessary to apply the braking force to the rear wheels WRL, WRR, so that the program proceeds to a step S166, wherein the braking-time target braking force FCMD—RGN is set to the non-braking-time target braking force FCMD_RGN_ZERO, followed by the program proceeding to a step S167, referred to hereinafter.

On the other hand, if the answer to the question of the step S165 is negative (NO), i.e. if the braking-time target braking force FCMD—RGN is larger than the non-braking time target braking force FCMD_RGN_ZERO (i.e. FCMD_RGN<FCMD_RGN_ZERO holds), the step S166 is skipped and the program directly proceeds to the step S167.

At this step S167, it is determined whether or not a braking force inhibition flag F_RGNS1_IHB assumes 1. The braking force inhibition flag F_RGNS1_IHB is set, as will be described hereinafter, to 1 when the final target rear-wheel braking force FCMD_FNL is limited so as not to allow the same to exceed a braking force limit value LMT_FCMD_RGN, and to 0 when the same is not limited.

If the answer to this question of the step S167 is negative (NO), i.e. if the final target rear-wheel braking force FCMD_FNL is not being limited, the program proceeds to a step S168, wherein it is determined whether or not the average left-right front-wheel rotational speed N_Fwheel is equal to or higher than the changeover rotational speed Vn_changel (equivalent to a vehicle speed of e.g. 5 km/h), and at the same time, the rear-wheel slip ratio Slip_ratio is equal to or higher the reference value RGN_Slip_ratio (e.g. 3%). The rear-wheel slip ratio Slip_ratio in this case is defined as a simplified rear-wheel slip ratio which is calculated by the equation of Slip_ratio=(N_F_wheel−N_Rwheel)/N_Fwheel based on the average left-right front-wheel rotational speed N_Fwheel and the average left-right rear-wheel rotational speed N_Rwheel. This definition causes the rear-wheel slip ratio Slip ratio to be proportional to the difference in rotational speed between the front wheels WFL, WFR, and the rear wheels WRL, WRR.

If the answer to the question of the step S168 is affirmative (YES), i.e. if N_Fwheel≧Vn_changel and Slip_ratio≧RGN_Slip_ratio hold, it is judged that the rear wheels are slipping largely, and the limitation on the braking force should be started, so that the program proceeds to a step S169, wherein the braking force inhibition flag F_RNS1_IHB is set to 1, the braking-time target braking force FCMD_RGN is set to the braking force limit value LMT_FCMD_RGN, and the braking force limit value LMT_FCMD_RGN is set to the final rear-wheel target braking force RCMD_FNL, followed by terminating the present program. On the other hand, if the answer to the question of the step S168 is negative (NO), the program proceeds to a step S169, wherein the braking-time target braking force FCMD_RGN is set to the final target braking force FCMD_FNL, followed by terminating the present program.

On the other hand, if the answer to the question of the step S167 is affirmative (YES), i.e. if the braking force inhibition flag F_RGNS1_IHB assumes 1 to inhibit the application of the braking force, the program proceeds to a step S171, wherein it is determined whether or not the present value of the braking-time target braking force FCMD_RGN is smaller than the braking force limit value LMT_FCMD RGN (FCMD_RGN>LMIT_FCMD_RGN in a mathematical expression). If the answer to this question is negative (NO), i.e. if FCMD_RGN≦LMIT_FCMD_RGN holds and the rear-wheel braking force is large, it is judged that the limitation on the braking force should be continued, so that the program proceeds to a step S172, wherein a braking force limiting correction coefficient KRGNLMT is retrieved according to the rear-wheel slip ratio Slip_ratio.

Figure 27A:
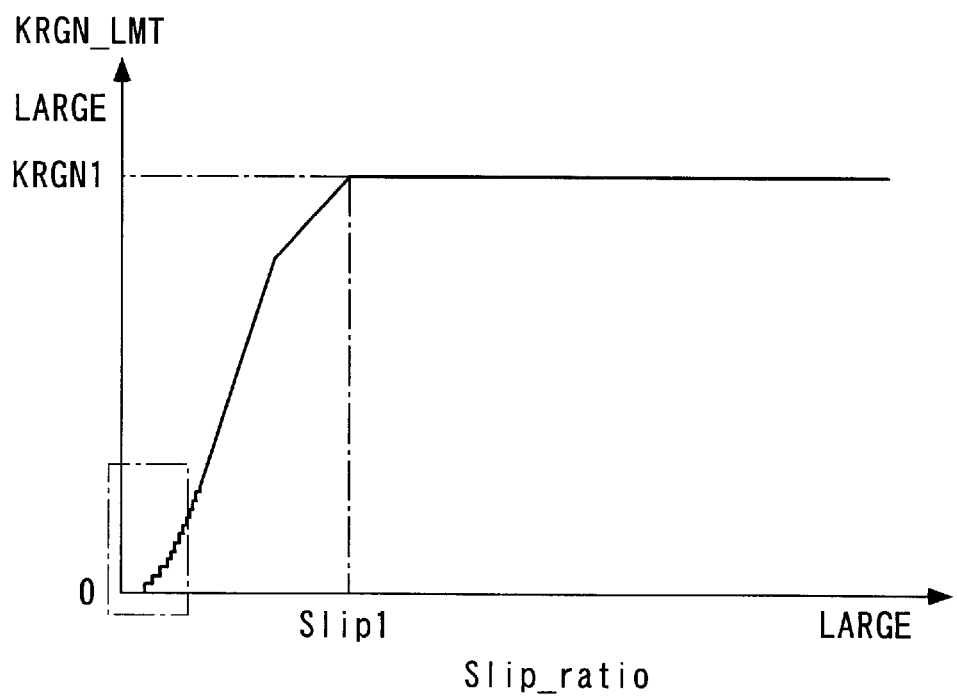
FIG. 27A is a diagram showing an example of a braking force-limiting correction value table.
Figure 27B:
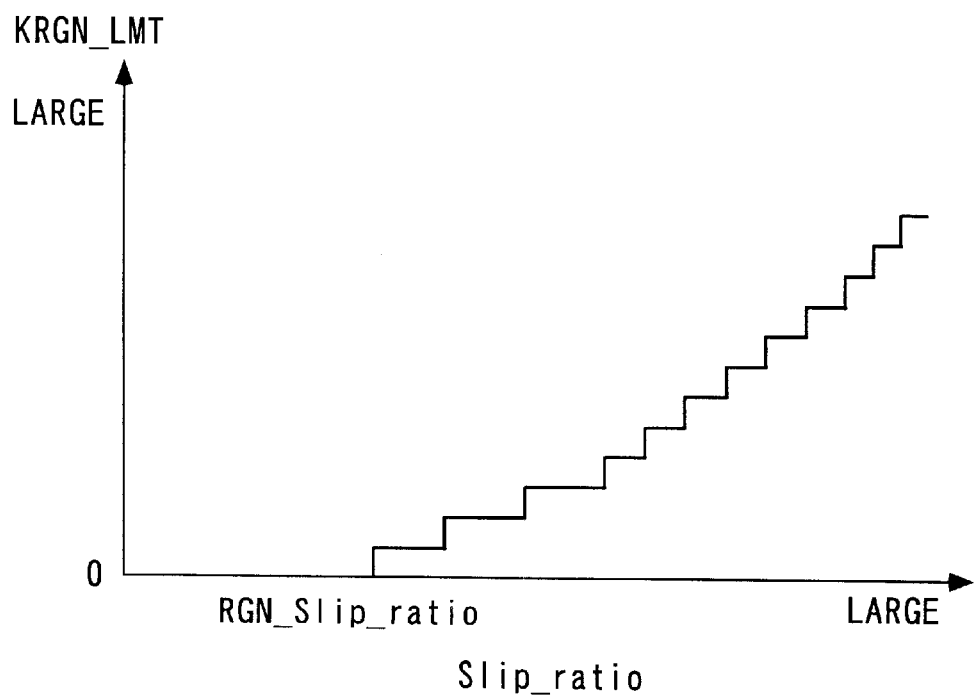
FIG. 27B is an enlarged diagram showing part of the FIG. 27 braking force-limiting correction value table on enlarged scale.

FIG. 27A shows an example of a braking force limiting correction coefficient table, and FIG. 27B shows part of the FIG. 27A table on enlarged scale. This table is configured such that the braking force limiting correction coefficient KRGN_LMT is set to 0 or a positive value. More specifically, the braking force limiting correction coefficient KRGN_LMT is set to 0 when the rear-wheel slip ratio Slip_ratio is close to a reference value RGN_Slip_ratio (e.g. 3%), stepwise increased when the same is larger than the reference value RGN_Slip_ratio, and set to a constant value KRGN1 when same is larger than a predetermined value Slip1 (e.g. 30%) larger than the reference value RGN_Slip_ratio. The braking force-limiting correction value KRGN_LMT is thus set stepwise so as to prevent the braking force control from too sensitively responding to a change in the rear-wheel slip ratio Slip_ratio.

Then, the program proceeds to a step S173, wherein the sum of the immediately preceding value of the braking force limit value LMT_FCMD_RGN and the braking force-limiting correction value KRGN_LMT is set to the present value of the braking force limit value LMT_FCMD_RGN, and at the same time the braking force limit value LMT_FCMD_RGN thus obtained is set to the final target rear-wheel braking force FCMD_FNL, followed by terminating the program. In this case, the braking force-limiting correction value KRGN_LMT is a positive value, and hence the final target rear-wheel braking force FCMD_FNL is decreased by this positive value.

On the other hand, if the answer to the question of the step S171 is affirmative (YES), i.e. if FCMD_RGN>LMT_FCMD_RGN holds, it is judged that the limitation on the braking force should be canceled, so that the program proceeds to a step S174, wherein the braking force inhibition flag F_RGNS1_IHB is set to 0, the final target rear-wheel braking force FCMD_FNL is set to the braking-time target braking force FCMD_RGN, and the braking force limit value LMT_FCMD_RGN is set to a predetermined maximum braking force limit value LMT_FCMD_RGN_MAX (e.g. −420 kgf), followed by terminating the program.

The above steps S167 to S74 limit the final target rear-wheel braking force FCMD_FNL according to the rear-wheel slip ratio Slip_ratio when the rear wheels are slipping largely. This makes it possible to prevent the braking force applied to the rear wheels WRL, WRR, i.e. the final target rear-wheel braking force FCMD_FNL from becoming excessively large, and thereby improving the stability of the vehicle 2.

Figure 28:
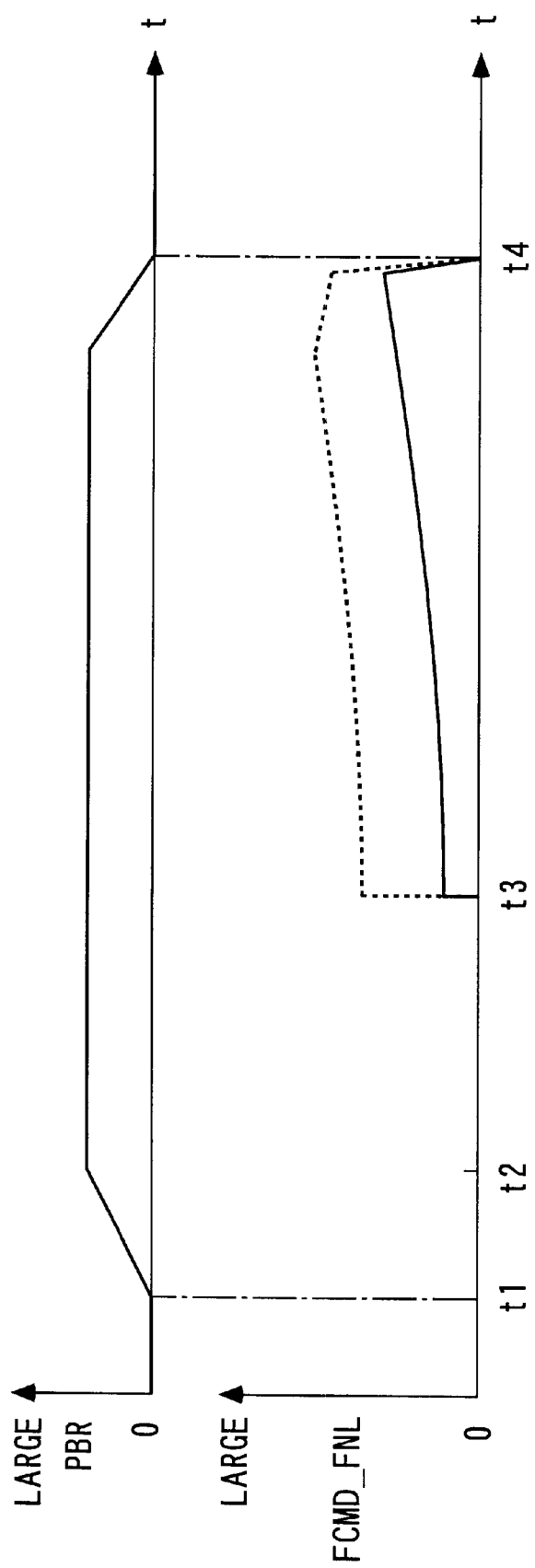

FIG. 28 shows changes in the braking pressure PBR and the final target rear-wheel braking force FCMD_FNL caused by the control of the present embodiment when the brake pedal is stepped on during disconnection of the electromagnetic clutch 8. In the figure, a curve indicated by a solid line represents an example of changes in the final target rear-wheel braking force FCMD_FNL exhibited when the increasing correction of the braking force according to the braking pressure PBR is inhibited by the steps S220 to S231 of the deceleration substitution process shown in FIG. 22, and a curve indicated by a broken line in the same figure shows, for comparison, an example of changes in the final target rear-wheel braking force FCMD_FNL exhibited when the increasing correction according to the braking pressure PBR is not inhibited.

First, during disconnection of the electromagnetic clutch 8, if the brake pedal is stepped on (time t1) when the vehicle speed Vcar is higher than the clutch connection upper limit value VcarCL, the vehicle speed Vcar decreases as the time elapses. Then, when a predetermined time elapses (time t3) after the vehicle speed Vcar becomes smaller than the clutch connection upper limit value VcarCL (time t2), the electromagnetic clutch 8 is connected to cause the braking force dependent on the final target rear-wheel braking force FCMD_FNL not increased by the braking pressure PBR to be applied to the rear wheels WRL, WRR. This prevents a large braking force dependent the final target rear-wheel braking force FCMD_FNL increased by the braking pressure PBR from being applied to the rear wheels WRL, WRR to thereby prevent occurrence of a braking shock. Then, when the rear-wheel average speed V_RR becomes smaller than the first predetermined vehicle speed V_RGN_SLOPE1 (time t4), the final target rear-wheel braking force FCMD_FNL is set to the non-braking-time target braking force FCMD_RGN_ZERO.

As described above, according to the driving force control system 1 of the present embodiment, when the vehicle 2 is performing a decelerating downhill traveling with the AP 17 being released, the target deceleration DIC is set to a smaller value as the steering angle θSTR is larger, and the final target rear-wheel braking force a FCMD_FNL is set to a smaller value as the target deceleration DIC_G is smaller. Therefore, as the steering angle θSTR is larger, the braking force applied to the rear wheels WRL, WRR can be limited to a smaller value, and thereby prevent the distribution of the axle load from being biased toward the front wheels. As a result of the limitation on the braking force applied to the rear wheels WRL, WRR and the prevention of the bias of the distribution of the axle load toward the front wheels, it is possible to ensure stability of traveling of the vehicle 2. Further, as the braking pressure PBR is larger, the final target rear-wheel braking force FCMD_FNL is set to a larger value, it is possible to increase the whole braking force applied to the vehicle 2 according to the driver's demand. Further, when the brake pedal is stepped on during disconnection of the electromagnetic clutch 8, the final target rear-wheel braking force FCMD_NFL is set to a smaller value than that set when the brake pedal is stepped on during connection of the electromagnetic switch 8, and therefore, it is possible to reduce a braking shock which might occur when the electromagnetic clutch 8 is connected thereafter. Further, when the vehicle 2 is performing decelerating travel with the AP 17 being in the released state, but not traveling downhill, the target deceleration DIC_G is set to the natural deceleration DIC_G_CD, whereby the engine brake FENG_OFF and the final target rear-wheel braking force FCMD_FNL are set to approximately equal values, and at the same time, as the steering angle θSTR is larger, the final target rear-wheel braking force FCMD_FNL is set to a smaller value. Through the control operations described above, it is possible to make stable the behavior of the vehicle 2.

It should be note that during the decelerating regeneration mode, if the driver shifts the automatic transmission 5 to a lower speed shift position or selects a hold shift position for holding the gear shift position at a low-speed position, the aforementioned natural deceleration speed DIC_G_CD may be set to a larger value (e.g. −0.07). This makes it possible to increase the braking force applied to the rear wheels according to a driver's demand for a larger braking force to be applied to the rear wheels.

Further, the engine braking force applied when the AP 17 is in the released state may be determined not only by the method of looking up the table according to the vehicle speed Vcar as in the present embodiment described above, but also by a method based on the gear ratio and the vehicle speed Vcar (or average rear-wheel speed V_RR), or the shift position and the vehicle speed Vcar (or average rear-wheel speed V_RR).

Next, a third embodiment of the present invention will be described with reference to FIGS. 29 to 35. The driving force control system 1 according to the present embodiment has the same configuration as the first and second embodiments in terms of hardware. Therefore, component parts and elements thereof are designated by the same reference numerals, and description thereof is omitted. It should be noted that when the motor 7 is not driven by the battery 7, or the electromagnetic clutch 8 (clutch means) is disconnected, the vehicle 2 is in a two-wheel drive state. Further, the motor 4 is relatively small-sized, and the electromagnetic clutch 8 is disconnected when the vehicle 2 is traveling at a high vehicle speed Vcar, since it is difficult for the motor 4 to rotate in a manner following up the rear wheels 4.

Figure 29:
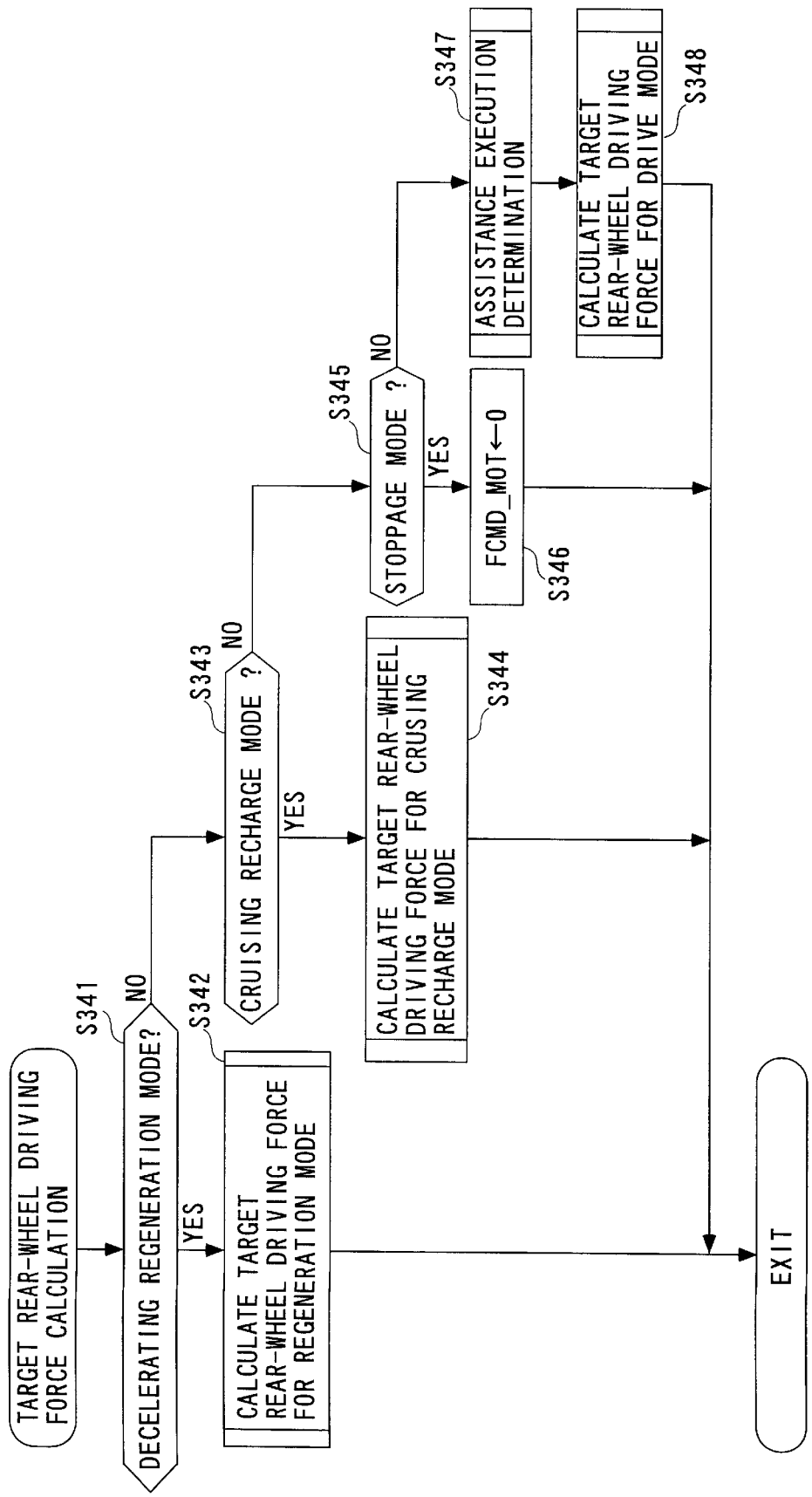
FIG. 29 is a flowchart of a target rear-wheel driving force-calculating subroutine, which is executed by a driving force control system according to a third embodiment of the invention.

FIG. 29 shows a target rear-wheel driving force-calculating subroutine for calculating the target rear-wheel driving force FCMD_MOT, which is executed at the step S33 of the driving force-calculating routine described hereinabove with reference to FIG. 3 in the description of the first embodiment. As described hereinabove, the calculation of the target rear-wheel driving force FCMD_MOT is carried out in dependence on the determined control mode. More specifically, it is determined at a step S341 whether or not the control mode is the decelerating regeneration mode. If the control mode is the decelerating regeneration mode, a target rear-wheel driving force for the decelerating regeneration mode is calculated as the target rear-wheel braking force FCMD_MOT at a step S342. The target rear-wheel driving force for the decelerating regeneration mode is calculated as a value (negative value) basically obtained by subtracting the engine braking force (negative value) of the engine 3 from the target driving force FCMD (negative value), i.e. as a braking force.

If the answer to the question of the step S341 is negative (NO), it is determined at a step S343 whether or not the control mode is the cruising regeneration mode. If the answer to this question is affirmative (YES), the target rear-wheel driving force for the cruising regeneration mode is calculated the target rear-wheel driving force FCMD_MOT at a step S344. The target rear-wheel driving force for the cruising regeneration mode is calculated as a value (negative value) basically obtained by subtracting a basic driving force FCMD determined based on the vehicle speed Vca and the remaining charge SOC from the target driving force FCMD (negative value) for driving the vehicle 2.

If the answer to the question of the step S343 is negative (NO), it is determined at a step S345 whether or not the control mode is the stoppage mode. If the answer to the question is affirmative (YES), the target rear-wheel driving force FCMD_MOT is set to 0 at a step S346.

Further, if the answer to the question of the step S345 is negative (NO), i.e. if the control mode is the drive mode, it is determined at a step S347 whether or not the assistance of the motor 4 should be carried out, and depending on the result of the determination, the target rear-wheel driving force FCMD_MOT for the drive mode is calculated at a step S348, followed by terminating the program.

Figure 30:
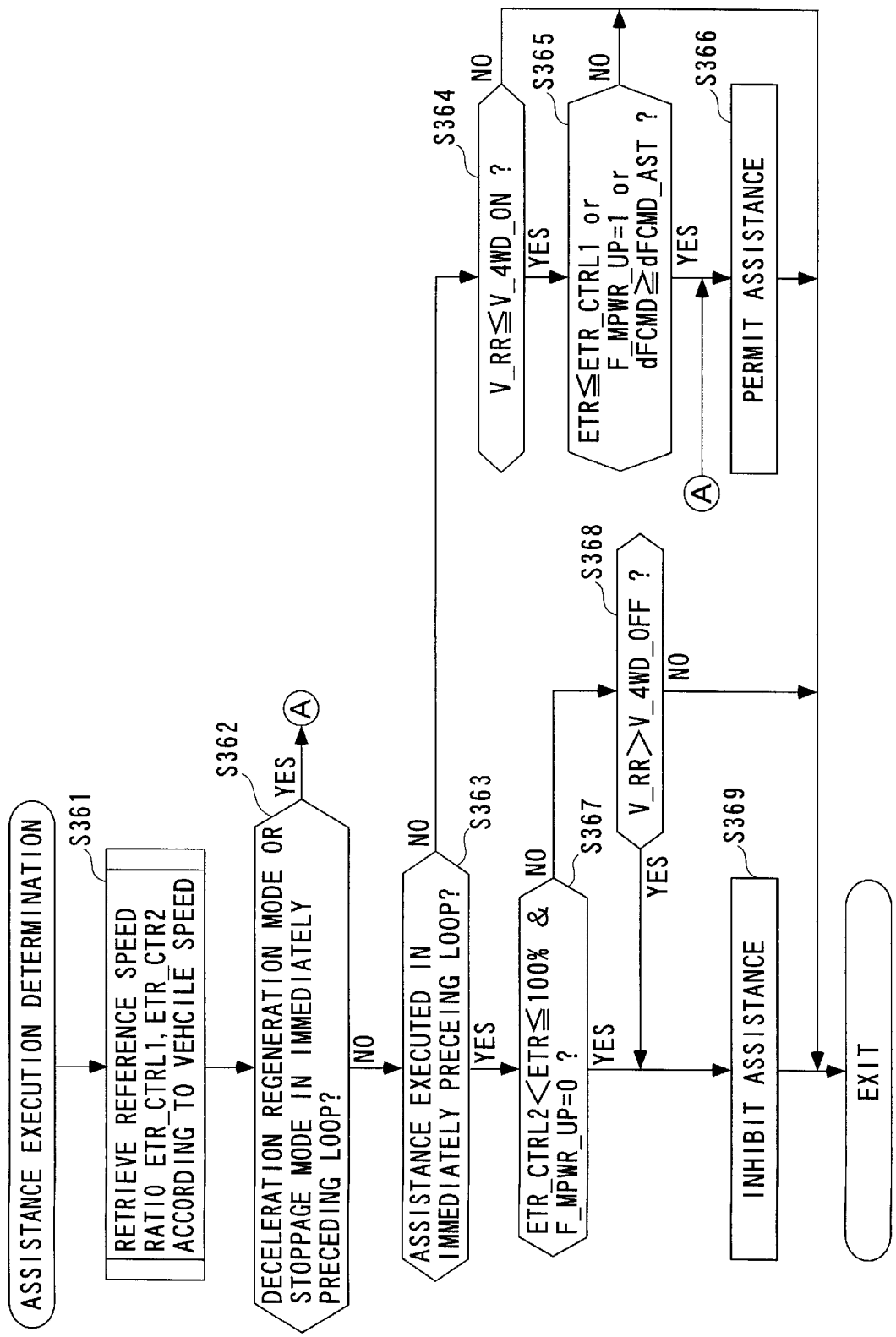
FIG. 30 is a flowchart of an assistance execution-determining subroutine.
Figure 31:
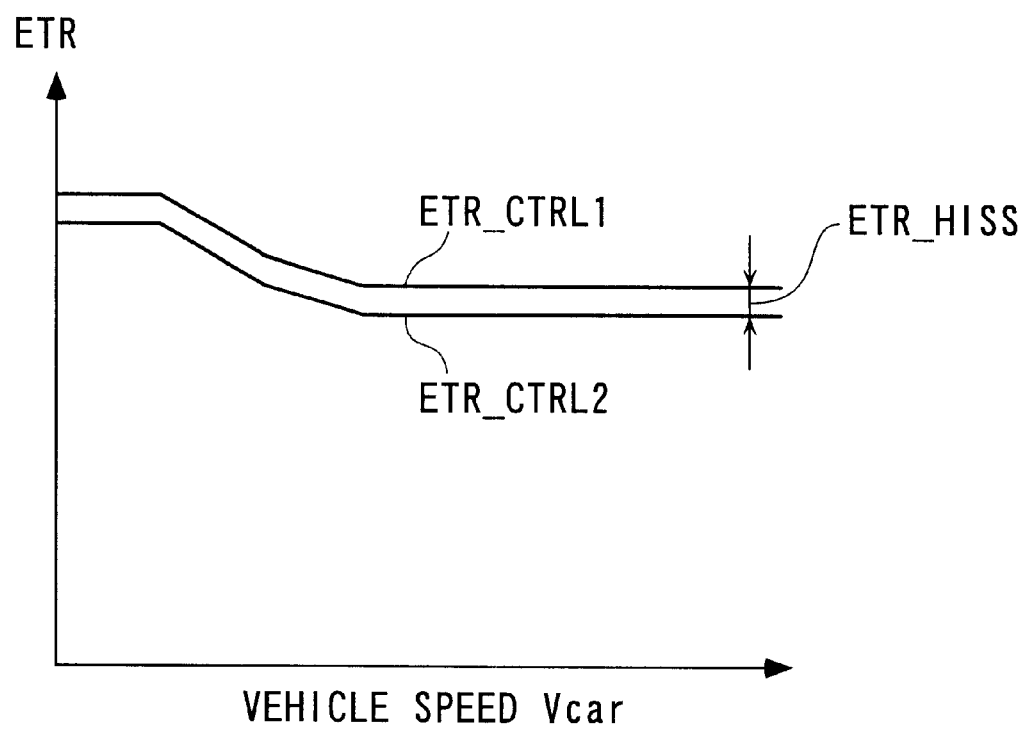
FIG. 31 is a diagram showing an example of a reference speed ratio table.

FIG. 30 shows an assistance execution-determining subroutine executed at the steps S347 in FIG. 29. In this control process, an assistance-starting reference speed ratio ETR_CTRL1 and an assistance-stopping reference speed ratio ETR_CTRL2 are retrieved according to the vehicle speed Vcar at a step S361. FIG. 31 shows an example of a reference speed ratio table for the retrieval. As shown in the figure, the assistance-starting reference speed ratio ETR_CTRL1 is defined as a value adding a certain amount of hysteresis (e.g. 5%) to the assistance-stopping reference speed ratio ETR_CTR2, thereby avoiding hunting between the start and stoppage of the assistance dependent on the speed ratio ETR of the torque converter 5a, referred to hereinafter. Further, according to this table, both the reference speed ratios ETR_CTRL1, 2 are set to respective larger values as the vehicle speed Vcar is smaller so as to make it easier for the motor 4 to execute the assistance.

Referring again to FIG. 30, at the following step S362, it is determined whether or not the control mode in the immediately preceding loop was the decelerating regeneration mode or the stoppage mode. If the answer to this question is negative (NO), it is determined at a step S363 whether or not the assistance of the motor 4 was carried out in the immediately preceding loop.

If the answer to this question is negative (NO), which means that the assistance of the motor 4 has not been carried out, it is determined whether or not conditions for starting the assistance of the motor 4 are fulfilled. First, at a step S364, it is determined whether or not the rear-wheel speed V_RR is equal to or lower than an assistance-starting vehicle-speed upper limit value V_4WD_ON (e.g. 60 km/h). The assistance-starting vehicle-speed upper limit value V_4WD_ON corresponds to an upper limit connection value at which the electromagnetic clutch 3 is permitted to be connected. Therefore, if the answer to this question is negative (NO), i.e. if V_RR>V_4WD_ON holds, the present program is immediately terminated, thereby continuing the inhibition of the assistance of the motor 4.

If the answer to the question of the step S364 is affirmative (YES), i.e. if V_RR≦V_4WD_ON holds, it is determined at a step S365 whether or not any of the following conditions are satisfied.

(1) The speed ratio ETR of the torque converter 5a is equal to or lower than the assistance-starting speed ratio ETR_CTRL1 determined at the step S361 (ETC≦ETC_CTRL1).

(2) The front wheels WF are slipping (F_MPWR_UP=1)

(3) The amount of change dFCMD in the target driving force is equal to or larger than a predetermined value dFCMD_AST (e.g. 70 kgf/0.01sec.) (dFCMD≧dFCMD_AST)

Here, F_MPWR_UP in (2) represents a motor output increasing flag which is set to 1 when the motor 4 is delivering increased output power in response to the determination that the front wheels WF are slipping. Further, dFCMD or the amount of change in the target driving force in (3) designates the difference between the present value and the immediately preceding value of the target driving force FCMD.

If the answer to the question of the step S365 is negative (NO), i.e. if none of the above conditions (1) to (3) are satisfied, the present program is immediately terminated, thereby continuing the inhibition of the assistance of the motor 4.

On the other hand, if the answer to the question of the step S365 is affirmative (YES), i.e. if any of the above conditions (1) to (3) are satisfied, it is judged that the assistance-starting conditions are satisfied and the assistance of the motor 4 is permitted and started at a step S366, followed by terminating the program. Thus, when the amount of change dFCMD in the target driving force is equal to or lower than the predetermined value dFCMD_AST, the assistance of the motor 4 is permitted and started irrespective of the speed ratio ETR of the converter 5a, whereby the vehicle 2 is shifted to the four-wheel drive mode. This enables the assistance of the motor 4 to be instantly started without being influenced by the delay in the change in the speed ratio ETR.

On the other hand, if the answer to the question of the step S363 is affirmative (YES), i.e. if the assistance was carried out in the immediately preceding loop, it is determined whether or not the conditions for stopping the assistance of the motor 4 are satisfied. First, at a step S367, it is determined whether or not the speed ratio ETR of the torque converter 5a is larger than the assistance-stopping reference speed ratio ETR_CTRL2 and at the same time equal to or smaller than 100%, and at the same time the motor output increasing flag F_MPWR_UP assumes 0. If the answer to this question is negative (NO), i.e. if ETR≦ETR_CTRL2 holds, or the front wheels are slipping, the program proceeds to a step S368, wherein it is determined whether or not the rear-wheel speed V_RR is larger an assistance-stopping upper limit vehicle speed V_4WD_OFF (e.g. 65 km/h). The assistance-stopping upper limit vehicle speed V_4WD_OFF is a value obtained by adding hysteresis to the assistance-starting upper limit vehicle speed V_4WD_ON. If the answer to this question is negative (NO), i.e. if V_RR≦4WD_OFF holds, the present program is terminated, thereby allowing the assistance of the motor 4 to be continued.

On the other hand, if the answer to the question of the step S367 or S368 is affirmative (YES), i.e. if ETR_CTRL2<ETR≦100% and at the same time the front wheels are not slipping, or if V_RR>V_4WD_OFF holds, it is judged that the conditions for stopping the assistance of the motor 4 are satisfied, and the assistance of the motor 4 is stopped at a step S369, whereby the vehicle 2 is shifted to the two-wheel drive mode, followed by terminating the program.

On the other hand, if the answer to the question of the step S362 is affirmative (YES), i.e. if the immediately preceding control mode is the decelerating regeneration mode or the stoppage mode, the program proceeds to the step S366 to permit the assistance of the motor 4. More specifically, when the control mode is shifted to the drive mode by the user stepping on the AP 17 from the decelerating regeneration mode in which the AP 17 is in the OFF state, the assistance of the motor 4 is unconditionally permitted irrespective of the speed ratio ETR of the torque converter 5a, whereby the vehicle 2 is shifted to the four-wheel drive mode. This makes it possible to instantly execute the assistance of the motor 4 without being influenced by the delay in the speed ratio ETR, when the vehicle 2 is accelerated from its decelerating condition.

Figure 35A:
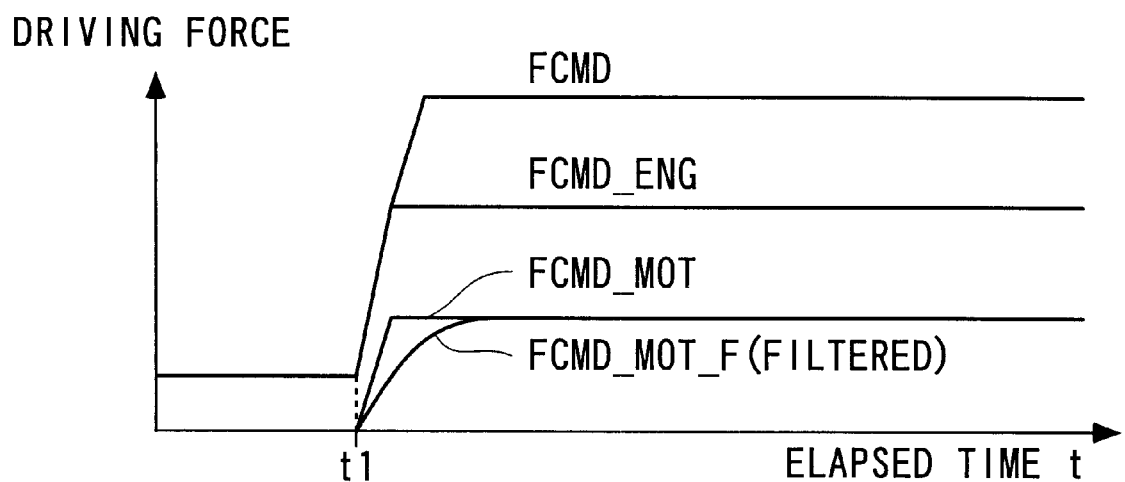
FIG. 35A is a timing chart sowing an example of an operation of the driving force control system according to the third embodiment.
Figure 35B:
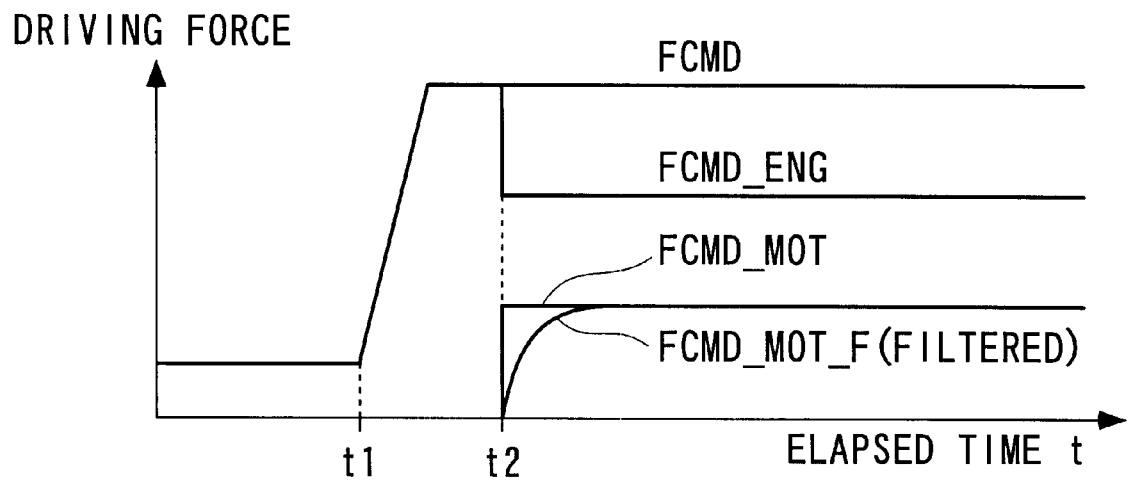
FIG. 35B is a timing chart sowing an example of an operation of the conventional driving force control system.

FIGS. 35A and 35B schematically show an example of changes in the driving force during the acceleration of the vehicle 2, which result from the control operations of the third embodiment described above, in comparison with the prior art under the same environment. That is, it is assumed that in the low-speed or decelerating condition of the vehicle 2, the AP 17 is stepped on at a time t1 to start acceleration of the vehicle. In the case of the prior art shown in FIG. 35B, since the conditions for starting the assistance of the motor 4 include the lowering of the speed ratio ETR of the torque converter below a predetermined value, and it takes time for the speed ratio ETR to actually change, as described hereinabove, the assistance only starts at a time t2 delayed from the time t1. During the delay, the target engine driving force FCMD continues to be increased, so that at the start of the assistance, a large target motor driving force FCMD_MOT is suddenly generated, and the target engine driving force FCMD_ENG is suddenly dropped by the amount of the large target motor driving force FCMD_MOT, causing a torque step.

In contrast, in the case of the present embodiment illustrated in FIG. 35A, if the vehicle 2 is accelerated from the low-speed condition thereof, the amount of change in the target driving force dFCMD becomes equal to or larger than the predetermined value dFCMD_AST so that the answer to the question of the step S365 in FIG. 30 becomes affirmative (YES), or if the vehicle 2 is accelerated from the decelerating condition in which the accelerator pedal 1 in the OFF state, the control mode is shifted from the decelerating regeneration mode to the drive mode, whereby the answer to the question of the step S362 becomes affirmative (YES), whereby in both of the above cases, the assistance is permitted irrespective of the speed ratio ETR (step S366). This makes it possible to start the assistance of the motor 4 immediately after the time t1 the acceleration of the vehicle 2 is started. As a result, the assistance of the motor 4 can be started from the state of the target motor driving force FCMD_MOT being still small, and continued by progressively increasing the same, and at the same time, the engine driving force FCMD_ENG is progressively decreased, whereby the assistance of the motor 4 can be started smoothly without developing a torque step. It should be noted that in FIGS. 35A, 35B, FCMD_MOT_F represents a value of the target rear-wheel driving force after being filtered by the step S34 in FIG. 3.

Figure 32:
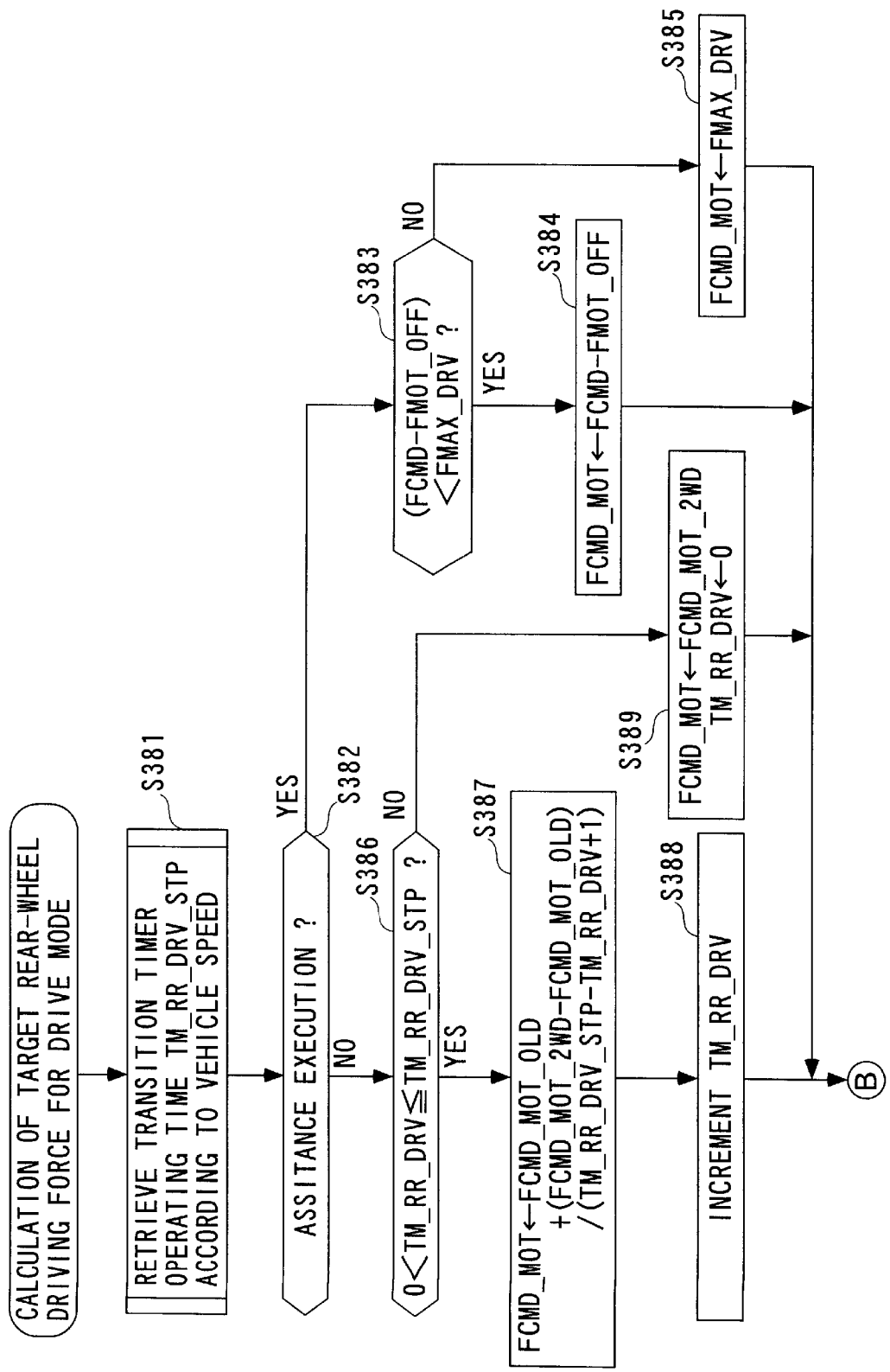
FIG. 32 is a flowchart of a target rear-wheel driving force-calculating subroutine for a drive mode.
Figure 33:
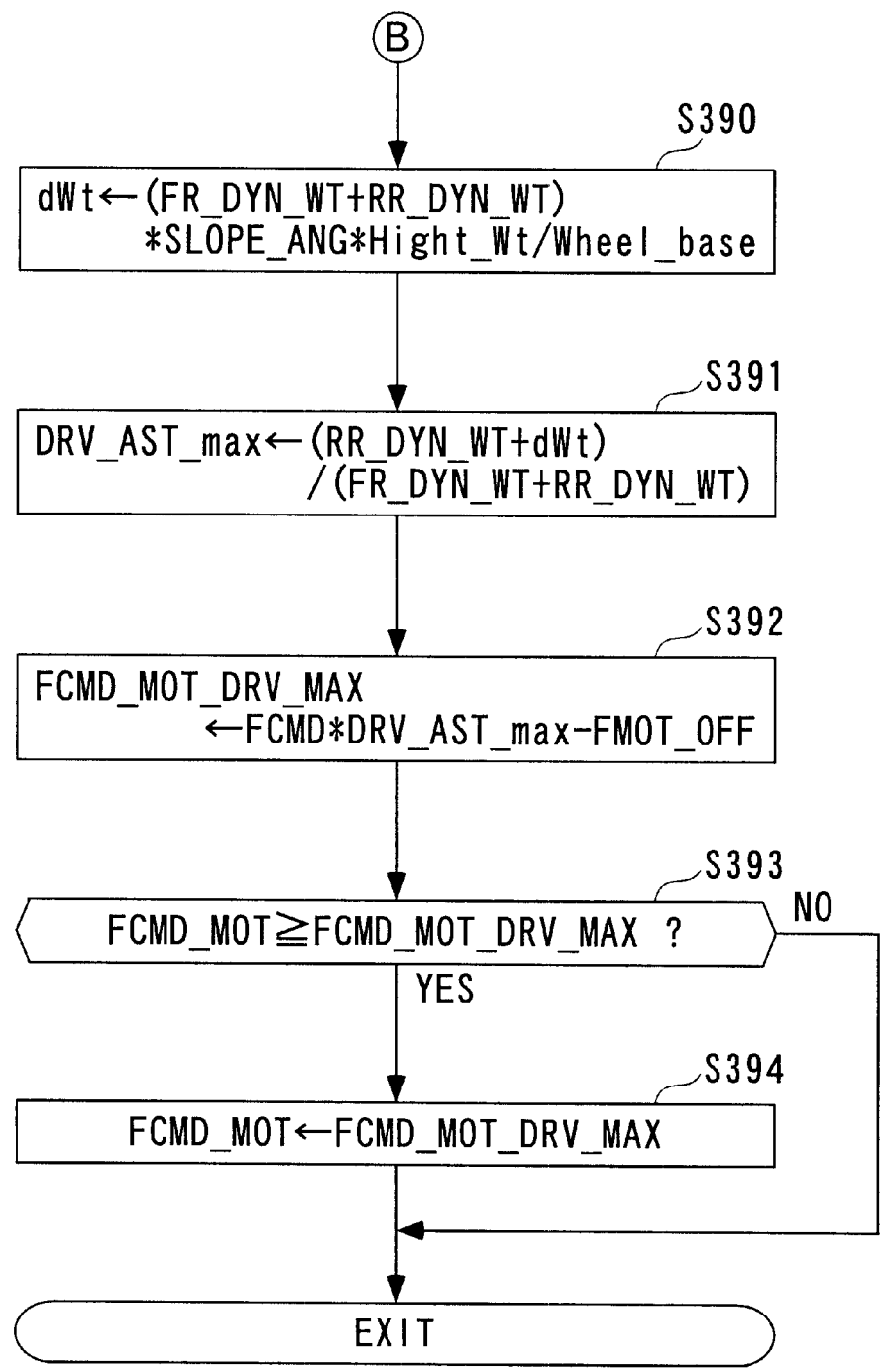
FIG. 33 is a continuation of the FIG. 32 flowchart.
Figure 34:
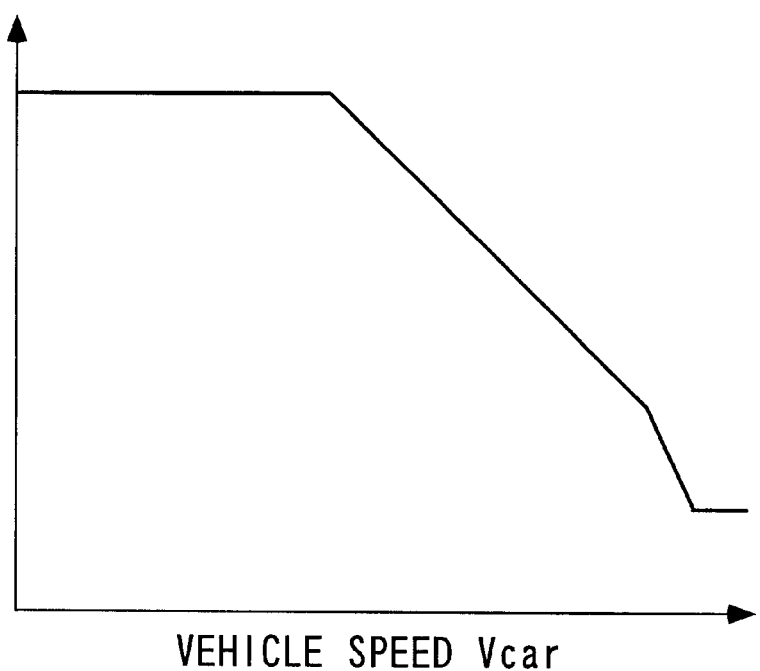
FIG. 34 is a diagram showing an example of a transition timer operating time table.

FIGS. 32 and 33 show a target rear-wheel driving force-calculating subroutine executed at the step S348 in FIG. 29. In this control process, depending on the determination concerning the execution of the assistance of the motor 4 by the FIG. 30 subroutine, the target rear-wheel driving force FCMD_MOT for the drive mode is calculated. First, a transition timer operating time TM_RR_DRV_STP is retrieved according to the vehicle speed Vcar at a step S381. The transition timer operating time TM_RR_DRV_STP corresponds to a time over which the target rear-wheel driving force FCMD_MOT is progressively decreased when the vehicle 2 is shifted from the state in which the assistance is executed to the state in which the assistance is stopped. FIG. 34 shows an example of the transition timer operating time table. The table is configured such that as the vehicle speed Vcar is larger, the transition timer operating time TM_RR_DRV_STP becomes smaller. This is because as the vehicle speed Vcar is higher, the target rear-wheel driving force FCMD_MOT is smaller.

Referring again to FIG. 32, at a step S382 following the step S381, it is determined whether or not the FIG. 30 subroutine determined that the assistance should be executed. If the answer to this question is affirmative (YES), at the following steps S383 to S385, the target rear-wheel driving force FCMD_MOT for the assistance execution is calculated. First, it is determined at a step S383 whether or not a value (FCMD−FMOT_OFF) obtained by subtracting the motor drag torque FMOT_OFF (resistance to rotation of the wheels, negative value) from the target driving force FCMD for driving the vehicle 2 is smaller than the maximum driving force FMAX_DRV of the motor 4. If the answer to this question is affirmative (YES), i.e. if the value (FCMD—FMOT_OFF) is within the range of the maximum driving force FMAX_DRV, the value (FCMD−FMOT_OFF) is set to the target rear-wheel driving force FCMD_MOT at a step S384. On the other hand, if the answer to the question of the step S383 is negative (NO), i.e. if (FCMD−FMOT_OFF)≧FMAX_DRV holds, the maximum driving force FMAX_DRV of the motor 4 is set to the target rear-wheel driving force FCMD_MOT at a step S385, followed by the program proceeding to a step S390, referred to hereinafter.

On the other hand, if the answer to the question of the step S382 is negative (NO), i.e. if the assistance should not be executed, at the following steps S386 to S389, the target rear-wheel driving force for the stoppage of the assistance is calculated. First, it is determined at a step S386 whether or not the count TM_RR_DRV of the transition timer is larger than 0, and at the same time, equal to or smaller than the transition timer operating time TM_RR_DRV_STP determined at the step S381. If the answer to this question is affirmative (YES), i.e. if the transition timer operating time TM_RR_DRV_STP has not elapsed after the stoppage of the assistance, to progressively decrease the target rear-wheel driving force FCMD_MOT, this driving force is calculated by the following equation (17):

FCMD_MOT=FCMD_MOT_OLD+(FCMD_MOT_

2WD−FCMD_MOT_OLD)/(TM_RR

—DRV_STP−TM_

RR_DRV+1)        (17)

and the count TM_RR_DRV of the transition timer is incremented at a step S388.

In the equation (17), FCMD_MOT_OLD represents the immediately preceding value of the target rear-wheel driving force, FCMD_MOT_2WD represents the calculated value of the target rear-wheel driving force for the stoppage of the assistance, and the denominator on the right side (TM_RR_DRV_STP−TM_RR_DRV+1) represents the remaining time period (remaining count TM_RR_DRV, i.e. the number of remaining operations to be executed) of the transition timer. That is, by the calculation using the equation (17), in every loop during the operation of this timer, a value obtained by dividing the difference between the present calculated value FCMD_MOT_2WD of the target rear-wheel driving force and the immediately preceding value FCMD_MOT_OLD of the target rear-wheel driving force by the remaining time period over which the timer should be operated is always added to the FCMD_MOT_OLD value, whereby the target rear-wheel driving force FCMD_MOT progressively decreases in a curve forming a gentle downward slope, and upon the lapse of the transition timer operating time TM_RR_DRV_STP, the calculated value FCMD_MOT_2WD of the target rear-wheel driving force is finally reached. This makes it possible to cause the target rear-wheel driving force FCMD_MOT for the stoppage of the assistance to progressively decrease from a value previously assumed during execution of the assistance, in a curve forming a downward slope.

On the other hand, if the answer to the question of the step S386 is negative (NO), i.e. if the transition timer operating time TM_RR_DRV_STP has elapsed after the stoppage of the assistance, the calculated value FCMD_MOT_2WD of the target rear-wheel driving force is directly set to the target rear-wheel driving force FCMD_MOT, and at the same time the count TM_RR_DRV of the transition timer is reset to 0, at a step S389, followed by the program proceeding to the step S390 et seq.

At the step S390 et seq., the limiting process for limiting the target rear-wheel driving force FCMD_MOT is carried out by taking the distribution factor of the weight of the vehicle 2 into account. First, at the step S390, a weight shift amount dWt is calculated by dividing the product of the vehicle weight (FR_DYN_WT+RR_DYN_WT), a road slope angle SLOPE_ANG, and the height Hight_Wt of the center of gravity of the vehicle 2 multiplied by each other, by the wheel base Wheel_base. In this calculation, FR_DYN_WT, RR_DYN_WT represent a weight on the front wheel side, and a weight on the rear wheel side, respectively. Further, the road surface slope SLOPE_ANG represents a value thereof determined when the vehicle 2 is in stoppage, which is estimated by calculation through integrating the outputs from the front and rear acceleration sensors 22, 23 when the front-wheel rotational speeds N_FL, N_FR and the rear-wheel rotational speeds N_RL, N_RR are all equal to 0, and at the same time, the brake pedal is being operated.

Next, the sum (RR_DYN_WT+dWt) of the weight RR_DYN_WT on the rear-wheel side and the weight shift amount dWt calculated at the step S390 is divided by the vehicle weight (FR_DYN_WT+RR_DYN_WT) to calculate the rear-while maximum weight distribution factor DRV_AST_max at a step S391. Then, from the product of the target driving force FCMD multiplied by the calculated rear-while maximum weight distribution factor DRV_AST_max, the motor drag torque FMOT_OFF is subtracted to calculate the rear-wheel driving force limit value FCMD_MOT_DRV_MAX at a step S392.

Then, it is determined at a step S393 whether or not the target rear-wheel driving force FCMD_MOT calculated at the step S384 or the like is equal to or larger than the rear-wheel driving force limit value FCMD_MOT_DRV_MAX. If the answer to this question is affirmative (YES), i.e. if FCMD_MOT≧FCMD_MOT_DRV_MAX holds, the target rear-wheel driving force FCMD_MOT is set to the rear-wheel driving force limit value FCMD_MOT_DRV_MAX at a step S394. On the other hand, if the answer to this question is negative (NO), the step S394 is skipped to hold the target rear-wheel driving force FCMD_MOT, followed by terminating the program.

As described above, according to the present embodiment, if the vehicle 2 is accelerated from the low-speed condition thereof, the amount of change in the target driving force dFCMD becomes equal to or larger than the predetermined value dFCMD_AST or if the vehicle 2 is accelerated from the decelerating condition in which the accelerator pedal is in the OFF state, the control mode is shifted from the decelerating regeneration mode to the drive mode, whereby in both of the above cases, the assistance of the motor 4 is permitted irrespective of the speed ratio ETR of the torque converter. This makes it possible to start the assistance of the motor 4 immediately after the acceleration of the vehicle 2 is started. As a result, the assistance of the motor 4 can be started from the state of the target motor driving force FCMD_MOT being still small, and continued by progressively increasing the same, whereby the assistance of the motor 4 can be started smoothly without developing a torque step. This makes it possible to secure the excellent acceleration and drivability.

The present invention is not limited to the above embodiment, but it can be practiced in various forms. For instance, although in the above embodiments, the invention is applied to a front-and-rear wheel drive vehicle of a type in which front wheels thereof are driven by an engine and rear wheels thereof by an electric motor, this is not limitative, but the invention is also applicable to a vehicle of a type in which front wheels are driven by an electric motor and rear wheels thereof by an engine. Further, although in the above embodiments, the electromagnetic clutch 8 is used as a clutch for connection/disconnection between the motor 4 and the rear wheels WR, any clutch including a hydraulic multi-disc clutch may be employed so long as it is capable of controlling torque transmission capacity. Further, it is possible to use a large-sized electric motor for direct connection with the rear wheels and omit the electromagnetic clutch 8.

It is further understood by those skilled in the art that the foregoing is a preferred embodiment of the invention, and that various changes and modifications may be made without departing from the spirit and scope as thereof.

What is claimed is:

1. A driving force control system for a front-and-rear wheel drive vehicle that drives one pair of respective pairs of front drive wheels and rear drive wheels by an engine, and another pair of the respective pairs by an electric motor, the driving force control system comprising:
    vehicle speed-detecting means for detecting a vehicle speed of the vehicle;
    driving force demand degree-detecting means for detecting a degree of demand for a driving force for driving the vehicle;
    target driving force-calculating means for calculating a target driving force for driving the vehicle, based on at least the vehicle speed and the degree of demand for the driving force;
    traveling condition-determining means for determining a present traveling condition of the vehicle; and
    driving force control means for controlling a driving force of the engine and a driving force of the motor based on the calculated target driving force, in dependence on the traveling condition of the vehicle determined by said traveling condition-determining means.

2. A driving force control system according to claim 1, wherein said driving force demand degree-detecting means comprises accelerator opening-detecting means for detecting an accelerator opening, wherein said traveling condition-determining means includes differential rotational speed-detecting means for detecting a differential rotational speed between a rotational speed of the front drive wheels and a rotational speed of the rear drive wheels based on a parameter indicative of the traveling condition of the vehicle, target differential rotational speed-setting means for setting a target differential rotational speed based on the parameter indicative of the traveling condition of the vehicle, and slip determination means for determining a slip condition of the one pair driven by the engine, based on the detected differential rotational speed and the target differential rotational speed, and wherein said driving force control means includes target motor driving force-calculating means for calculating a target motor driving force of the electric motor based on the target driving force, target engine driving force-calculating means for calculating a target engine driving force of the engine based on the target driving force and the target motor driving force, motor drive control means for controlling driving of the electric motor based on the target motor driving force, engine drive control means for controlling driving of the engine based on the target engine driving force, and engine driving force-correcting means for decreasing the target engine driving force such that the differential rotational speed is held at the target differential rotational speed, when it is determined by said slip determination means that the one pair driven by the engine are slipping.

3. A driving force control system according to claim 2, wherein said driving force control means further includes motor driving force-correcting means for increasing the target motor driving force when said slip determination means determines that the one pair driven by the engine are slipping.

4. A driving force control system according to claim 2, wherein said traveling condition-determining means further includes differential rotational speed change amount-detecting means for detecting an amount of change in the differential rotational speed, and wherein said engine driving force-correcting means decreases the target engine driving force according to the detected amount of change in the differential rotational speed.

5. A driving force control system according to claim 2, wherein the parameter indicative of the traveling condition of the vehicle includes at least one of a degree of a slope of a road, a steering angle, the vehicle speed, and the accelerator opening.

6. A driving force control system according to claim 1, wherein the vehicle includes an accelerator pedal, and a steering wheel, wherein said driving force demand degree-detecting means includes accelerator condition-detecting means for detecting whether or not the accelerator pedal is in a released condition, wherein said traveling condition-determining means includes downhill traveling-determining means for determining whether or not the vehicle is traveling downhill, and steering angle-detecting means for detecting an steering angle of the steering wheel, and wherein said driving force control means includes target deceleration-setting means for setting a target deceleration based on the detected steering angle when said accelerator condition-detecting means detects that the accelerator pedal is in the released condition and at the same time said downhill traveling-determining means determines that the vehicle is traveling downhill, engine braking force-calculating means for calculating an engine braking force according to the detected vehicle speed when said accelerator condition-detecting means detects that the accelerator pedal is in the released condition, target braking force-setting means for setting a target braking force of the electric motor for braking the rear wheels, based on the set target deceleration and the calculated engine braking force, and drive control means for controlling driving of the electric motor based on the set target driving force.

7. A driving force control system according to claim 6, wherein the vehicle includes a brake, wherein said traveling condition-determining means includes brake operation-detecting means for detecting whether or not the brake is being operated, wherein said driving force control means further includes target deceleration-increasing means for correcting the set target deceleration such that the set target deceleration is increased to a larger value than assumed when the brake is not being operated, when said brake operation-detecting means detects that the brake is being operated.

8. A driving force control system according to claim 7, wherein the vehicle includes clutch means for disconnecting and connecting between the rear wheels and the electric motor, wherein said driving force control means includes clutch driving means for disconnecting the clutch means when the vehicle speed is higher than a predetermined vehicle speed, and disconnecting the clutch means when the vehicle speed is equal to or lower than the predetermined vehicle speed, and target deceleration-decreasing means for correcting the set target deceleration such that the set target deceleration is decreased to a smaller value than the target deceleration increased by said target deceleration-increasing means.

9. A driving force control system according to claim 1, wherein the vehicle include an accelerator pedal and a steering wheel, wherein said driving force demand degree-detecting means includes accelerator condition-detecting means for detecting whether or not the accelerator pedal is in a released condition, wherein said traveling condition-determining means includes steering angle-detecting means for detecting a steering angle of the steering wheel, and wherein said driving force control means includes engine braking force-calculating means for calculating an engine braking force of the engine according to the detected vehicle speed when said accelerator condition-detecting means detects that the accelerator pedal is in the released condition, target braking force-setting means for setting a target braking force of the electric motor for braking the rear wheels to a value corresponding to the calculated engine braking force, target braking force-correcting means for correcting the set target braking force according to the detected steering angle, and drive control means for controlling driving of the electric motor based on the corrected target braking force.

10. A driving force control system according to claim 1, wherein the vehicle includes a torque converter, and is driven while switching between a four-wheel drive mode in which the one pair are driven by the engine via the torque converter and at the same time the another pair are driven by the electric motor and a two-wheel drive mode in which the driving of the another pair by the electric motor is inhibited, wherein said driving force demand degree-detecting means includes accelerator opening-detecting means for detecting an accelerator opening, wherein said traveling condition-determining means includes speed ratio-detecting means for detecting a speed ratio of the torque converter, reference speed ratio-storing means for storing a predetermined reference speed ratio, and speed ratio-determining means for determining whether or not the detected speed ratio is smaller than the predetermined reference speed ratio, and wherein said driving force control means includes target motor driving force-calculating means for calculating a target motor driving force of the electric motor based on the target driving force, target engine driving force-calculating means for calculating a target engine driving force of the engine based on the target driving force and the target motor driving force, motor drive means for driving the electric motor based on the target motor driving force, and motor drive-permitting means for permitting the driving of the electric motor by said motor drive means when an amount of change in the target driving force is equal to or larger than a predetermined value, and when the amount of change in the target driving force is smaller than the predetermined value, permits the driving of the electric motor on condition that the speed ratio-determining means determines that the detected speed ratio is smaller than the predetermined reference speed ratio.

11. A driving force control system according to claim 1, wherein the vehicle includes a torque converter, and is driven while switching between a four-wheel drive mode in which the one pair are driven by the engine via the torque converter and at the same time the another pair are driven by the electric motor and a two-wheel drive mode in which the driving of the another pair by the electric motor is inhibited, wherein said driving force demand degree-detecting means includes an accelerator opening-detecting means for detecting an accelerator opening, wherein said traveling condition-determining means includes speed ratio-detecting means for detecting a speed ratio of the torque converter, reference speed ratio-storing means for storing a predetermined reference speed ratio, speed ratio-determining means for determining whether or not the detected speed ratio is larger than the predetermined reference speed ratio, and stepping operation-detecting means for detecting whether or not the accelerator pedal in the released condition is stepped on, during the traveling of the vehicle, and wherein said driving force control means includes target motor driving force-calculating means for calculating a target motor driving force of the electric motor, motor drive means for driving the electric motor based on the calculated target motor driving force, and motor drive-permitting means for permitting the driving of the electric motor by said motor drive means when said stepping operation-detecting means detects that the accelerator pedal is stepped on, and when said stepping operation-detecting means does not detect that the accelerator pedal is stepped on, inhibits the driving of the electric motor on condition that the speed ratio-determining means determines that the detected speed ratio is smaller than the predetermined reference speed ratio.

* * * * *